United States Patent
Ikeda et al.

(10) Patent No.: US 8,542,026 B2
(45) Date of Patent: Sep. 24, 2013

(54) APPARATUS FOR ESTIMATING FUEL-CELL HYDROGEN CONCENTRATION AND FUEL CELL SYSTEM

(75) Inventors: Kotaro Ikeda, Susono (JP); Toshiaki Kusakari, Susono (JP); Hideaki Kume, Gotemba (JP); Yoshihiro Ikogi, Mishima (JP); Noriyuki Kobayashi, Susono (JP); Hikaru Hasegawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 76 days.

(21) Appl. No.: 13/061,615

(22) PCT Filed: May 8, 2009

(86) PCT No.: PCT/JP2009/058684
§ 371 (c)(1),
(2), (4) Date: Mar. 1, 2011

(87) PCT Pub. No.: WO2010/128555
PCT Pub. Date: Nov. 11, 2010

(65) Prior Publication Data
US 2012/0038373 A1    Feb. 16, 2012

(51) Int. Cl.
*G01R 27/08*    (2006.01)

(52) U.S. Cl.
USPC .......................................... 324/691; 324/649

(58) Field of Classification Search
USPC .............. 324/691, 649, 600; 429/400, 428, 429/443, 447, 448, 449, 430, 431, 90; 95/3, 95/6, 7, 8; 96/19, 111; 123/406.31; 203/1, 203/3; 204/228.6, 228.1
See application file for complete search history.

(56) References Cited

U.S. PATENT DOCUMENTS

| | | | |
|---|---|---|---|
| 6,852,434 B2 * | 2/2005 | Reindl et al. | 429/442 |
| 8,062,804 B2 * | 11/2011 | Daly et al. | 429/443 |
| 2002/0110713 A1 * | 8/2002 | Reindl et al. | 429/22 |
| 2005/0048336 A1 | 3/2005 | Takebe et al. | |

(Continued)

FOREIGN PATENT DOCUMENTS

| | | |
|---|---|---|
| CN | 1758066 A | 4/2006 |
| JP | A-2001-229951 | 8/2001 |

(Continued)

OTHER PUBLICATIONS

Ito et al., "Electrochemical analysis of hydrogen membrane fuel cells," *Journal of Power Sources*, Aug. 14, 2008, pp. 922-926, vol. 185.

(Continued)

*Primary Examiner* — Hoai-An D Nguyen
(74) *Attorney, Agent, or Firm* — Oliff & Berridge, PLC

(57) ABSTRACT

A fuel cell system includes a fuel cell, an impedance measuring instrument, and a control device. The control device is connected to the impedance measuring instrument. The impedance measuring instrument measures the impedance of the fuel cell according to the AC impedance method. The control device stores in advance a reference value corresponding to a reference hydrogen concentration. The control device compares the real part Z' of impedance acquired via the impedance measuring instrument against the reference value. When Z' is equal to or greater than the reference value, the control device estimates the hydrogen concentration of the fuel cell to be equal to or less than the reference hydrogen concentration.

11 Claims, 31 Drawing Sheets

(56) References Cited

U.S. PATENT DOCUMENTS

| | | |
|---|---|---|
| 2005/0112425 A1 | 5/2005 | Hsu |
| 2006/0078788 A1 | 4/2006 | Ramschak |
| 2007/0172708 A1 | 7/2007 | Takebe et al. |
| 2007/0259256 A1 | 11/2007 | Le Canut et al. |
| 2008/0032171 A1 | 2/2008 | Hashizume et al. |
| 2008/0102333 A1* | 5/2008 | Watanabe et al. ............ 429/23 |

FOREIGN PATENT DOCUMENTS

| | | |
|---|---|---|
| JP | A-2003-86220 | 3/2003 |
| JP | A-2003-223918 | 8/2003 |
| JP | A-2003-317810 | 11/2003 |
| JP | A-2005-63946 | 3/2005 |
| JP | A-2005-71882 | 3/2005 |
| JP | A-2005-201639 | 7/2005 |
| JP | A-2005-251434 | 9/2005 |
| JP | A-2005-526365 | 9/2005 |
| JP | A-2005-340088 | 12/2005 |
| JP | A-2006-90812 | 4/2006 |
| JP | A-2007-128778 | 5/2007 |
| JP | A-2007-523443 | 8/2007 |
| JP | A-2007-250461 | 9/2007 |
| JP | A-2008-8750 | 1/2008 |
| JP | A-2008-41433 | 2/2008 |
| JP | A-2008-522350 | 6/2008 |
| JP | A-2009-4180 | 1/2009 |
| WO | WO 2005/088753 A1 | 9/2005 |
| WO | WO 2007/110970 A1 | 10/2007 |

OTHER PUBLICATIONS

International Search Report for International Patent Application No. PCT/JP2009/058684, mailed on Aug. 18, 2009 (w/ English translation).

* cited by examiner ch membrane fuel cells. *Journal of Power Sources*, 185, pp. 922-926.)

APPARATUS FOR ESTIMATING FUEL-CELL HYDROGEN CONCENTRATION AND FUEL CELL SYSTEM

TECHNICAL FIELD

The present invention relates to apparatuses for estimating fuel-cell hydrogen concentration and to fuel cell systems.

BACKGROUND ART

An example of a conventionally known fuel cell system is the one disclosed in JP-A 2009-4180 which controls its peripheral devices based on hydrogen concentration. This fuel cell system has a hydrogen concentration sensor located on the downstream side of the anode exit of its fuel cell. The hydrogen concentration sensor detects the hydrogen concentration of anode off-gas discharged from the anode exit of the fuel cell.

The above fuel cell system is designed to control the anode exit valve of the fuel cell based on the output of the hydrogen concentration sensor. Specifically, this anode exit valve is controlled such that the fuel cell receives hydrogen the amount of which matches the hydrogen consumption amount of the fuel cell. According to the above Patent Document 1, such control of the abode exit valve leads to a reduction in the hydrogen concentration of the exhaust gas discharged through the anode exit valve.

It is also known that there exist techniques for examining the states of a fuel cell (e.g., the amount of water contained in the fuel cell) by measuring its impedance. As a method of fuel-cell impedance measurement, the AC (alternating-current) impedance method is known.

A measurement result obtained under the AC impedance method is often graphically represented in a complex plane. A diagram of this graphical representation is commonly referred to as a Cole-Cole plot. A Cole-Cole plot is obtained by measuring a plurality of impedance values according to the AC impedance method while varying the voltage frequency and then plotting the values in a complex plane. As is known, a curve passing through impedance points in a Cole-Cole plot (i.e., a trajectory of impedance values) takes the form of a semicircle. Hereinafter, this semicircle is also referred to as an "impedance semicircle."

JP-A 2008-8750, though not related to fuel cells, discloses a technique for measuring the amount of hydrogen peroxide based on impedance semicircles.

Naoki Ito, et al. disclosed fuel-cell analysis results based on impedance semicircles (2008. Electrochemical analysis of hydrogen membrane fuel cells. *Journal of Power Sources*, 185, pp. 922-926.) (Non-Patent Document 1). This document discloses analysis of the electrochemical characteristics of hydrogen membrane fuel cells (HMFCs). FIGS. 1(b) and (c) of this document are diagrams related to anode hydrogen concentrations, cathode oxygen concentrations, and impedance semicircles.

PRIOR ART DOCUMENT

Patent Document

Patent Document 1: JP-A 2009-4180
Patent Document 2: JP-A 2008-8750
Non-Patent Document 1: Naoki Ito, et al. disclosed fuel-cell analysis results based on impedance semicircles (2008.

SUMMARY OF THE INVENTION

Technical Problem

Precise system control based on hydrogen concentration should preferably be through the exact knowledge of the hydrogen concentration inside a fuel cell. Thus, there has been a demand for a practical technique for knowing the hydrogen concentration inside a fuel cell.

As a result of our study and research, we, the present inventors, discovered that there is so strong a correlation between impedance semicircles and the hydrogen concentration of a fuel cell that the correlation can be used for hydrogen concentration estimation. Our further study allowed us to conceive the idea of a hydrogen concentration estimating apparatus which is capable of estimating the hydrogen concentration inside a fuel cell based on the correlation between impedance semicircles and hydrogen concentrations.

Our study on the above correlation also led to the discovery of conditions that can increase the accuracy of the hydrogen concentration estimation which is based on the correlation.

An object of the present invention is to provide an apparatus for estimating fuel-cell hydrogen concentration and a fuel cell system which are capable of estimating the hydrogen concentration of a fuel cell based on the correlation between impedance semicircles and hydrogen concentrations.

Another object of the present invention is to provide a fuel cell system capable of precise control according to the hydrogen concentration inside a fuel cell.

Solution to Problem

To achieve the above-mentioned purpose, a first aspect of the present invention is a hydrogen concentration estimating apparatus for a fuel cell that includes an anode and a cathode and generates electric power by the anode receiving hydrogen and the cathode receiving oxygen, the apparatus comprising:
measuring means for measuring impedance or admittance of the fuel cell; and
estimating means for estimating a hydrogen concentration inside the fuel cell based on a measured value measured by the measuring means such that the hydrogen concentration is estimated to be relatively low when an impedance semicircle of the fuel cell is relatively large.

To achieve the above-mentioned purpose, a second aspect of the present invention is a hydrogen concentration estimating apparatus for a fuel cell that includes an anode and a cathode and generates electric power by the anode receiving hydrogen and the cathode receiving oxygen, the apparatus comprising:
measuring means for measuring impedance of the fuel cell;
means for acquiring a real-part impedance value of the fuel cell based on the measured impedance; and
estimating means for estimating a hydrogen concentration of the fuel cell to be equal to or lower than a given hydrogen concentration value when the real-part impedance value acquired is equal to or greater than a given value.

To achieve the above-mentioned purpose, a third aspect of the present invention is a hydrogen concentration estimating apparatus for a fuel cell that includes an anode and a cathode and generates electric power by the anode receiving hydrogen and the cathode receiving oxygen, the apparatus comprising:
measuring means for measuring impedance of the fuel cell;

means for acquiring an imaginary-part impedance value of the fuel cell based on the measured impedance; and estimating means for estimating a hydrogen concentration of the fuel cell to be equal to or lower than a given hydrogen concentration value when an absolute value of the imaginary-part impedance value acquired is equal to or greater than a given value.

To achieve the above-mentioned purpose, a fourth aspect of the present invention is a hydrogen concentration estimating apparatus for a fuel cell that includes an anode and a cathode and generates electric power by the anode receiving hydrogen and the cathode receiving oxygen, the apparatus comprising:

measuring means for measuring impedance of the fuel cell;

curve fitting means for obtaining a fitted impedance frequency characteristic curve in a complex plane based on the measured impedance;

curve parameter acquiring means for acquiring a curvature or a radius of curvature of the fitted curve, a length of the fitted curve, or a value of the fitted curve correlated to the curvature, the radius of curvature, or the length of the fitted curve; and estimating means for estimating a hydrogen concentration of the fuel cell based on the acquired curvature, radius of curvature, length, or correlated value.

To achieve the above-mentioned purpose, a fifth aspect of the present invention is a hydrogen concentration estimating apparatus for a fuel cell that includes an anode and a cathode and generates electric power by the anode receiving hydrogen and the cathode receiving oxygen, the apparatus comprising:

measuring means for measuring I-V tangent resistance of the fuel cell; and estimating means for estimating a hydrogen concentration of the fuel cell based on the measured I-V tangent resistance.

To achieve the above-mentioned purpose, a sixth aspect of the present invention is a hydrogen concentration estimating apparatus for a fuel cell that includes an anode and a cathode and generates electric power by the anode receiving hydrogen and the cathode receiving oxygen, the apparatus comprising:

measuring means for measuring impedance, admittance, or I-V tangent resistance of the fuel cell;

storing means for storing hydrogen concentration characteristics that specify a relationship between the impedance, admittance, or I-V tangent resistance of the fuel cell and a hydrogen concentration inside the fuel cell; and estimate-value calculating means for calculating a estimate value of a hydrogen concentration inside the fuel cell by examining the measured impedance, admittance, or I-V tangent resistance based on the hydrogen concentration characteristics.

A seventh aspect of the present invention is the hydrogen concentration estimating apparatus according to any one of the first to fourth aspects and the sixth aspect, further comprising biasing means for applying a bias to the fuel cell during impedance measurement by the measuring means, such that a voltage of the fuel cell becomes less than an OCV (open circuit voltage) of the fuel cell and such that a bias voltage becomes equal to or greater than a given voltage or a bias current becomes equal to or less than a given current.

A eighth aspect of the present invention is the hydrogen concentration estimating apparatus according to the seventh aspect, further comprising:

OCV acquiring means for acquiring the OCV of the fuel cell; and bias correcting means for correcting the bias applied by the biasing means to the fuel cell based on the acquired OCV.

A ninth aspect of the present invention is the hydrogen concentration estimating apparatus of any one of the first to fourth aspects and the sixth aspect, further comprising:

OCV acquiring means for acquiring an OCV of the fuel cell;

target bias calculating means for calculating a target bias voltage by subtracting a given value from the acquired OCV; and target bias applying means for applying a bias to the fuel cell based on the target bias voltage during impedance measurement by the measuring means.

A tenth aspect of the present invention is the hydrogen concentration estimating apparatus of any one of the first to fourth aspects and the sixth aspect, further comprising specific-bias applying means for applying a bias voltage or a bias current to the fuel cell during impedance measurement by the measuring means, the bias voltage or the bias current being of a value that allows an impedance frequency characteristic curve of the fuel cell obtained within a low frequency range to substantially take the form of one semicircle in a complex plane.

A eleventh aspect of the present invention is the hydrogen concentration estimating apparatus according to the tenth aspect, wherein the low frequency range is from 100 Hz to 0.1 Hz.

A twelfth aspect of the present invention is the hydrogen concentration estimating apparatus according to the sixth aspect or the seventh aspect, wherein the measuring means includes:

means for measuring an electric current and a voltage of the fuel cell;

means for calculating, based on the measured electric current and voltage, a slope of a particular portion of an I-V curve of the fuel cell, the particular portion being close to an OCV; and means for calculating the I-V tangent resistance based on the calculated slope.

A thirteenth aspect of the present invention is the hydrogen concentration estimating apparatus according to any one of the first to twelfth aspects, further comprising means for detecting or estimating a moisture content inside the fuel cell, wherein the estimating means estimates a hydrogen concentration inside the fuel cell based on both of a value measured by the measuring means and the moisture content detected or estimated.

A fourteenth aspect of the present invention is the hydrogen concentration estimating apparatus according to any one of the first to thirteenth aspects, wherein the fuel cell is a proton exchange membrane fuel cell.

To achieve the above-mentioned purpose, a fifteenth aspect of the present invention is a fuel cell system comprising:

a fuel cell including:

a first unit cell having an anode gas channel and adapted to generate electric power by the anode gas channel receiving hydrogen; and a second unit cell having an anode gas channel and adapted to generate electric power by the anode gas channel receiving hydrogen; and the hydrogen concentration estimating apparatus of any one of the first to thirteenth aspects, wherein pressure loss is larger in the anode gas channel of the second unit cell than in the anode gas channel of the first unit cell, wherein the measuring means of the hydrogen concentration estimating apparatus measures impedance, admittance, or I-V tangent resistance of the second unit cell, and wherein the estimating means of the hydrogen concentration estimating apparatus estimates a hydrogen concentration of the second unit cell based on the measured impedance, admittance, or I-V tangent resistance.

A sixteenth aspect of the present invention is the fuel cell system according to the fifteenth aspect,
wherein the fuel cell has an exit manifold connected to each exit of the anode gas channels of the first and second unit cells,
wherein the system further comprises a valve connected to an exit of the exit manifold, and
wherein a junction between the exit of the anode gas channel of the second unit cell and the exit manifold is smaller in cross section than a junction between the exit of the anode gas channel of the first unit cell and the exit manifold.

To achieve the above-mentioned purpose, a seventeenth aspect of the present invention is a fuel cell system comprising:
a fuel cell; and
the hydrogen concentration estimating apparatus of any one of the first to thirteenth aspects,
wherein the fuel cell comprises:
a plurality of unit cells each including an anode gas channel having an entrance and an exit and each adapted to generate electric power by the anode gas channel receiving hydrogen;
a first manifold connected to the entrances of the anode gas channels of a first group of unit cells among the plurality of unit cells;
a second manifold connected to the exits of the anode gas channels of a second group of unit cells among the plurality of unit cells; and
a third manifold connected to the exits of the anode gas channels of the first group of unit cells and to the entrances of the anode gas channels of the second group of unit cells,
wherein the measuring means of the hydrogen concentration estimating apparatus measures impedance, admittance, or I-V tangent resistance of at least one of the second group of unit cells, and
wherein the estimating means of the hydrogen concentration estimating apparatus estimates a hydrogen concentration of the at least one of the second group of unit cells based on the measured impedance, admittance, or I-V tangent resistance.

A eighteenth aspect of the present invention is the fuel cell system according to the seventeenth aspect,
wherein the plurality of unit cells each have a flat shape,
wherein the plurality of unit cells each include a cathode gas channel having an entrance and an exit and arranged in a particular direction relative to the anode gas channels,
wherein the fuel cell is constructed by stacking the plurality of unit cells of the flat shape such that the entrances of the cathode gas channels of the plurality of unit cells are aligned and such that exits of the cathode gas channels of the plurality of unit cells are aligned, and
wherein the third manifold includes:
a first section connected to the exits of the anode gas channels of the first group of unit cells;
a second section connected to the entrances of the anode gas channels of the second group of unit cells; and
a dummy channel, located between the first group of unit cells and the second group of unit cells, for connecting the first section and the second section such that the anode gas channels of the first group of unit cells and the anode gas channels of the second group of unit cells face a same direction.

To achieve the above-mentioned purpose, a nineteenth aspect of the present invention is a fuel cell system comprising:
a fuel cell stack including:
a unit cell stack formed by stacking a plurality of unit cells each having an anode and a cathode and each adapted to generate electric power by the anode receiving hydrogen and the cathode receiving oxidant gas; and
a positive-side endplate and a negative-side endplate for sandwiching the unit cell stack; and
the hydrogen concentration estimating apparatus of any one of the first to thirteenth aspects,
wherein the unit cell stack includes an end-side unit cell that is located closest to the negative-side endplate,
wherein the measuring means of the hydrogen concentration estimating apparatus measures impedance, admittance, or I-V tangent resistance of the end-side unit cell, and
wherein the estimating means of the hydrogen concentration estimating apparatus estimates a hydrogen concentration of the end-side unit cell based on the measured impedance, admittance, or I-V tangent resistance.

To achieve the above-mentioned purpose, a twentieth aspect of the present invention is a fuel cell system comprising:
a fuel cell including:
an electricity-generating assembly having an anode and an electrolyte, the anode being attached to a surface of the electrolyte; and
an anode gas channel provided on an anode-side surface of the electricity-generating assembly;
local electrical characteristic measuring means for measuring a current value and a voltage value of a particular portion of the electricity-generating assembly on the anode gas channel; and
the hydrogen concentration estimating apparatus of any one of the first to thirteenth aspects,
wherein the measuring means of the hydrogen concentration estimating apparatus measures impedance, admittance, or I-V tangent resistance of the particular portion based on the measured current value or voltage value and
wherein the estimating means of the hydrogen concentration estimating apparatus estimates a hydrogen concentration of the particular portion based on the measured impedance, admittance, or I-V tangent resistance.

To achieve the above-mentioned another purpose, a twenty-first aspect of the present invention is a fuel cell system comprising:
a fuel cell including an anode and a cathode and adapted to generate electric power by the anode receiving hydrogen and the cathode receiving oxygen;
a system peripheral device connected to the fuel cell;
control means for controlling the system peripheral device; and
the hydrogen concentration estimating apparatus of any one of the first to thirteenth aspects,
wherein the hydrogen concentration estimating apparatus estimates a hydrogen concentration of the fuel cell and
wherein the control means includes means for controlling the system peripheral device based on the hydrogen concentration estimated by the hydrogen concentration estimating apparatus.

To achieve the above-mentioned another purpose, a twenty-second aspect of the present invention is a fuel cell system comprising:
a fuel cell including an anode and a cathode and adapted to generate electric power by the anode receiving hydrogen and the cathode receiving oxygen;

a system peripheral device connected to the fuel cell;

measuring means for measuring impedance or I-V tangent resistance of the fuel cell; and control means for controlling the system peripheral device, wherein the control means includes power generation control means for controlling the system peripheral device based on the measured impedance or I-V tangent resistance, such that an amount of power generated by the fuel cell decreases or power generation by the fuel cell is stopped when an absolute value, a real-part value, or an absolute imaginary-part value of the measured impedance of the fuel cell or the measured I-V tangent resistance of the fuel cell is equal to or greater than a given value.

To achieve the above-mentioned another purpose, a twenty-third aspect of the present invention is a fuel cell system comprising:

a fuel cell including an anode and a cathode and adapted to generate electric power by the anode receiving hydrogen and the cathode receiving oxygen;

a purge mechanism for purging the anode of the fuel cell;

measuring means for measuring impedance or I-V tangent resistance of the fuel cell; and purge control means for controlling the purge mechanism based on the measured impedance or I-V tangent resistance, such that the purge is performed when an absolute value, a real-part value, or an absolute imaginary-part value of the measured impedance of the fuel cell or the measured I-V tangent resistance of the fuel cell is equal to or greater than a given value.

A twenty-fourth aspect of the present invention is the fuel cell system according to the twenty-third aspect, wherein the pure control means controls the purge mechanism such that the purge is terminated when the absolute value, the real-part value, or the absolute imaginary-part value of the measured impedance or the measured I-V tangent resistance becomes lower than the given value during the purge.

To achieve the above-mentioned another purpose, a twenty-fifth aspect of the present invention is a fuel cell system comprising:

a fuel cell including an anode and a cathode and adapted to generate electric power by the anode receiving hydrogen and the cathode receiving oxygen;

a system peripheral device connected to the fuel cell;

control means for controlling the system peripheral device;

measuring means for measuring impedance of the fuel cell;

curve fitting means for obtaining a fitted impedance frequency characteristic curve in a complex plane based on the measured impedance; and curve parameter acquiring means for acquiring a curvature, a radius of curvature, or a length of the fitted curve or a value of the fitted curve correlated to the curvature, the radius of curvature, or the length, wherein the control means includes power generation adjusting means for adjusting a power generation state of the fuel cell based on comparison of the curvature, the radius of curvature, the length, or the value against a given reference value.

To achieve the above-mentioned another purpose, a twenty-sixth aspect of the present invention is a fuel cell system comprising:

a fuel cell including an anode and a cathode and adapted to generate electric power by the anode receiving hydrogen and the cathode receiving oxygen;

a purge mechanism for purging the anode of the fuel cell;

measuring means for measuring impedance of the fuel cell;

curve fitting means for obtaining a fitted impedance frequency characteristic curve in a complex plane based on the measured impedance;

curve parameter acquiring means for acquiring a curvature, a radius of curvature, or a length of the fitted curve or a value of the fitted curve correlated to the curvature, the radius of curvature, or the length; and purge control means for controlling the purge mechanism based on comparison of the curvature, the radius of curvature, the length, or the value against a given reference value.

To achieve the above-mentioned another purpose, a twenty-seventh aspect of the present invention is a fuel cell system comprising:

a fuel cell including an anode and a cathode and adapted to generate electric power by the anode receiving hydrogen and the cathode receiving oxygen;

a system peripheral device connected to the fuel cell;

control means for controlling the system peripheral device; and measuring means for measuring an impedance phase of the fuel cell, wherein the control means includes power generation adjusting means for adjusting a power generation state of the fuel cell based on a phase difference between the impedance phase measured by the measuring means and a given impedance phase.

To achieve the above-mentioned another purpose, a twenty-eighth aspect of the present invention is a fuel cell system comprising:

a fuel cell including an anode and a cathode and adapted to generate electric power by the anode receiving hydrogen and the cathode receiving oxygen;

a purge mechanism for purging the anode of the fuel cell;

measuring means for measuring an impedance phase of the fuel cell; and purge control means for controlling the purge mechanism based on a phase difference between the impedance phase measured by the measuring means and a given impedance phase.

Advantageous Effects of Invention

In accordance with the first aspect of the present invention, the hydrogen concentration inside a fuel cell can be estimated based on the impedance or admittance (i.e., its reciprocal) of the fuel cell. In a fuel cell, there is a correlation between the hydrogen concentration inside the cell and its impedance semicircles: the lower the hydrogen concentration, the larger the impedance semicircles. When the impedance or admittance of the fuel cell is of a value that corresponds to a large impedance semicircle, the hydrogen concentration inside the fuel cell can be estimated to be relatively low based that correlation. Accordingly, it is possible to estimate the hydrogen concentration inside a fuel cell based on the impedance or admittance of the fuel cell.

In accordance with the second aspect of the present invention, a judgment can be made as to whether or not the hydrogen concentration of a fuel cell is equal to or less than a given hydrogen concentration, with the use of the real part of the impedance of the fuel cell. Because of the above correlation, it is possible to compare the real part of the impedance of the fuel cell against a given value, thereby estimating the relationship of the hydrogen concentration corresponding to that given value relative to the hydrogen concentration of the fuel cell.

In accordance with the third aspect of the present invention, the hydrogen concentration of a fuel cell can be estimated based on the imaginary part of the impedance of the fuel cell. The use of the imaginary part of the impedance allows a more accurate hydrogen concentration estimation than the use of the real part of the impedance.

In accordance with the fourth aspect of the present invention, a fitted impedance frequency characteristic curve (i.e., impedance semicircle) is obtained so that its curvature or radius of curvature can be acquired. The curvature or radius of curvature of this impedance semicircle can be used for hydrogen concentration estimation. This allows a more precise use of the correlation between hydrogen concentrations and impedance semicircles, thereby achieving an accurate hydrogen concentration estimation.

In accordance with the fifth aspect of the present invention, the hydrogen concentration inside a fuel cell can be estimated. There is a correlation between the real part of impedance and the absolute value of the slope of a tangent to the I-V curve of the fuel cell (also referred to as the "I-V tangent resistance"). Thus, there is also a correlation between the hydrogen concentration inside the fuel cell and the I-V tangent resistance. Accordingly, the I-V tangent resistance can be used for estimation of the hydrogen concentration of the fuel cell.

In accordance with the sixth aspect of the present invention, the storing means stores the relationship (hydrogen concentration characteristics) between the impedance, admittance, or I-V tangent resistance of a fuel cell and the hydrogen concentration inside the fuel cell. In accordance with the sixth aspect of the present invention, once the impedance, admittance, or I-V tangent resistance of the fuel cell is measured, the hydrogen concentration inside the fuel cell can be calculated based on the stored hydrogen concentration characteristics.

The seventh aspect of the present invention leads to the following advantage. We found that the clarity of the correlation between hydrogen concentrations and impedance semicircles depends on fuel-cell bias conditions. Too low a bias voltage or too high a bias current results in reduced accuracy of hydrogen concentration estimation. In accordance with the seventh aspect of the present invention, a bias to be applied to a fuel cell can be adjusted during impedance measurement such that the fuel cell receives a bias voltage equal to or greater than a given voltage or a bias current equal to or less than a given current. This ensures the accuracy of hydrogen concentration estimation.

In accordance with the eighth aspect of the present invention, a bias to be applied during impedance measurement can be kept suitable for hydrogen concentration estimation even if the fuel-cell OCV changes.

In accordance with the ninth aspect of the present invention, it is possible to adjust a bias to be applied to a fuel cell during impedance measurement based on changes in OCV.

In accordance with the tenth aspect of the present invention, impedance measurement can be performed under the condition that allows the correlation between hydrogen concentrations and impedance semicircles to appear clearly. As a result, impedance-based hydrogen concentration estimation can be performed with high accuracy.

In accordance with the eleventh aspect of the present invention, impedance measurement can be performed under the condition that allows the correlation between hydrogen concentrations and impedance semicircles to appear clearly at the low frequency range of 100 Hz to 0.1 Hz.

In accordance with the twelfth aspect of the present invention, an I-V tangent resistance, which serves as another basis for hydrogen concentration estimation, can be obtained based on the slope of a particular section of an I-V curve, which section is close to the OCV. As a result, hydrogen concentration estimation based on the I-V tangent resistance can be performed with high accuracy.

In accordance with the thirteenth aspect of the present invention, the influence of the moisture content of a fuel cell can be taken into account for hydrogen concentration estimation. The moisture content of a fuel cell affects how its impedance semicircles appear. The thirteenth aspect of the present invention prevents the accuracy of hydrogen concentration estimation from decreasing due to the influence of the moisture content.

In accordance with the fourteenth aspect of the present invention, it is possible to estimate the hydrogen concentration of a proton exchange membrane fuel cell.

In accordance with the fifteenth aspect of the present invention, the hydrogen concentration of a low hydrogen concentration section of a fuel cell can be precisely known. While the fuel cell of the fifteenth aspect of the present invention generates power, the hydrogen concentration of the anode gas channel of the second unit cell becomes relatively low due to the pressure loss difference between the anode gas channels of the first and second unit cells. By the hydrogen concentration estimating apparatus of the fifteenth aspect of the present invention performing hydrogen concentration estimation on the second unit cell, the hydrogen concentration of the second unit cell, i.e., a low hydrogen concentration section, can be estimated.

In accordance with the sixteenth aspect of the present invention, a gas-channel cross-sectional area at the exit of the anode gas channel of the second unit cell is relatively small. Thus, when the valve is opened to discharge the gas inside the exit manifold, it is possible to increase the gas flow rate at the exit of the anode gas channel of the second unit cell. As a result, when the valve is opened, gas can be discharged also from the inside of the second unit cell. Therefore, it is possible to effectively purge the second unit cell which tends to have a low hydrogen concentration.

In accordance with the seventeenth aspect of the present invention, the hydrogen concentration of a low hydrogen concentration section of a fuel cell can be precisely known. The third manifold connects the exits of the anode gas channels of the first group of unit cells to the entrances of the anode gas channels of the second group of unit cells. As a result, the hydrogen concentrations inside the anode gas channels of the second group of unit cells are relatively low. In accordance with the seventeenth aspect of the present invention, the hydrogen concentration estimating apparatus performs hydrogen concentration on the second group of unit cells. This allows estimation of the hydrogen concentration of a low hydrogen concentration section, i.e., the second group of unit cells.

The eighteenth aspect of the present invention allows the direction of the anode-side hydrogen flow and the direction of the cathode-side oxidant flow to be the same among the first group of unit cells and the second group of unit cells of the seventeenth aspect of the present invention.

In accordance with the nineteenth aspect of the present invention, it is possible to accurately estimate the hydrogen concentration of a unit cell that tends to have a large amount of residual water, among the unit cells constituting a fuel cell.

In accordance with the twentieth aspect of the present invention, it is possible to estimate the hydrogen concentration of a particular portion of a unit cell based on an electrically measured value of the particular portion.

The twenty first aspect of the present invention allows precise control according to the hydrogen concentration inside a fuel cell.

In accordance with the twenty second aspect of the present invention, it is possible to reduce the amount of power generated by a fuel cell or halt its power generation when the hydrogen concentration of the fuel cell is less than the hydrogen concentration corresponding to a reference value.

The twenty third aspect of the present invention allows a precise purge according to the hydrogen concentration of a fuel cell. This in turn allows lack of hydrogen and inefficient fuel consumption to be avoided.

The twenty fourth aspect of the present invention allows the fuel cell system of the twenty third aspect of the present invention to avoid unnecessary purges based on the hydrogen concentration of the fuel cell. As a result, degradation of fuel consumption performance can further be prevented.

In accordance with the twenty fifth aspect of the present invention, it is possible to reduce the amount of power generated by a fuel cell or halt its power generation when the hydrogen concentration of the fuel cell is less than the hydrogen concentration corresponding to a reference value.

The twenty sixth aspect of the present invention allows a precise purge according to the hydrogen concentration of a fuel cell. This in turn allows lack of hydrogen and inefficient fuel consumption to be avoided.

In accordance with the twenty seventh aspect of the present invention, it is possible to reduce the amount of power generated by a fuel cell or halt its power generation when the hydrogen concentration of the fuel cell is less than the hydrogen concentration corresponding to a given phase.

The twenty eighth aspect of the present invention allows a precise purge according to the hydrogen concentration of a fuel cell. This in turn allows lack of hydrogen and inefficient fuel consumption to be avoided.

Figure 1:
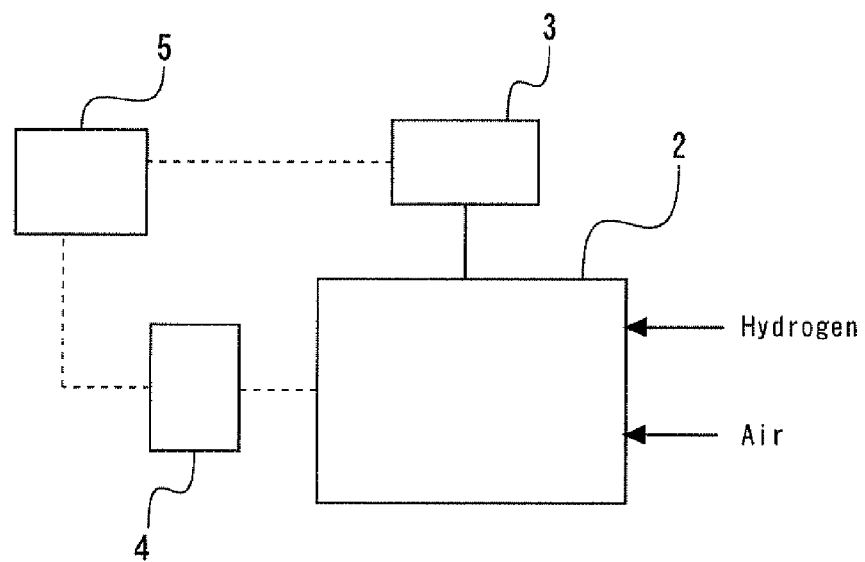
FIG. 1 is a schematic illustrating the configuration of a fuel cell system according to Implementation Example 1 of Embodiment 1 of the present invention.

REFERENCE SIGNS LIST 2 fuel cell
3 impedance measuring instrument
4 load
5 control device
10 fuel cell stack
12,14,16 conduit
20 unit cell
24 down stream area
50 ECU (Electronic Control Unit)
52 ammeter
54 voltmeter
56 purge valve
200,240,264 fuel cell stack
202,244,284 unit cell
204 high-pressure-loss unit cell
210,212,254,256 manifold
214 wad
216,258 exhaust valve
220 ECU
222 impedance measuring instrument
253 lid
255,257 partition board
270 MEGA (Membrane Electrode Gas diffusion layer Assembly)
272 cathode gas channel
274 anode gas channel
275,277,294 cathode-side separator
276,292 anode-side separator
290 dummy channel
300 fuel cell stack
302,304 unit cell
306,308 endplate
312 purge valve
314 air pump
320 ECU
322 impedance measuring instrument
362 countermeasure cell
400 unit cell
404 gas entrance
406 gas exit
420 terminal
422 cable
424 electrode
426 insulating seal
430 impedance measuring instrument
510 fuel cell
512,514 conduit
516 hydrogen pump
518 purge valve
520 impedance measuring instrument
522 ECU
550 hydrogen concentration sensor
600 fuel cell stack
602 unit cell
604 current detection plate
606,608 conduit
620 ECU
800 fuel cell stack
802,804,806 unit cell
810 anode manifold
814 anode entrance valve
816 anode exit valve
822 impedance measuring instrument
910 fuel cell stack
912 bypass conduit
920 unit cell
922 portion
924 exit
930 detection cell

DESCRIPTION OF EMBODIMENTS

Embodiments 1 to 9 of the present invention will now be described.

Embodiment 1 is a basic embodiment with which to implement a hydrogen concentration estimating apparatus according to the present invention and a fuel cell system incorporating the same.

Embodiments 2 to 9 provide fuel cell systems which are based on the hydrogen concentration estimating techniques of Embodiment 1.

Embodiment 1

Implementation Example 1

System Configuration According to Implementation Example 1 of Embodiment 1

FIG. 1 is a schematic illustrating the configuration of a fuel cell system according to Implementation Example 1 of Embodiment 1 of the present invention. The fuel cell system of Implementation Example 1 includes the following components: a fuel cell 2; and an impedance measuring instrument 3 and a load 4, both of which are connected to the fuel cell 2. Also, the fuel cell system has a control device 5 connected to both of the impedance measuring instrument 3 and load 4. The impedance measuring instrument 3 is used to measure the impedance of the fuel cell 2 based on the AC (alternating-current) impedance method.

The fuel cell system of Implementation Example 1 further includes, though not illustrated, a hydrogen source for supplying hydrogen to the fuel cell 2 and an air source for supplying air to the fuel cell 2. The hydrogen source includes a hydrogen supply controller, not illustrated, for controlling the amount of hydrogen supply. Likewise, the air source includes an air supply controller, not illustrated, for controlling the amount of air supply. It is to be noted that the fuel cell system may include a cooling system on an as-needed basis so that the cooling system can cool the fuel cell 2.

The fuel cell 2 includes an anode and a cathode. When the anode receives hydrogen and the cathode receives air, electrochemical reactions will occur between the hydrogen and the oxygen contained in the air, whereby the fuel cell 2 generates electric power. No particular limitation is placed on the configuration of the fuel cell 2. For example, the fuel cell 2 may be a proton exchange membrane fuel cell (PEMFC), a solid oxide fuel cell (SOFC), a hydrogen membrane fuel cell (HMFC), or the like.

The control device 5 is capable of acquiring the impedance of the fuel cell 2 from the impedance measuring instrument 3. The control device 5 incorporates various programs and data storage devices, example of the latter including a RAM, a ROM, and the like. The control device 5 also includes an arithmetic processing unit (e.g., an MPU, a CPU, a microcomputer, or the like). Further, the control device 5 is connected to the foregoing hydrogen supply controller and air supply controller so that the control device 5 can control the operation of those controllers.

The use of the AC impedance method to measure the impedance of a fuel cell and the technique of obtaining impedance values from the measurement result are already known in the art and do not constitute novel features of the present invention. Therefore, the configuration of the impedance measuring instrument 3 and control operations performed by the control device 5 will not be described in detail herein.

Hydrogen Concentration Estimation According to Embodiment 1

Figure 2:
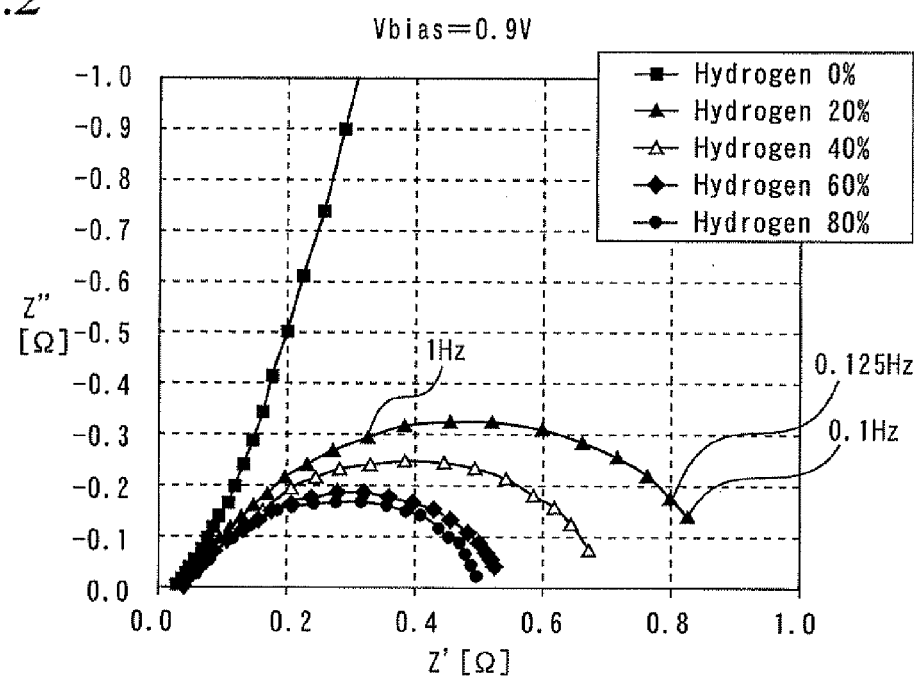
FIG. 2 is a Cole-Cole plot showing the obtained experiment result.

Discussed below are hydrogen concentration estimating methods according to Embodiment 1 of the present invention. The discussion will go through the following subsections (1) to (4).
(1) Experiment and Result Analysis by the Present Inventors
(2) Detailed Methods of Hydrogen Concentration Estimation
(3) Desired Fuel-Cell Bias Conditions for Accurate Estimation
(4) Influences of Moisture Content The hydrogen concentration estimating methods described below allow the fuel cell system of Implementation Example 1 to estimate the hydrogen concentration in the fuel cell 2.
(1) Experiment and Result Analysis by the Present Inventors Before explaining the hydrogen concentration estimating methods in detail, we, the present inventors, will first discuss our experiment and result analyses. FIG. 2 is a Cole-Cole plot (complex plane representation) showing the obtained experiment result (i.e., the result of hydrogen-concentration-varied impedance measurement).

The measurement was performed under the following conditions: a bias voltage Vbias of 0.9 V was applied at an amplitude of 50±mV to a membrane electrode assembly (MEA) of an area of 13 cm$^2$ while varying the frequency of the voltage Vbias from 100 Hz to 0.1 Hz; and air was fed to the cathode of the MEA while a hydrogen-nitrogen mixture was fed to the anode of the MEA with the hydrogen concentration in the mixture gas being varied from 0% to 80%. Under these conditions, the AC impedance method was used to measure the impedance of the MEA on a frequency-by-frequency basis, the result of which is shown by the Cole-Cole plot of FIG. 2.

As known in the art, a curve representing the frequency characteristics of impedance (i.e., a trajectory of impedance values) takes the form of a semicircle in a complex plane. Hereinafter, this semicircle is also referred to as an "impedance semicircle."

FIG. 2 reveals that an impedance semicircle becomes smaller with an increase in the hydrogen concentration, except when the hydrogen concentration is 0%. A decrease in the hydrogen concentration in a fuel cell (specifically, in its anode) during electric power generation will result in subtle changes in overpotential. This overpotential acts to change the size of an impedance semicircle on a Cole-Cole plot. For this reason, an impedance semicircle of FIG. 2 becomes larger with a hydrogen concentration decrease. In other words, the higher the hydrogen concentration, the smaller diameter (hence the smaller radius of curvature or the larger curvature) an impedance semicircle has.

FIG. 2 is an experiment result pertaining to proton exchange membrane fuel cells (PEMFCs). Because other types of fuel cells, such as solid oxide fuel cells (SOFCs) and hydrogen membrane fuel cells (HMFCs), work on the substantially same principle, it seems that the use of such fuel cells would result in the substantially same result as that of FIG. 2.

(2) Detailed Methods of Hydrogen Concentration Estimation

The above experiment has led us to the idea that the correlation between impedance semicircles and hydrogen concentrations can be applied to the estimation of the hydrogen concentration in a fuel cell, and we have found some desired estimation techniques. The following subsections (i) to (iv) discuss these techniques. By performing at least one of the techniques described in the subsections (i) to (iv), the control device 5 can estimate the hydrogen concentration in the fuel cell 2.
(i) The Real Part Z' or Imaginary Part Z" of Impedance As shown in FIG. 2, the lower the hydrogen concentration, the greater value the real part Z' of impedance takes. Therefore, when a Z' value is greater than a given value, the hydrogen concentration in the fuel cell 2 can be estimated to be equal to or lower than the hydrogen concentration corresponding to that given value.

More specifically, the control device 5 of Implementation Example 1 stores in advance a reference Z' value corresponding to a reference hydrogen concentration. Then, the control device 5 can compare this reference Z' value with a Z' value acquired by the impedance measuring instrument 3. When the acquired Z' value is equal to or greater than the reference Z' value, the control device 5 judges the hydrogen concentration in the fuel cell 2 to be equal to or less than the reference hydrogen concentration. Conversely, when the acquired Z' value is less than the reference Z' value, the control device 5 judges the hydrogen concentration in the fuel cell 2 not to be less than the reference hydrogen concentration, that is, to be greater than the reference hydrogen concentration. The above technique makes it possible to estimate whether the hydrogen concentration in the fuel cell 2 is higher or lower than the reference hydrogen concentration.

For example, see FIG. 2 to note that the rightmost point of each impedance semicircle represents the value obtained when the voltage frequency was 0.1 Hz. When attention is paid to the Z' values of those rightmost points, it can be seen that the Z' values obtained when the hydrogen concentration was 40% or less are plotted to the right of Z'=0.6Ω. By setting the reference Z' value to 0.6Ω, then, it is possible to estimate the hydrogen concentration in the fuel cell 2 to be at least 40% or greater if the Z' value obtained when the frequency is 0.1 Hz is 0.6Ω or less.

As shown in FIG. 2, the imaginary part Z" of impedance also changes in its value according to hydrogen concentrations. Accordingly, it is also possible to estimate the hydrogen concentration in the fuel cell 2 by comparing a measured Z" value with a reference Z" value, as in the case of the real part Z'. As can be seen in FIG. 2, the absolute value |Z"| of the imaginary-part impedance Z" becomes greater with a hydrogen concentration decrease, as with the real part Z'. However, as shown in FIG. 2, the real part Z' takes positive numbers while the imaginary part Z" takes negative numbers; thus, the imaginary part Z" becomes negatively greater with a hydrogen concentration decrease. Therefore, if the imaginary part Z" is to be used, the control device 5 judges the hydrogen concentration in the fuel cell 2 to be equal to or less than a reference hydrogen concentration when a |Z"| value is equal to or greater than a reference |Z"| value.

Specifically, for example, paying attention to the Z" values of FIG. 2 obtained when the frequency was 0.1 Hz reveals that the Z" value obtained when the hydrogen concentration was 40% lies within the Z" range of 0Ω to −0.1Ω. Note also that the Z" value obtained when the hydrogen concentration was 20% is plotted within the Z" range of −0.1Ω to −0.2Ω. For example, by setting the reference |Z"| value to 0.1Ω, it is possible to estimate the hydrogen concentration in the fuel cell 2 to be less than 40% if the |Z"| value obtained when the frequency is 0.1 Hz is equal to or greater than the reference |Z"| value, i.e., 0.1Ω.

It is also possible to create in advance a hydrogen concentration characteristic data map that specifies the correlation between Z' or Z" values and hydrogen concentrations and to store the data map on the control device 5. Using the data map, the control device 5 can perform calculations to estimate the hydrogen concentration in the fuel cell 2 based on the Z' or Z" values. For instance, the data map can define the relationship between Z' values and hydrogen concentrations such that the hydrogen concentration in the fuel cell 2 becomes smaller with a Z' value increase. Also, the data map can define the relationship between Z" values and hydrogen concentrations such that the hydrogen concentration in the fuel cell 2 becomes smaller with an increase in the absolute value |Z"| of the imaginary part Z". The relationship between Z' or Z" values and hydrogen concentrations can be expressed in the form of a curve, straight line, stepped line, or line graph.

(ii) The Radius of Curvature ρ, Curvature k, or Other Parameters of an Impedance Semicircle As can be seen in FIG. 2, an impedance semicircle gradually becomes larger with a hydrogen concentration decrease. Thus, it is also possible to perform hydrogen concentration estimation using the radius of curvature ρ or curvature k of an impedance semicircle. In other words, the control device 5 may store in advance a reference ρ or k value which corresponds to a reference hydrogen concentration. Alternatively, the control device 5 may store a hydrogen concentration characteristic data map in which the ρ or k values of impedance semicircles are correlated to hydrogen concentrations.

The control device 5, in this case, includes a curve fitting program for obtaining fitted curves (i.e., approximate curves) of impedance semicircles. This allows the control device 5 to obtain a fitted curve of an impedance semicircle by performing calculations based on one or more impedance values, for example four impedance values, acquired by the impedance measuring instrument 3. Then, the control device 5 can obtain the radius of curvature ρ or curvature k of the fitted curve based on the result of the curve fitting. Thereafter, the control device 5 can compare the radius of curvature ρ or curvature k against a reference value or against the values in the data map. This method allows a more precise use of the correlation between hydrogen concentrations and impedance semicircles, which leads to a highly accurate estimation of the hydrogen concentration in the fuel cell 2.

The curve fitting program can be selected from among various known programs although the calculation process may slightly differ from program to program. Those programs, however, are basically the same in that the curve fitting process requires calculations of some parameters related to the shapes or sizes of curves to be fitted. Such parameters have a correlation with the sizes or shapes of impedance semicircles as the radius of curvature ρ and curvature k do. Therefore, those parameters correlated to impedance semicircles can also be used for hydrogen concentration estimation.

(iii) The I-V Tangent Resistance of the Fuel Cell

Figure 3:
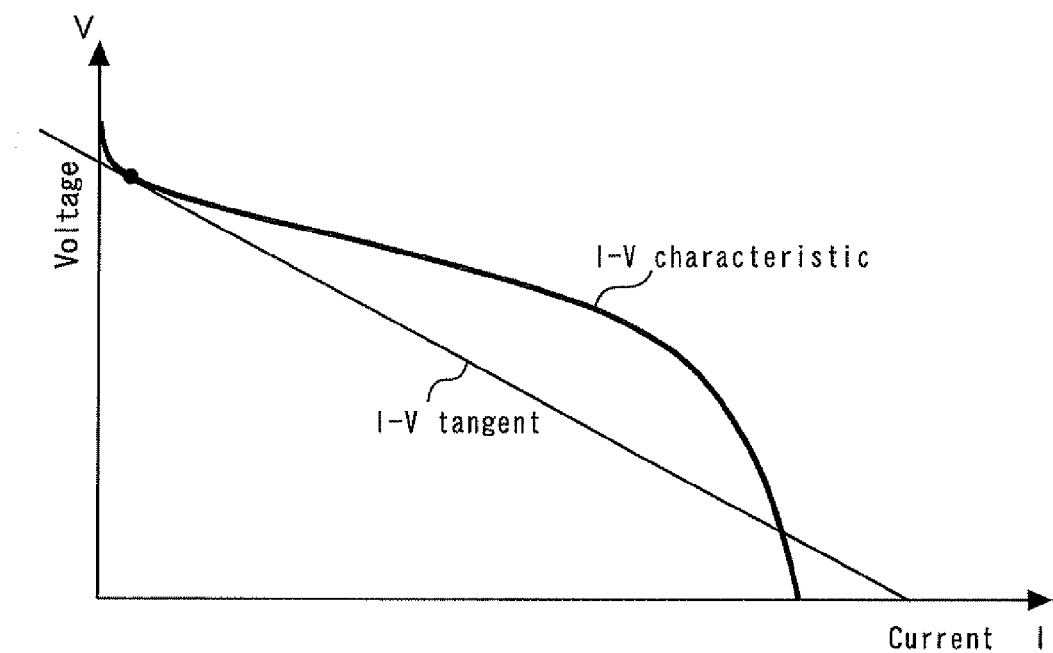
FIG. 3 is a graph showing the current-voltage characteristic curve of a fuel cell and an I-V tangent.

FIG. 3 is a graph showing the current-voltage characteristic curve of a fuel cell (hereinafter also referred to as the "I-V curve") and an I-V tangent. In Embodiment 1, a tangent line to the I-V curve at a given point, such as the one shown in FIG. 3, is referred to as the "I-V tangent" at that given point. Note also that the absolute value of the slope of the I-V tangent is herein referred to as the "I-V tangent resistance" and also symbolized as "|ΔV|/|ΔI|." The I-V tangent resistance corresponds to the absolute value of the directional coefficient of the I-V tangent (that is, the absolute value |a| of an "a" value in "y=ax+b," where y=voltage V and x=current I).

There is a correlation between the real part Z' of impedance and the I-V tangent resistance. More specifically, as the real part Z' increases, the slope of the I-V tangent becomes steeper, which increases the I-V tangent resistance. Accordingly, similar to the real part Z' of impedance, it is also possible to use the I-V tangent resistance as another hydrogen concentration estimating technique of the Embodiment 1.

The I-V tangent resistance can be obtained by the control device 5 executing the following procedure. The first step is to connect an ammeter and a voltmeter to the fuel cell 2 so that two points on the I-V curve of the fuel cell 2, i.e., $(V_1, I_1)$ and $(V_2, I_2)$, can be acquired. It is preferred to make the distance (or section) between the two points as small as possible. The control device 5 then obtains |ΔV|/|ΔI| by performing calculations based on the following formula.

$$|\Delta V|/|\Delta I|=|V_1-V_2|/|I_1-I_2|$$

Then, by using |ΔV|/|ΔI| as if to use the real part Z', the control device 5 can perform the hydrogen concentration estimation described in the above subsection (i). It should be noted that |ΔV|/|ΔI| may instead be obtained from three or more points on the I-V curve. In this case, the distance between the two endpoints should preferably be as small as possible. It is also preferred to obtain |ΔV|/|ΔI| using multiple voltages each close to the open circuit voltage (OCV), i.e., very small electric currents.

(iv) Variations (Other Parameters)

As is obvious from FIG. 2, there are also parameters, other than the parameters mentioned in (i) to (iii), that change according to the sizes of impedance semicircles such as the phase θ and the absolute value |Z| of impedance and the arc length L of a fitted curve. Thus, as is similar to the real part Z' of impedance and the like, such parameters can also be used to perform hydrogen concentration estimation based on comparison with a reference value or on a data map.

By performing at least one of the techniques described in the above subsections (i) to (iv), the control device 5 can estimate the hydrogen concentration in the fuel cell 2.

Similar to the technique of the subsection (i), it is also possible to use a hydrogen concentration characteristic data map for the other techniques of the subsections (ii) to (iv) for the purpose of performing hydrogen concentration estimation. That is, the control device 5 can store in advance a hydrogen concentration characteristic data map in which ρ, k, |ΔV|/|ΔI|, |Z|, θ, or L is correlated to hydrogen concentrations. The control device 5 can use this stored data map for performing hydrogen concentration estimation. It should be noted that the use of the imaginary part, absolute value, or phase angle of impedance leads to a more accurate hydrogen concentration estimation than the use of the I-V tangent resistance or the real part of impedance.

(3) Desired Fuel-Cell Bias Conditions for Accurate Estimation

Figure 4:
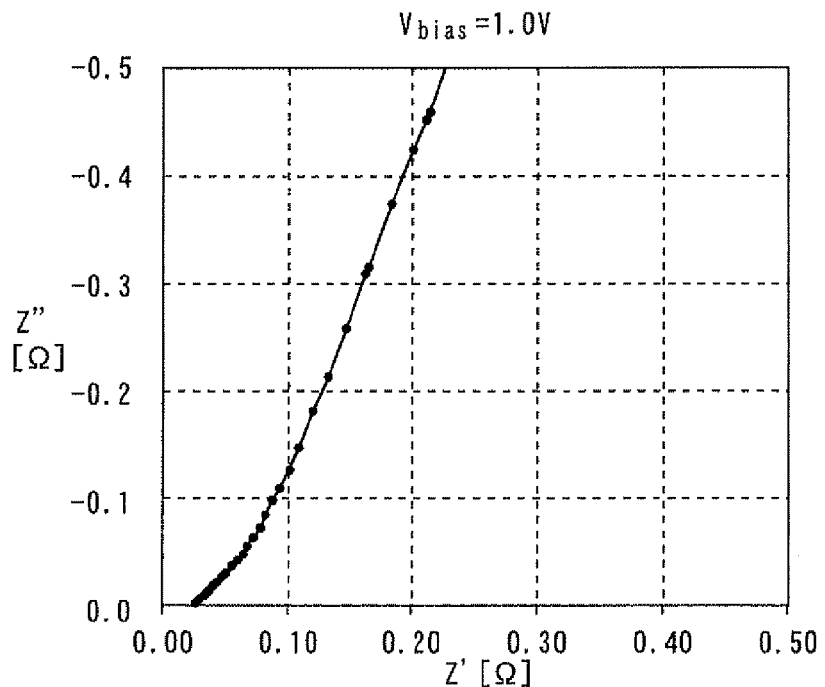
FIG. 4 is a Cole-Cole plot created in a manner similar to FIG. 2, in which the bias voltage applied to a fuel cell was 1.0 V.
Figure 5:
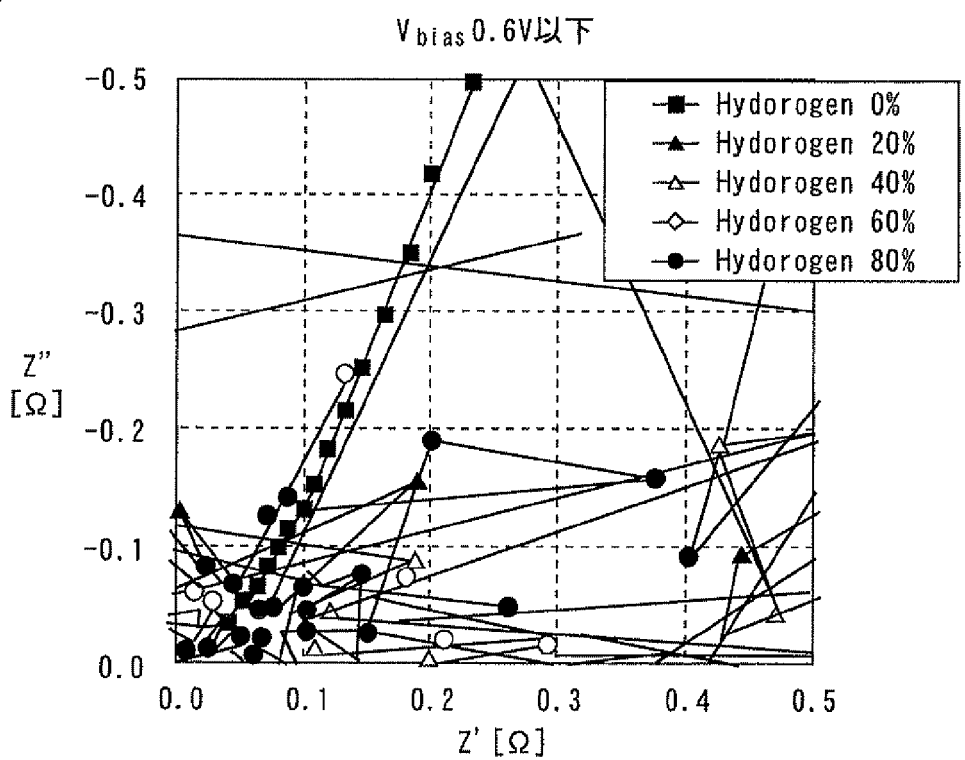
FIG. 5 is a Cole-Cole plots created in a manner similar to FIG. 2, in which the applied bias voltage was 0.6 V or less.

We have also found that the clarity of the correlation between hydrogen concentrations and impedance semicircles depends largely on fuel-cell bias conditions. As stated above, FIG. 2 is a Cole-Cole plot obtained under the AC impedance method in which a bias voltage of 0.9 V was used. We also created several Cole-Cole plots similar to FIG. 2 by changing the bias voltage to values other than 0.9 V. The result revealed that the correlation between hydrogen concentrations and impedance semicircles was easily noticeable when the bias voltage was equal to or greater than 0.6 V but less than 1.0 V (more preferably, equal to or greater than 0.7 V but less than 1.0 V). FIGS. 4 and 5 are Cole-Cole plots created in a manner similar to FIG. 2, in one of which the bias voltage applied to the fuel cell was 1.0 V and in the other of which the applied bias voltage was 0.6 V or less. FIG. 4 was obtained when the applied bias voltage was 1.0 V, which corresponds to the OCV. As shown in FIG. 4, when the bias voltage reaches 1.0 V, no sign of an impedance semicircle was observed. FIG. 5 was obtained when the bias voltage was 0.6 V or less, and no sign whatever of an impedance semicircle was found. However, we suspect that the reason we obtained the result of FIG. 5 is due to the specifications of the impedance measuring instrument we used.

As a result of our intensive study, we have found that a high bias voltage is suitable for performing the hydrogen concentration estimating techniques of Embodiment 1. The reason is explained below.

Figure 6A:
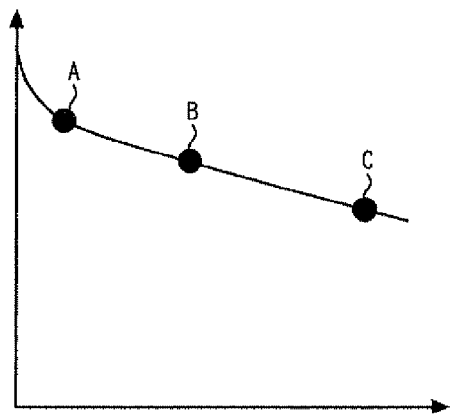
FIGS. 6A and 6B are graphs to illustrate the relationship between the size of an impedance semicircle and the density of an electric current.
Figure 6B:
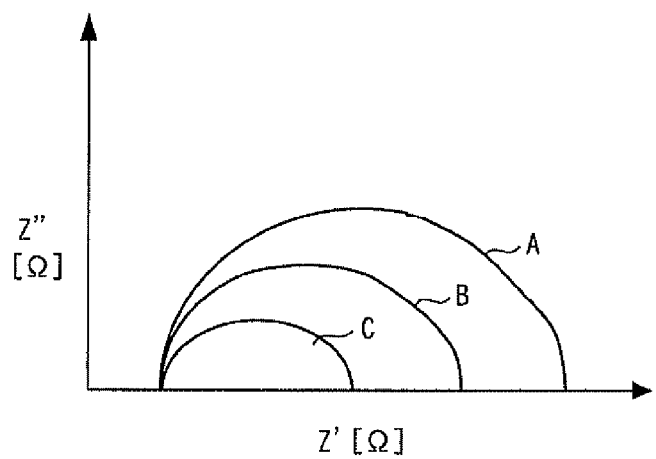

FIGS. 6A and 6B are graphs to illustrate the relationship between the size of an impedance semicircle and the density of an electric current. The points A, B, and C on the I-V curve of FIG. 6A correspond respectively to the impedance semicircles A, B, and C of the Cole-Cole plot of FIG. 6B.

Overpotential is known to be given by the Tafel Equation below and is proportional to the logarithm of electric current I.

$$V = a - b \times \log(I)$$

The representation of the overpotential V by electrical resistance results in the following equation.

$$I \times R = a - b \times \log(I)$$

R decreases with an increase in I. Thus, an impedance semicircle becomes larger with a decrease in the density of electric current. That is, the impedance semicircle A is the largest, followed by the impedance semicircle B as the second largest and the impedance semicircle C as the smallest.

Overpotential changes induced by changes in hydrogen concentration appear as changes in the real part of impedance (i.e., as changes in the resistance within the fuel cell). This produces a correlation between hydrogen concentrations and impedance semicircles. Such overpotential changes are considerably small and can hardly be identified from an I-V curve, for example. However, if such tiny overpotential changes can be identified accurately, hydrogen concentration changes can also be estimated with high accuracy. For that purpose, it is effective to measure and analyze impedance values using such a high bias voltage as leads to a relatively large impedance semicircle.

As stated above, the correlation between impedance semicircles and hydrogen concentrations is derived from tiny overpotential changes induced by changes in hydrogen concentration. When the output electric current of a fuel cell is large, various types of noise, such as the influence of water generated during power generation, resistance overpotential, and concentration overpotential, act to distort impedance semicircles. Such noise can be eliminated sufficiently when the output electric current is sufficiently small, that is, when a relatively high bias voltage is applied.

Putting all this together, the desired bias voltage is a high voltage which leads to less noise and relatively large impedance semicircles.

Therefore, the control device 5 of the fuel cell system of Implementation Example 1 may perform any one of the techniques (i) to (iii) described below.

(i) First Bias Condition

The control device 5 may adjust the bias voltage to be applied to the fuel cell 2 during impedance measurement such that the bias voltage is equal to or greater than a given value. This prevents the bias voltage from becoming excessively small during impedance measurement which is performed for the estimation of the hydrogen concentration in the fuel cell 2. This in turn ensures the accuracy of the hydrogen concentration estimation.

When the bias voltage is set to a high voltage value but less than the OCV, the size differences among impedance semicircles due to hydrogen concentration changes will appear as clearly as in FIG. 2. According to our knowledge, the closer the bias voltage gets to the open circuit voltage (OCV) of the fuel cell, the smoother the arc shape of an impedance semicircle becomes (i.e., less noise is present in the impedance semicircle). Therefore, it is preferred that the bias voltage be less than the OCV but as close to the OCV as possible (for example, the difference between the OCV and the bias voltage be from 0.3 V to 0.1 V or even smaller).

The application of a high bias voltage to a fuel cell can also be achieved by applying a low bias electric current to the fuel cell. Thus, it is also possible to adjust a bias current to be applied to the fuel cell 2 during impedance measurement such that the bias current is equal to or less than a given value. It is preferred that the bias current be as small as possible.

(ii) Bias Correction

The OCV of a fuel cell is not constant and may decrease due, for example, to age-related deterioration of the fuel cell. Accordingly, the control device 5 may periodically detect the OCV of the fuel cell 2 and correct the bias voltage so that the bias voltage can be kept close to the OCV. The OCV can be obtained with the use of a voltmeter (e.g., a cell voltage monitor). With this, the bias voltage to be applied to the fuel cell 2 during impedance measurement can be kept suitable for hydrogen concentration estimation even if the OCV of the fuel cell 2 changes.

The control device 5 may also calculate a target bias voltage by subtracting a given value from the OCV. The control device 5 can use this target bias voltage to adjust, during impedance measurement, the bias voltage or current to be applied to the fuel cell 2. This allows an OCV-based adjustment of the bias voltage or current during impedance measurement. Accordingly, the bias voltage or current can be increased or decreased in response to OCV increase or decrease.

(iii) Second Bias Condition

The foregoing Non-Patent Document 1 (Naoki Ito, et al. (2008). Electrochemical analysis of hydrogen membrane fuel cells. *Journal of Power Sources*, 185, pp. 922-926.) discloses analyses of the electrochemical characteristics of hydrogen membrane fuel cells.

FIGS. 1(b) and (c) of Non-Patent Document 1 each show a measurement result related to anode hydrogen concentrations, cathode oxygen concentrations, and impedance semicircles. The impedance semicircles shown in those figures, however, are quite distorted. Also, for each hydrogen concentration used, two impedance semicircles appear in a low frequency range of 2,000 Hz (2 kHz) or below.

By contrast, the experiment result of FIG. 2 of the present invention shows the presence of discrete impedance semicircles within the frequency range of 100 Hz to 0.1 Hz. In addition, each impedance semicircle has less noise, and its shape is thus clear.

As already stated, the correlation between impedance semicircles and hydrogen concentrations is derived from tiny overpotential changes induced by changes in hydrogen concentration, and noise influences can be eliminated sufficiently by making the fuel-cell output current sufficiently small. By doing so, impedance values obtained within such a low frequency range as in FIG. 2 appear as discrete impedance semicircles in an orderly fashion.

It is thus preferred that the bias voltage or current to be applied to the fuel cell 2 during impedance measurement be high enough in the former or low enough in the latter such that impedance values obtained within a low frequency range can appear as discrete impedance semicircles. This bias value may differ depending on the configuration of a fuel cell for which impedance measurement is performed, but it can be known by actually examining impedance semicircles of that fuel cell. The control device 5 can store such a specific bias value acquired so that the bias voltage or current to be applied to the fuel cell 2 can be adjusted to that value during impedance measurement.

When the bias voltage is higher or the bias current is lower than the above specific bias value, impedance values appear as discrete impedance semicircles. Thus, it is also possible to apply to the fuel cell 2 a bias voltage higher than the specific value or a bias current lower than the specific value.

This makes it possible to perform impedance measurement under the condition that allows hydrogen concentration changes to appear clearly in impedance semicircles. As a result, the control device 5 can perform hydrogen concentration estimation with high accuracy.

It should be noted that AC impedance measurement is often performed within the frequency range of 10 kHz to 0.1 Hz. In contrast, the impedance semicircles of FIG. 2 were, as stated above, obtained within the frequency range of 100 Hz to 0.1 Hz, which is lower than the former range. Accordingly, the foregoing specific bias value can be determined such that impedance values obtained within the low frequency range of 100 Hz to 0.1 Hz can appear as discrete impedance semicircles.

The bias conditions described above result in some marked fuel-cell-specific advantages as stated below.

Fuel cells have a unique issue of deterioration due to low hydrogen concentrations. Thus, the best choice in the case of a low hydrogen concentration would be to avoid increasing the output current of the fuel cell 2. On the other hand, if the bias voltage to be applied during impedance measurement is, as stated above, determined such that the output current of the fuel cell 2 is low, changes of impedance semicircles in response to hydrogen concentration changes will become clearer. In other words, the use of a high bias voltage less than but close to the OCV leads to two advantages: one is increased accuracy of hydrogen concentration estimation, and the other is prevention of fuel cell deterioration.

Further, if the hydrogen concentration inside the fuel cell 2 is judged to be low (i.e., lack of hydrogen), the desired choice would be not to consume much hydrogen. This is achieved by reducing the output current of the fuel cell 2 as in Embodiment 1, which also leads to increased accuracy of hydrogen concentration estimation. In addition, if the density of electric current during power generation is small, flooding is less likely to occur. Even if flooding occurs in that case, it has less noise influence on impedance semicircles.

As above, the bias conditions of Embodiment 1 lead to fuel-cell-specific advantages as well.

As is obvious from the above explanation, it is also preferred that the acquisition of the I-V tangent resistance $|\Delta V|/|\Delta I|$ be through the use of a voltage which is as close to the OCV as possible (i.e., through the use of as small an electric current as possible). Thus, the control device 5 of Implementation Example 1 uses measurement values close to the OCV as the values with which to obtain $|\Delta V|/|\Delta I|$. This also ensures high estimation accuracy and the fuel-cell-specific advantages mentioned above (i.e., prevention of deterioration, reduction in hydrogen consumption, and prevention of flooding).

(4) Influences of Moisture Content

Figure 7:
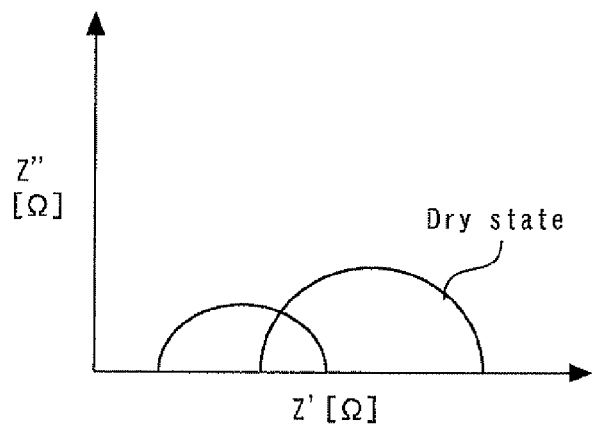
FIG. 7 is a graph to illustrate the influence of the moisture content of a fuel cell on impedance semicircles.

FIG. 7 is a graph to illustrate the influence of the moisture content of a fuel cell on impedance semicircles. When the moisture inside a fuel cell is scarce, i.e., when the fuel cell is in a dry state, its impedance semicircles increase in size and shift along the Z' axis as illustrated in FIG. 7. Thus, it is preferred to correct a reference value and hydrogen concentration characteristic data map to be stored on the control device 5 based on the inner moisture state of the fuel cell 2.

Accordingly, the control device 5 may also store a correlation map in which the moisture state of the fuel cell 2 is correlated to the sizes or Z'-axial positions of impedance semicircles. Using the correlation map, the control device 5 can correct the result of hydrogen concentration estimation or estimated hydrogen concentration values. Since there exist many known techniques for detecting or estimating the moisture content (i.e., water amount or moisture state) of a fuel cell, such techniques will not be discussed herein.

Specific Procedure According to Implementation Example 1 of Embodiment 1

Described below are the specific operations to be performed by the control device 5 of Implementation Example 1. In this section, we describe them assuming two cases: the first is (i) the hydrogen concentration estimation based on the real part Z' of impedance, described above, and the second is (iii) the hydrogen concentration estimation based on the I-V tangent resistance, described above.

(1) Estimation Operations Based on the Real Part Z' of Impedance

Figure 8:
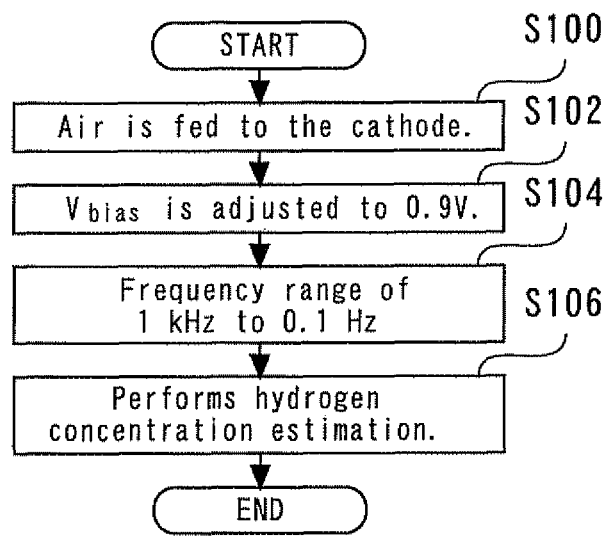
FIG. 8 is a flowchart of a routine executed by a control device of Implementation Example 1 of Embodiment 1.

FIG. 8 is a flowchart of a routine executed by the control device 5 of Implementation Example 1 of Embodiment 1. In Implementation Example 1, the control device 5 executes the routine of FIG. 8 during electric power generation by the fuel cell 2.

The routine starts with Step S100 in which air is fed to the cathode of the fuel cell 2. It is preferred that a copious amount of air be supplied to the cathode. Then, the bias voltage Vbias to be applied to the fuel cell 2 is adjusted to 0.9 V (Step S102). Thereafter, the control device 5 instructs the impedance measuring instrument 3 to perform impedance measurement using the AC impedance method in which voltage is changed at a frequency of 0.1 Hz and at a given amplitude (Step S104). The frequency used in Step S104 is selected in advance from the frequency range of 1 kHz to 0.1 Hz.

Then in Step S106, the control device 5 performs hydrogen concentration estimation using the impedance value obtained during Step S104. In Implementation Example 1, the control device 5 acquires the value of the real part Z' of impedance after Step S104, thereby judging whether the value of the real part Z' is larger than a reference value or not. The above operations constitute the hydrogen concentration estimation based on the real part Z' of impedance.

The following should be noted. In the routine of FIG. 8, the impedance measuring instrument 3 corresponds to the "measuring means" of the foregoing first to sixth aspects of the present invention. The "estimating means" of the first and second aspects of the present invention are implemented by the control device 5 executing Step S106 of FIG. 8. The "means for acquiring a real-part impedance value" of the second aspect of the present invention is implemented by the control device 5 calculating the value of the real part Z' of impedance.

Further, the "specific-bias applying means" of the seventh aspect of the present invention is implemented by the control device 5 executing Step S102 of FIG. 8.

It should also be noted that the calculation process of Step S106 may be changed so that hydrogen concentration estimation can be performed based on any of Z", ρ, k, θ, |Z|, and L, instead of the real part Z'. In that case, the control device 5 can store in advance a calculation program with which to calculate Z", ρ, k, θ, |Z|, or L and a reference value for Z", ρ, k, θ, |Z|, or L. To use Z" which takes negative numbers, its absolute value |Z"| should be compared against a positive reference value. Moreover, in Step S104, the bias voltage Vbias can be set higher or lower than 0.9 V; alternatively, a predetermined low bias current can be used.

Furthermore, Step S102 can be replaced by the bias voltage correction process described in the above subsection of (ii) bias correction.

(2) Estimation Operations Based on |ΔV|/|ΔI|

Figure 9:
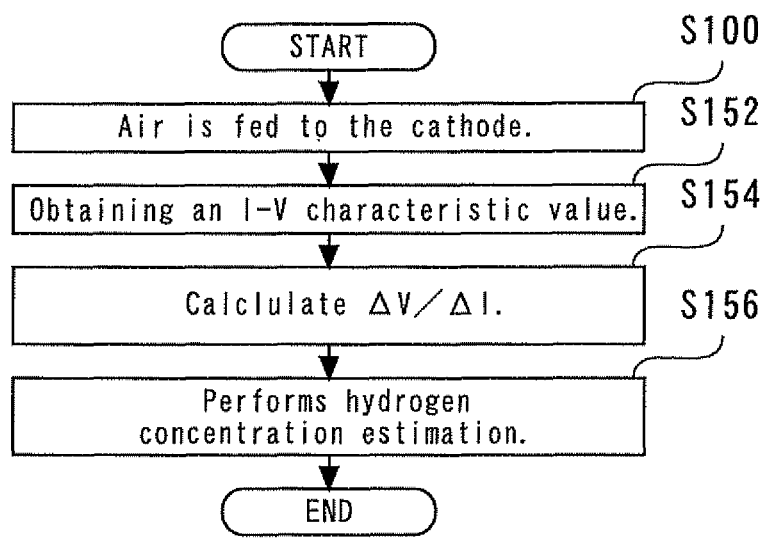
FIG. 9 is a flowchart of another routine executed by a control device of Implementation Example 1 of Embodiment 1.

FIG. 9 is a flowchart of another routine executed by the control device 5 of Implementation Example 1 of Embodiment 1.

The routine of FIG. 9 also starts with Step S100 of air supply to the cathode. Then in Step S152, two points are acquired from the I-V curve of the fuel cell 2. Next in Step S154, these two points are used to calculate |ΔV|/|ΔI|. Step S154 is followed by Step S156 in which the control device 5 performs hydrogen concentration estimation based on the value of |ΔV|/|ΔI|, which involves comparison with a reference value or calculation of an estimate value based on a data map. By the control device 5 executing the above operations, the above-described hydrogen concentration estimation based on (iii) the I-V tangent resistance is implemented.

In the modification of FIG. 9, execution of Steps S152 and S154 leads to implementation of the "measuring means" of the fifth aspect of the present invention.

(3) Another Modification

As another modification, the data storage device of the control device 5 may store a hydrogen concentration characteristic data map in which hydrogen concentrations are correlated to any of Z', |Z"|, ρ, k, θ, |Z|, and L. In Step S106, then, the control device 5 may perform hydrogen concentration estimation based on this data map. In this modification example, the data storage device of the control device 5 corresponds to the "storing means" of the sixth aspect of the present invention. Further, the "estimate-value calculating means" of the sixth aspect of the present invention is implemented by the control device 5 calculating an estimate hydrogen concentration value based on the hydrogen concentration characteristic data map.

Implementation Example 2 of Embodiment 1

System Configuration According to Implementation Example 2 of Embodiment 1

Figure 10A:
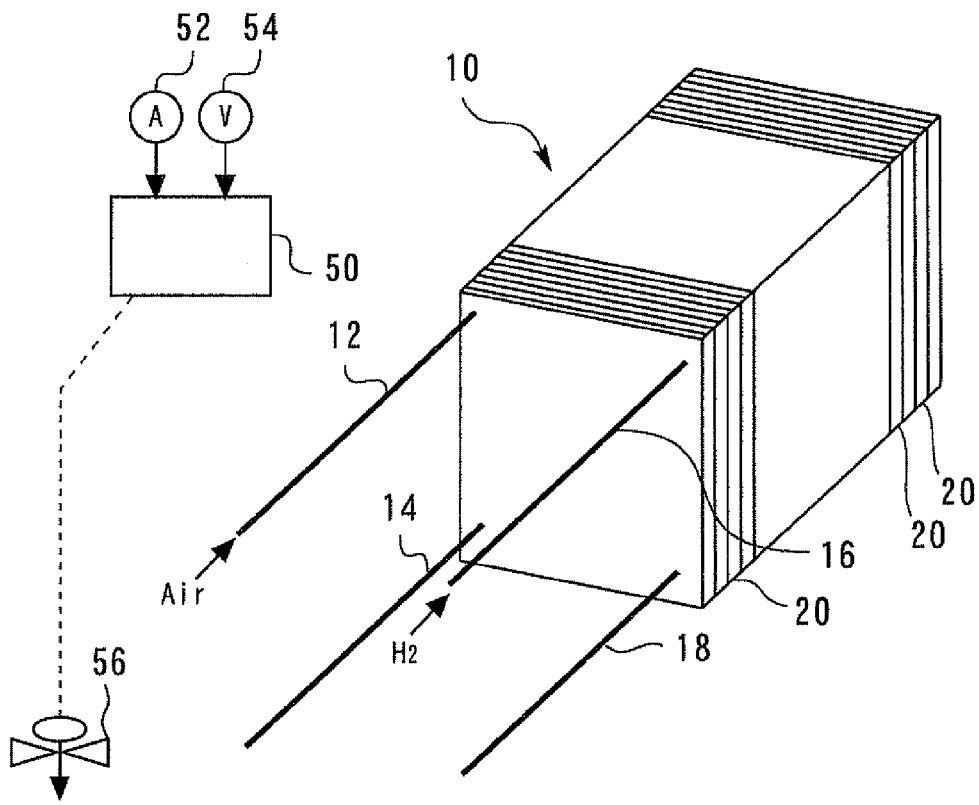
FIG. 10A illustrates the configuration of a fuel cell system of Implementation Example 2 of Embodiment 1.
Figure 10B:
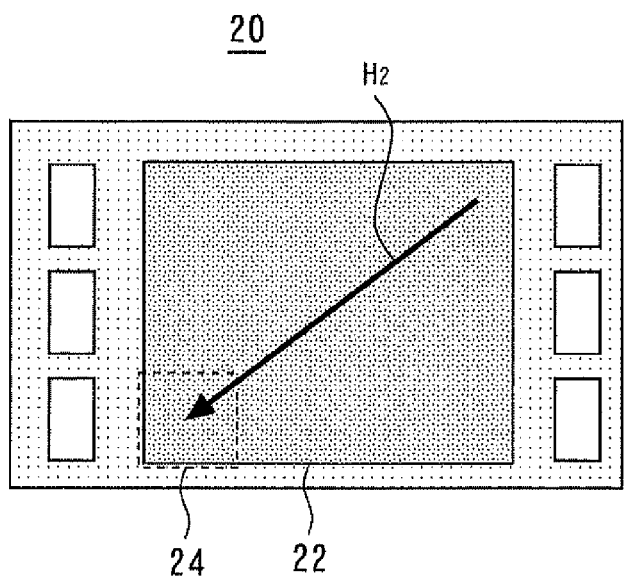
FIG. 10B is a plan view to illustrate the structure of a unit cell of Implementation Example 2 of Embodiment 1.

Described next with reference to FIGS. 10A and 10B is a fuel cell system according to Implementation Example 2 of Embodiment 1. The fuel cell system of this example is suitable for use in a traveling object such as a vehicle or the like. FIG. 10A illustrates the configuration of the fuel cell system of this example. In Implementation Example 2, the above-described hydrogen concentration estimating techniques are applied to a proton exchange membrane fuel cell (PEMFC).

A fuel cell stack 10 includes unit cells 20. Connected to the fuel cell stack 10 are conduits 12, 14, 16, and 18. Air is channeled through the conduit 12 into a cathode manifold (not illustrated) inside the fuel cell stack 10 while hydrogen is channeled through the conduit 14 into an anode manifold (not illustrated) inside the fuel cell stack 10. Anode off-gas and cathode off-gas are channeled through the conduits 16 and 18, respectively. The downstream side of the conduit 16 through which anode-off gas flows is connected to a purge valve 56.

An electronic control unit (ECU) 50 has an ammeter 52 and a voltmeter 54 connected thereto. The ammeter 52 and voltmeter 54 are used to measure the current and voltage, respectively, of the fuel cell stack 10. Similar to the control device 5 of Implementation Example 1, the ECU 50 stores a program for performing impedance measurement according to the AC impedance method. The ECU 50 is capable of performing the measurement using values acquired by the ammeter 52 and voltmeter 54. Techniques of fuel-cell impedance measurement are already known in the art and thus will not be discussed herein.

Though not illustrated, the conduit 12 is connected to air system devices such as an air compressor and the like and has an open distal end which is exposed to the atmosphere. The conduit 16 is, though not illustrated, connected to a hydrogen tank, in which high-pressure hydrogen is stored, via hydrogen system devices such as a regulator and a shutoff valve. The ECU 50 is designed to control these air and hydrogen system devices. The ECU 50 also controls the opening and closing of the purge valve 56.

FIG. 10B is a plan view to illustrate the structure of a unit cell 20. The unit cell 20 houses a membrane electrode assembly (MEA) 22. The MBA 22 is constructed by attaching an electrocatalytic layer on both sides of a proton-conductive solid polymer electrolyte membrane. These electrocatalytic layers include a carrier (e.g., fine carbon particles) on which a catalyst (e.g., platinum) is supported. Stacked on each of the electrode catalytic layers are a gas diffusion layer (e.g., formed from a carbon sheet) and a separator. The arrow of FIG. 10B represents the flow of hydrogen inside the unit cell 20, and the dashed square area of FIG. 10B represents a downstream area 24 of the hydrogen flow inside the unit cell 20. The downstream area 24 is where the hydrogen concentration inside the unit cell 20 tends to be smallest.

The most upper-right unit cell 20 of FIG. 10A is the one located on the furthest downstream side of the hydrogen flow among all the unit cells 20 of the fuel cell stack 10. In this implementation example, this unit cell 20 has a structure which allows local electrical measurement on its downstream area 24. Though not illustrated, the separators of this unit cell 20 are partially insulated, whereby the factional current in the downstream area 24 can be measured. Such local electrical measurement for fuel cells is already known and will not be discussed further.

Commonly, hydrogen concentration is different across the MEA of a unit cell. Also, in a fuel cell stack, a unit cell connected to the manifold downstream side tends to have a lower hydrogen concentration than a unit cell connected to the manifold upstream side. It is therefore preferred to know exactly the hydrogen concentration in a particular portion of the fuel cell stack 10 rather than knowing the average hydrogen concentration of the fuel cell stack 10.

If the hydrogen concentration estimating techniques of Embodiment 1 are performed based on the impedance of a particular portion of a fuel cell, the hydrogen concentration in that particular portion can be estimated locally. In this implementation example, the hydrogen concentration of the downstream area 24 of a unit cell 20 can be acquired by estimation, using the impedance of that downstream area 24. That is, the present implementation example allows estimation of the hydrogen concentration of the downstream area 24 inside the unit cell 20 which is located on the furthest downstream side of hydrogen flow. Accordingly, hydrogen concentration estimation can be performed on the lowest hydrogen concentration area of the fuel cell stack 10.

Thus far, attempts have been made to install a hydrogen concentration sensor in a fuel cell so as to meet the long-lasting demand for local detection of hydrogen concentration. In reality, however, the installation of a hydrogen concentration sensor in a fuel cell is still far from realization. In contrast, the electrical measurement on a particular portion of a fuel cell is more practical in terms of structure than the use of a hydrogen concentration sensor. Thus, the fuel cell system of the present implementation example can meet the demand for local hydrogen concentration detection in a fuel cell plane, without using a hydrogen concentration sensor.

Specific Procedure According to Implementation Example 2 Embodiment 1

Figure 11:
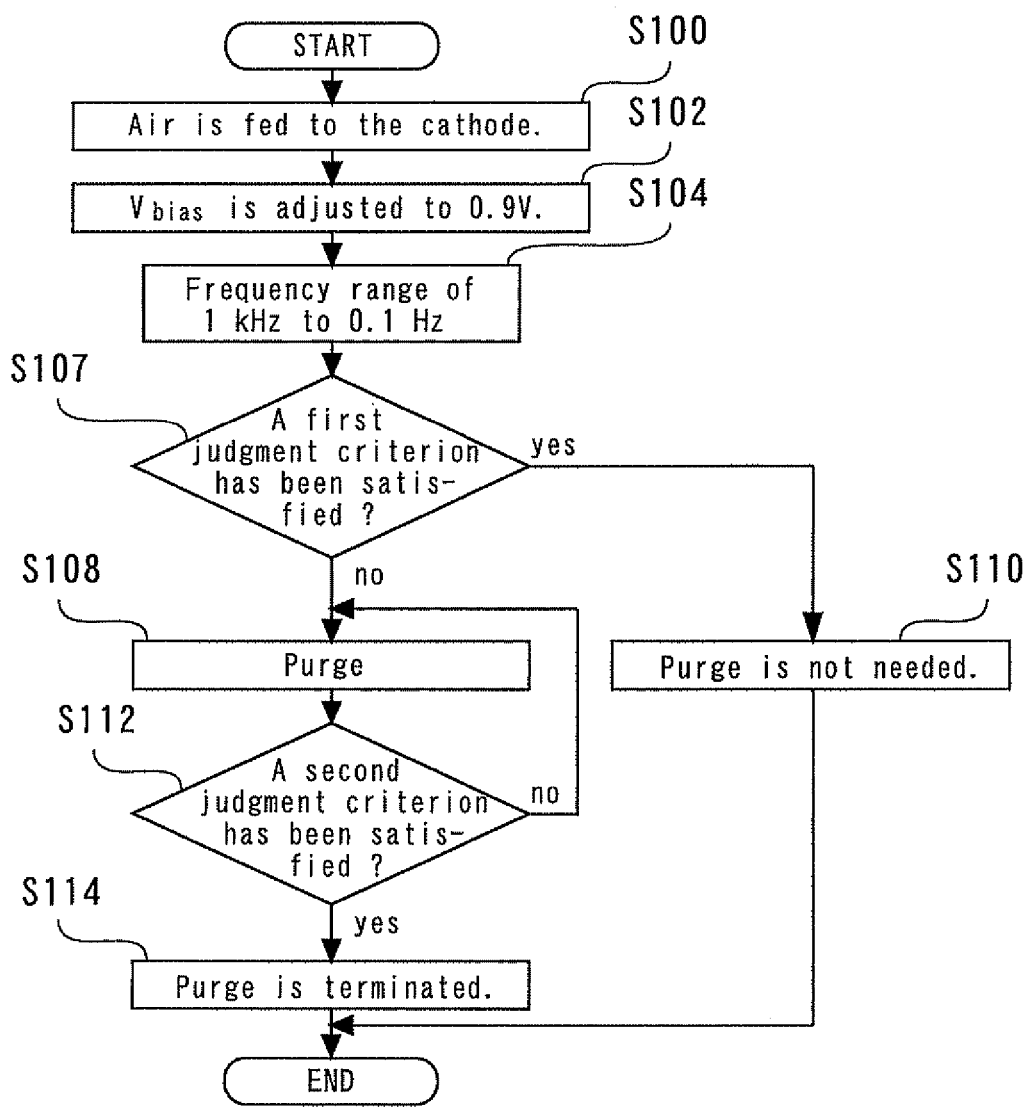
FIG. 11 is a flowchart of a routine executed by an ECU of Implementation Example 2 of Embodiment 1.

FIG. 11 is a flowchart of a routine executed by the ECU 50 of Implementation Example 2 of Embodiment 1. The routine of FIG. 11 is executed upon system start-up. This routine allows judgment of the necessity of a hydrogen purge for the fuel cell stack 10 upon system start-up. In this implementation example, the real part Z' of impedance is used for hydrogen concentration estimation.

In the routine of FIG. 11, Steps S100, S102, and S104 are first executed by the ECU 50, as in the routine of FIG. 8.

Then, a judgment is made as to whether a first judgment criterion has been satisfied or not (Step S107). More specifically, the ECU 50 judges, in this step, whether or not the acquired Z' value is equal to or less than an acceptable hydrogen concentration $Z'_0$ at or below which the power generation by the fuel cell stack 10 can be started. That is, whether or not $Z' \leq Z'_0$ is true is judged. For instance, when the acceptable hydrogen concentration is 50%, the Z' value corresponding to that hydrogen concentration value is set as the value of $Z'_0$. When $Z' \leq Z'_0$ is true, the hydrogen concentration of the fuel cell stack 10 can be judged to be equal to or greater than the acceptable hydrogen concentration. Accordingly, when $Z' \leq Z'_0$ is true, a hydrogen purge is judged not to be necessary in Step S110, which leads to termination of the routine.

When $Z' \leq Z'_0$ is not true in Step S107, i.e., when $Z' > Z'_0$, a hydrogen purge is performed (Step S108). In this case, the purge valve 56 is operated to perform a purge with the use of hydrogen.

Step S108 is followed by Step S112 in which the ECU 50 judges whether a second judgment criterion has been satisfied or not. In this step, the ECU 50 first performs impedance measurement again, using the same frequency as in Step S104, that is, using the same frequency condition as in Step S104. Thereafter, the ECU 50 judges whether or not the newly acquired Z' value is equal to or greater than $Z'_0$. Because the hydrogen purge is in progress after Step S108, the hydrogen concentration of the fuel cell stack 10 will eventually increase up to the acceptable hydrogen concentration. In other words, Z' will increase and eventually reach $Z'_0$.

When $Z' \leq Z'_0$ is true in Step S112, the purge is terminated (Step S114). The system control by the ECU 50 then proceeds to the power generation by the fuel cell stack 10. If, on the other hand, $Z' \leq Z'_0$ is not true in Step S112, the process returns to Step S108, and the purge will continue until $Z' \leq Z'_0$ becomes true.

The above procedure allows a hydrogen purge to be performed for the fuel cell stack 10 in an accurate and precise manner according to the hydrogen concentration inside the fuel cell stack 10.

The following should be noted. The fuel cell 10 and the purge valve 56 of Implementation Example 2 of Embodiment 1 correspond to the "fuel cell" and the "purge mechanism," respectively, of the twenty third aspect of the present invention. The "purge control means" of the twenty third aspect of the present invention is implemented by the ECU 50 of Implementation Example 2 of Embodiment 1 executing Step S107 of FIG. 11. The "purge control means" of the twenty fourth aspect of the present invention is implemented by the ECU 50 of Implementation Example 2 of Embodiment 1 executing Step S112 of FIG. 11.

It is to be noted that fuel cell systems can be divided into two types: recirculation-type systems in which hydrogen is recirculated on the anode side during power generation and non-recirculation-type systems that do not perform such recirculation. The non-recirculation-type systems can be further divided into two types: dead-end-type systems that close the anode system during power generation and systems that discharge a small amount of gas to the anode downstream side during power generation. The foregoing hydrogen concentration estimating techniques of Embodiment 1 are applicable to any of these fuel cell systems.

Note also that the reciprocal of impedance Z is admittance Y. Accordingly, the value of the admittance Y can also be used for the hydrogen concentration estimation based on comparison with a reference value or the calculation of an estimate hydrogen concentration value, both described in Embodiment 1. This method involving the use of the admittance Y is, in effect, the same as Embodiment 1 since hydrogen concentration estimation based on the admittance Y is equivalent to hydrogen concentration estimation based on the impedance Z, which is the reciprocal of the admittance Y. Therefore, the hydrogen concentration estimating apparatuses and fuel cell systems of the present invention also include those of Embodiments 1 to 9 in which the admittance Y is used for hydrogen concentration estimation, in place of the impedance Z. Impedance and admittance are often referred to collectively as "immittance."

Embodiment 2

Fuel cell systems according to Embodiment 2 of the present invention will now be described. The hydrogen concentration estimating techniques performed in Embodiment 2 are the same as in Embodiment 1. Thus, in the explanation that follows, those will not be described again or will be described in a simplified manner.

The hydrogen concentration within a fuel cell stack varies to some extent depending on its inner locations. For example, in a fuel cell stack, a unit cell located on the manifold downstream side tends to have a lower hydrogen concentration than a unit cell located on the manifold upstream side. It is known that power generation by a fuel cell with an insufficient amount of hydrogen will pose various problems.

Embodiment 2 provides fuel cell systems which allow an accurate estimation of the hydrogen concentration of a low hydrogen concentration portion inside a fuel cell stack. The fuel cell systems of Embodiment 2 allow accurate and safe system control to avoid lack of hydrogen based on the lowest hydrogen concentration within a fuel cell stack.

Note that the fuel cell systems of Embodiment 2 are each of a non-recirculation type in which anode-side hydrogen recirculation is not performed during fuel-cell power generation. The fuel cell systems of Embodiment 2 are suitable for use in a traveling object such as a vehicle or the like.

Implementation Example 1 of Embodiment 2

A fuel cell stack according to Implementation Example 1 of Embodiment 2 includes unit cells in which impure gasses (hereinafter also referred to as "power-generation non-participating gasses") tend to accumulate. In this implementation example, hydrogen concentration estimation is performed on one of these unit cells.

System Configuration According to Implementation Example 1 of Embodiment 2

Figure 12:
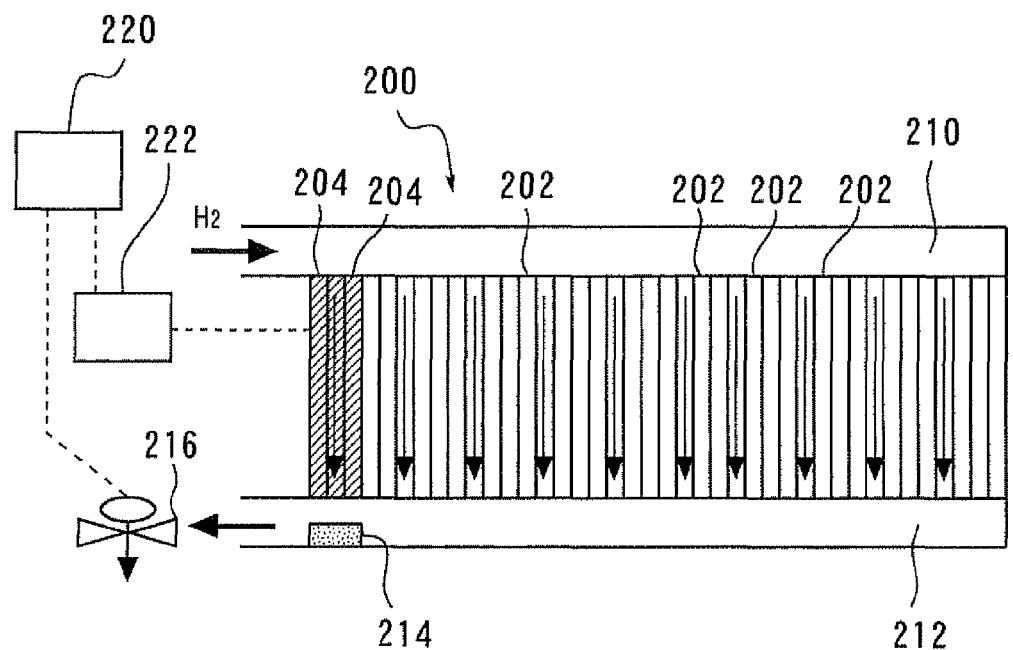
FIG. 12 is a schematic illustrating the configuration of a fuel cell system according to Implementation Example 1 of Embodiment 2.

FIG. 12 is a schematic illustrating the configuration of a fuel cell system according to Implementation Example 1 of Embodiment 2. The fuel cell system of this implementation example includes a fuel cell stack 200. The fuel cell stack 200 is formed by stacking a number of unit cells 202. The unit cells 200 are structurally the same as in FIG. 10 of Embodiment 1.

The fuel cell stack 200 also includes high-pressure-loss unit cells 204 which are located at the upstream-side end of hydrogen flow. The anode gas channels of the high-pressure-loss unit cells 204 are designed such that more pressure is lost than in the anode gas channels of the unit cells 202. The structures of the anode gas channels of the high-pressure-loss unit cells 204 will not be described herein, but it suffices to increase pressure loss in those anode gas channels by changing their cross-sectional areas (specifically, their widths, heights, or lengths; in the case of porous channels, the diameters, apertures, or the like of their pores).

The fuel cell stack 200 also includes manifolds 210 and 212. The manifolds 210 and 212 extend in a stacking direction of the unit cells 202 and the high-pressure-loss unit cells 204. The manifold 210 is open to the outside (see the arrow of $H_2$ in FIG. 12) from one side of the fuel cell stack 200 (the left side of FIG. 12). The manifold 210 is connected to a high-pressure hydrogen tank, not illustrated, via a regulator and a shutoff valve. The manifold 212 is also open to the outside from the left side of the fuel cell stack 200 of FIG. 12 and is connected to an exhaust system, not illustrated, via an exhaust valve 216.

An ECU 220 has an impedance measuring instrument 222 and the exhaust valve 216 connected thereto. The impedance measuring instrument 222 is connected to one of the high-pressure-loss unit cells 204. The ECU 220 is capable of measuring the impedance of that high-pressure-loss unit cell 204 via the impedance measuring instrument 222. Similar to the ECU 50 of Embodiment 1, the ECU 220 can perform hydrogen concentration estimation based on the impedance acquired by the impedance measuring instrument 222. The ECU 220 controls the exhaust valve 216 such that the exhaust valve 216 is closed during normal electricity generation by the fuel cell stack 200. The ECU 220 opens the exhaust valve 216 when a predetermined purge condition is met. It should be noted that the fuel cell system of this implementation example may instead discharge a small amount of gas during normal power generation by the fuel cell stack 200, without completely closing the exhaust valve 216.

The manifold 210 is connected to the entrance of each gas channel of the unit cells 202 and high-pressure-loss unit cells 204. The manifold 212 is connected to the exit of each gas channel of the unit cells 202 and high-pressure-loss unit cells 204.

Figure 13:
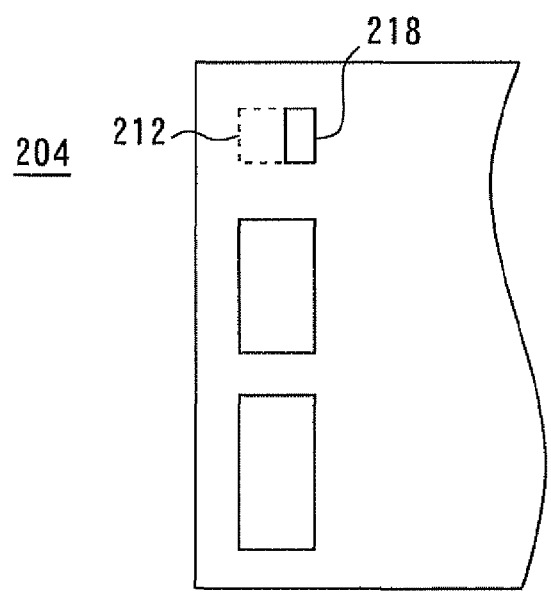
FIG. 13 is a schematic illustrating a modification of Implementation Example 1 of Embodiment 2.

Inside the manifold 212 is a wad 214, which is placed right below a gas exit section of the high-pressure-loss unit cells 204. The wad 214 serves to partially decrease the cross-sectional area of the manifold 212 at that exit section of the high-pressure-loss unit cells 204. FIG. 13 is a schematic illustrating a modification of Implementation Example 1 of Embodiment 2 in which the wad 214 is not used. As in FIG. 13, the manifold holes 218 of the high-pressure-loss unit cells 204 (which serve as the manifold 212) can be made smaller than the manifold holes of the unit cells 202. This structure serves a function similar to that of the wad 214.

Referring again to FIG. 12, hydrogen gas is fed through the open end of the manifold 210, and it flows through each unit cell (i.e., through each anode gas channel) as illustrated by the arrows of FIG. 12. As a result, anode off-gas flows into the manifold 212.

Electricity is generated within the fuel cell stack 200 due to electrochemical reactions between hydrogen and oxygen. In the meantime, power-generation non-participating gasses such as nitrogen ($N_2$) and the like will accumulate inside the fuel cell stack 200 as the electricity generation proceeds. This results in a hydrogen concentration decrease. The accumulation of $N_2$ is attributed to the impurities of hydrogen gas inside the hydrogen tank and to gasses that have passed through each MEA sandwiched between a cathode and an anode. Note that, for the sake of convenience, $N_2$ gas is hereinafter assumed to be a representative power-generation non-participating gas; however, power-generation non-participating gasses other than $N_2$ are also included in the scope of the present invention.

In this implementation example, while the fuel cell stack 200 generates electric power with the exhaust valve 216 being closed or with its opening angle being small, the hydrogen concentrations inside the anode gas channels of the high-pressure-loss unit cells 204 become smaller than in the unit cells 202. Thus, by the ECU 220 performing hydrogen concentration estimation on one of the high-pressure-loss unit cells 204, the hydrogen concentration of the lowest hydrogen concentration portion of the fuel cell stack 200 can be estimated. This allows accurate and safe system control to avoid lack of hydrogen based on the lowest hydrogen concentration within the fuel cell stack 200.

Further, in the present implementation example, the presence of the wad 214 partially decreases the cross-sectional area of the manifold 212 at the exit section of the high-pressure-loss unit cells 204. Thus, when the exhaust valve 215 is opened to discharge the anode off-gas inside the manifold 212, it is possible to increase the flow rate of the gas at the exit section of the high-pressure-loss unit cells 204. The increased gas flow rate causes the pressure at the exit section of the high-pressure-loss unit cells 204 to become negative. As a result, when the exhaust valve 216 is opened, gas can be discharged also from the inside of the high-pressure-loss unit cells 204. As above, the configuration of the present implementation example allows a sufficient purge of the high-pressure-loss unit cells 204 in which power-generation non-participating gas is abundant.

It should be noted that, unlike the other embodiments described below, the configuration of the present implementation example has a unique feature in that both of the opening of the manifold 210 and the opening of the manifold 212 are located on one side of the fuel cell stack 200.

Operation and Specific Procedure According to Implementation Example 1 of Embodiment 2

Described below are the operation of the fuel cell system of and specific operations performed in Implementation Example 1 of Embodiment 2. The fuel cell system of this implementation example performs hydrogen concentration estimation on one of the high-pressure-loss unit cells 204, thereby monitoring the hydrogen concentration inside the fuel cell stack 200. When the estimated hydrogen concentration is lower than a given value during the monitoring, the exhaust valve 216 is controlled so as to adjust the amount of exhaust to a relatively high value.

Figure 14:
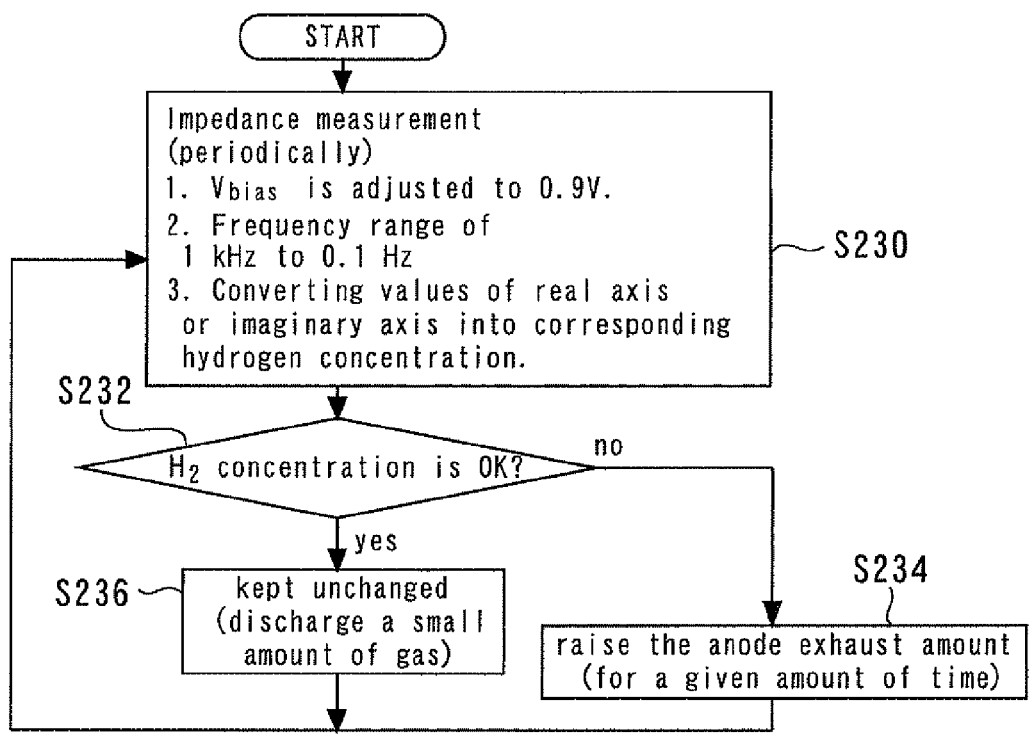
FIG. 14 is a flowchart of a routine executed by an ECU of Implementation Example 1 of Embodiment 2.

FIG. 14 is a flowchart of a routine executed by the ECU 220 of Implementation Example 1 of Embodiment 2. This routine is executed while the fuel cell stack 200 generates electric power.

The routine of FIG. 5 starts with Step S230 in which impedance measurement is performed. This step corresponds to Steps S102, S104, and S106 of FIG. 8 of Embodiment 1.

Then, a judgment is made as to whether the $H_2$ concentration is acceptable or not (Step S232). Similar to Step S107 of FIG. 11, this judgment is based on comparison against a reference value. The reference value can be determined based on a hydrogen concentration value to be used for the judgment.

When the $H_2$ concentration is judged to be acceptable in Step S232, the system control is kept unchanged (Step S236). When the $H_2$ concentration is not acceptable in Step S232, the opening angle of the exhaust valve 216 is increased in Step S234 to raise the exhaust amount for a given amount of time (e.g., for several seconds). The process then returns to Step S230.

The above operations allow the exhaust amount to be adjusted to a relatively high value when the hydrogen concentration inside the fuel cell stack 200 is lower than a given value.

Note that any of the unit cells 202 and any of the high-pressure-loss unit cells 204 of Implementation Example 1 of Embodiment 2 correspond to the "first unit cell" and the "second unit cell," respectively, of the fifteenth aspect of the present invention.

Implementation Example 2 of Embodiment 2

In Implementation Example 2 of Embodiment 2, impedance-based hydrogen concentration estimation is performed on the unit cell of a fuel cell stack that is located on the furthest downstream side of hydrogen flow. This allows an accurate estimation of the lowest hydrogen concentration inside a fuel cell stack.

System Configuration According to Implementation Example 2 of Embodiment 2

Figure 15A:
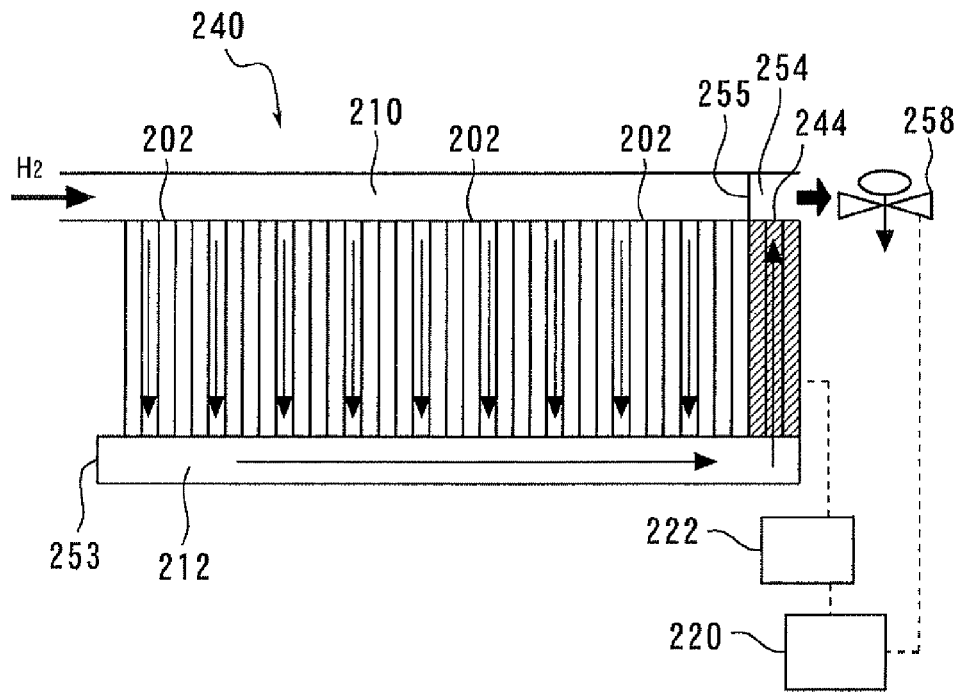
FIG. 15A illustrates a configuration of a fuel cell system according to Implementation Example 2 of Embodiment 2.
Figure 15B:
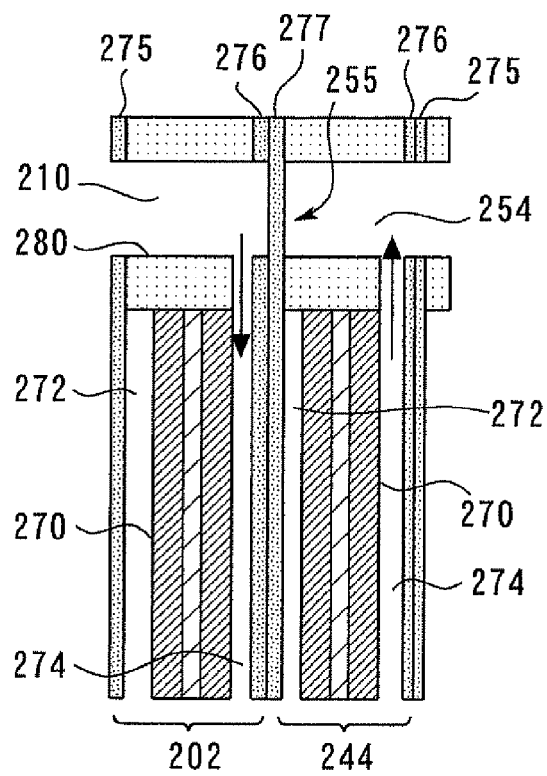
FIG. 15B is an enlarged sectional view of a fuel cell stack according to Implementation Example 2 of Embodiment 2.

FIGS. 15A and 15B are schematics illustrating the configuration of a fuel cell system according to Implementation Example 2 of Embodiment 2. As illustrated in FIG. 15A, the fuel cell system of this implementation example includes a fuel cell stack 240 and an exhaust valve 258. Similar to the system of FIG. 12, the fuel cell system of this implementation example also includes the ECU 220 and the impedance measuring instrument 222. The fuel cell stack 240 is formed by stacking unit cells 202 and unit cells 244. In this implementation example, the impedance measuring instrument 222 is connected to one of the unit cells 244.

As illustrated in FIG. 15A, a partition board 255 and a lid 253 are provided respectively at one end of the manifold 210 and at one end of the manifold 212. As also illustrated in FIG. 15A, a manifold 254 is located to the right of the partition board 255.

FIG. 15B is an enlarged view of the section of FIG. 15A in which a unit cell 202 is arranged next to a unit cell 244. The unit cell 202 and unit cell 244 each house a membrane electrode gas diffusion layer assembly (MEGA) 270 which is formed by attaching a gas diffusion layer on both sides of an MEA. The unit cell 202 and unit cell 244 each include a cathode gas channel 272 and an anode gas channel 274 with an MEGA 270 placed therebetween. Reference numeral 280 represents resin gaskets.

In the fuel cell stack 240, a cathode-side separator 275 and an anode-side separator 276 are used to separate each unit cell. In this implementation example, the fuel cell stack 240 houses a cathode-side separator 277 which is without any manifold hole, as illustrated in FIG. 15B. Part of this cathode-side separator 277 (i.e., its section without any manifold hole) serves as the partition board 255.

In the above-described fuel cell stack 240, the flow of hydrogen gas takes the following route: the manifold 210>the anode of each unit cell 202>the manifold 212>the anode of each unit cell 244>the manifold 254. In this implementation example, the unit cells 244 are thus located on the furthest downstream side of the hydrogen flow inside the fuel cell stack 240. Gas flowing into the unit cells 244 has high concentrations of power-generation non-participating gases (e.g., an $N_2$ concentration of approximately 5 to 10%). By performing impedance-based hydrogen concentration estimation on one of the unit cells 244, the lowest hydrogen concentration inside the fuel cell stack 240 can be estimated with high accuracy.

Note that the exhaust valve 258 is located downstream of the manifold 254. By opening the exhaust valve 258, a purge can be performed on the anode side. Alternatively, by adjusting the opening angle of the exhaust valve 258, it is possible for the fuel cell stack 240 to continue electric power generation with the exhaust valve 258 discharging anode off-gas little by little.

Specific Procedure According to Implementation Example 2 of Embodiment 2

Figure 16:
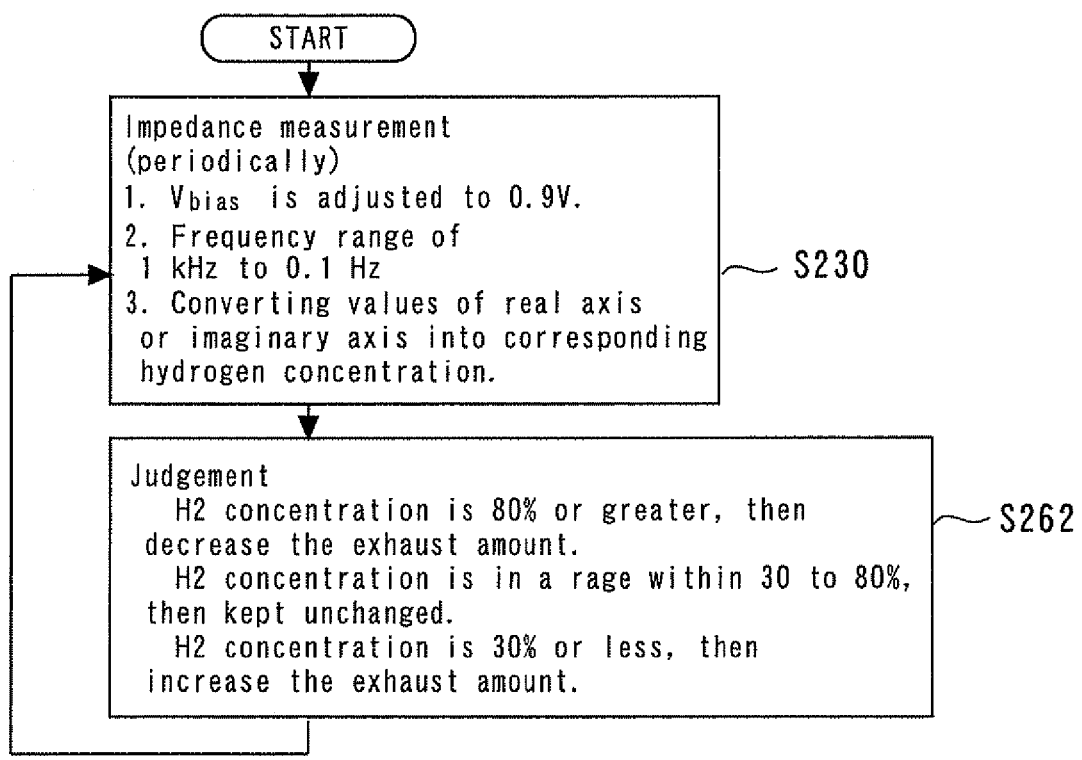
FIG. 16 is a flowchart of a routine executed by an ECU of Implementation Example 2 of Embodiment 2.

FIG. 16 is a flowchart of a routine executed by the ECU 220 of Implementation Example 2 of Embodiment 2. This routine is executed while the fuel cell stack 240 generates electric power. Similar to the routine of FIG. 14, the routine of FIG. 16 starts with the impedance measurement of Step S230.

Then in Step S262, the opening angle of the exhaust valve 258 is controlled based on the hydrogen concentration estimated in Step S230. Specifically, the ECU 220 feeds back the estimated hydrogen concentration on the opening angle of the exhaust valve 258 so that the hydrogen concentration of the unit cell 244 can be within a given range (in this implementation example, the range is from 30 to 80%. In Step S262, the ECU 220 controls the exhaust valve 258 such that the exhaust valve 258 almost but not completely closes when the estimated hydrogen concentration is greater than 80%. When the estimated hydrogen concentration is from 30 to 80%, the opening angle of the exhaust valve 258 is kept unchanged. When the estimated hydrogen concentration is less than 30%, the opening angle of the exhaust valve 258 is increased.

The following should be noted. In Implementation Example 2 of Embodiment 2, the unit cells 202 and the unit cells 244 correspond to the "first group of unit cells" and the "second group of unit cells," respectively, of the seventeenth aspect of the present invention. Further, the manifold 210, the manifold 254, and the manifold 212 correspond to the "first manifold," the "second manifold," and the "third manifold," respectively, of the seventeenth aspect of the present invention.

Implementation Example 3 of Embodiments 2

System Configuration According to Implementation Example 3 of Embodiment 2

Figure 17:
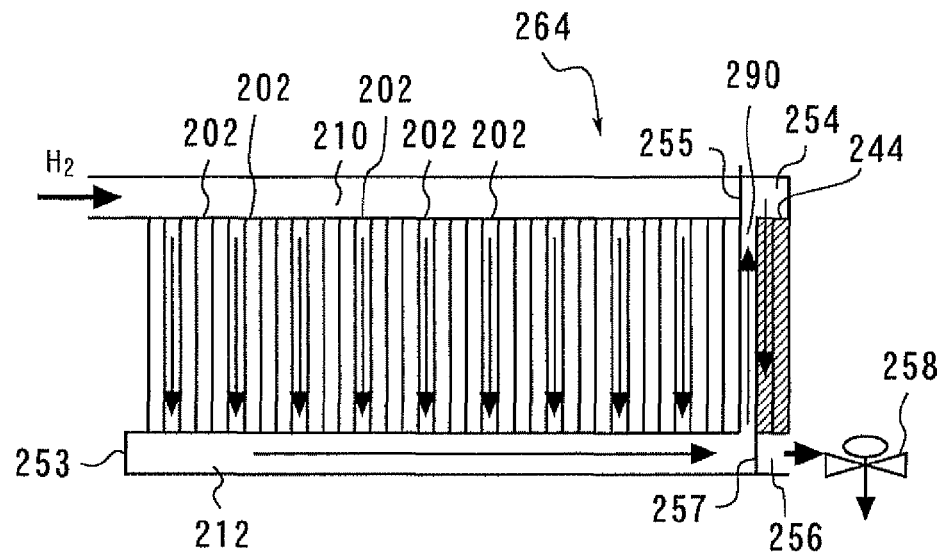
FIG. 17 is a schematic illustrating the configuration of a fuel cell system according to Implementation Example 3 of Embodiment 2.

FIG. 17 is a schematic illustrating the configuration of a fuel cell system according to Implementation Example 3 of Embodiment 2. The fuel cell system of this implementation example includes, though not illustrated, the ECU 220 and the impedance measuring instrument 222, as is similar to the system of FIG. 15. In this implementation example, too, the impedance measuring instrument 222 is connected to one of the unit cells 244. In the present implementation example, the direction of air flow inside the cathode gas channels 272 of the unit cells 202 is the same as the direction of air flow inside the cathode gas channels 272 of the unit cells 244.

A fuel cell stack 264 according to the present implementation example has a partition board 257 located inside the manifold 212. Thus, a dummy channel 290 is created by the two partition boards, 255 and 257. As a result, the flow of hydrogen gas inside the fuel cell stack 264 takes the following route: the manifold 210>the anode of each unit cell 202>the manifold 212>the dummy channel 290>the anode of each unit cell 244>a manifold 256. Accordingly, gas flowing into the unit cells 244 has a low hydrogen concentration (i.e., rich in nitrogen). By performing impedance-based hydrogen concentration estimation on one of the unit cells 244, the lowest hydrogen concentration inside the fuel cell stack 264 can be estimated with high accuracy.

Figure 18:
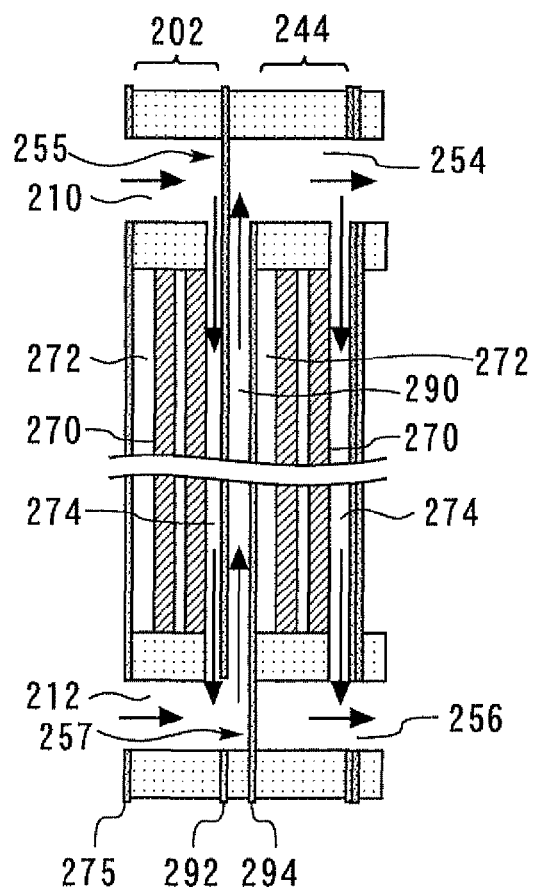
FIG. 18 is an enlarged view of the section of FIG. 17 in which a unit cell 202 is arranged next to a unit cell 244.

FIG. 18 is an enlarged view of the section of FIG. 17 in which a unit cell 202 is arranged next to a unit cell 244. The fuel cell stack 264 includes the anode-side separator 292 and cathode-side separator 294 of FIG. 18. A space is formed between theses separators by the presence of gaskets as illustrated in FIG. 18. Part of the anode-side separator 292 (its section without any manifold hole) serves as the partition board 255 while part of the cathode-side separator 294 (its section without any manifold hole) serves as the partition board 257. As a result, the dummy channel 290 is formed between the two separators.

In the above fuel cell stack 264, hydrogen flows from the manifold-210 side to the manifold-212 side through each unit cell 202; it then flows from the manifold-254 side to the manifold-256 side through each unit cell 244. Thus, the direction of hydrogen flow inside the anode gas channels 274 of the unit cells 202 is the same as the direction of hydrogen flow inside the anode gas channels 274 of the unit cells 244. What this implies is that the present implementation example allows entrance-exit arrangements for anode gas to be the same among the unit cells 202 and the unit cells 244.

As already stated, in the present implementation example, the direction of air flow inside the cathode gas channels 272 of the unit cells 202 is the same as the direction of air flow inside the cathode gas channels 272 of the unit cells 244. Therefore, the present implementation example allows the directions of hydrogen flow and air flow to be the same among the unit cells 202 and the unit cells 244.

The following should be noted. In Implementation Example 3 of Embodiment 2, the unit cells 202 and the unit cells 244 correspond to the "first group of unit cells" and the "second group of unit cells," respectively, of the eighteenth aspect of the present invention. Further, the manifold 210 and the manifold 256 correspond to the "first manifold" and the "second manifold," respectively, of the eighteenth aspect of the present invention. In addition, the manifold 212 connected by the dummy channel 290 to the manifold 254 corresponds to the "third manifold" of the eighteenth aspect of the present invention. Furthermore, in Implementation Example 3 of Embodiment 2, the manifold 212, the manifold 254, and the dummy channel 290 correspond to the "first section," the "second section," and the "dummy channel," respectively, of the eighteenth aspect of the present invention.

Embodiment 3

A fuel cell system according to Embodiment 3 of the present invention will now be described. The hydrogen concentration estimating techniques performed in Embodiment 3 are the same as in Embodiment 1. Thus, in the explanation that follows, those will not be described again or will be described in a simplified manner.

System Configuration of Embodiment 3

Figure 19:
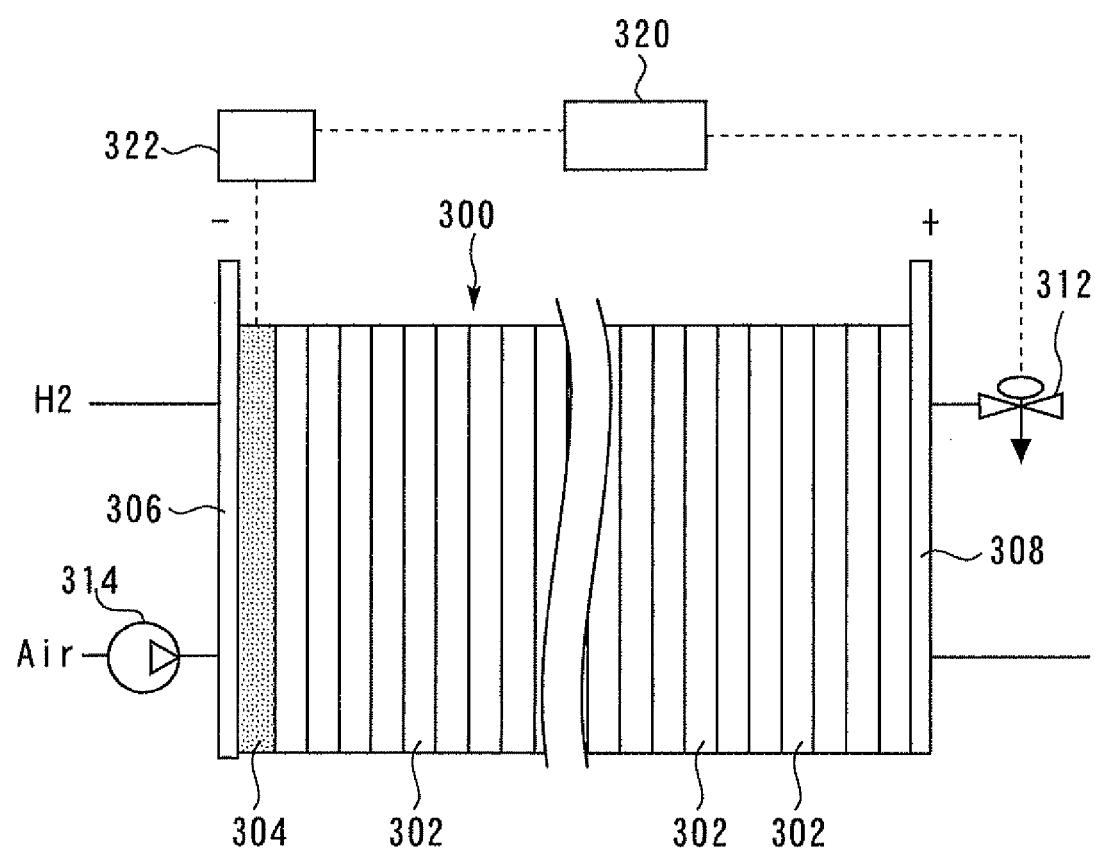
FIG. 19 is a schematic illustrating the configuration of a fuel cell system of Embodiment 3.

FIG. 19 is a schematic illustrating the configuration of the fuel cell system of Embodiment 3. The fuel cell system of the present embodiment is suitable for use in a traveling object such as a vehicle or the like. A fuel cell stack 300 has unit cells sandwiched between endplates 306 and 308. The fuel cell stack 300 includes a unit cell 304 which is in contact with the negative-potential-side endplate 306. Unit cells 302 are further stacked toward the positive-potential-side endplate 304. The unit cells 302 and the unit cell 304 have the same internal structure.

An impedance measuring instrument 322 is connected to the unit cell 304 and also to an ECU 320. Similar to the ECUs of Embodiments 1 and 2, the ECU 320 can perform hydrogen concentration estimation based on impedance. The ECU 320 is capable of acquiring the impedance of the unit cell 304 via the impedance measuring instrument 322 and of estimating the hydrogen concentration of the unit cell 304 based on the impedance. Connected to the fuel cell stack 300 are a hydrogen tank (not illustrated), a purge valve 312, and an air pump 314.

Operation According to Embodiment 3

Water tends to accumulate at the anode of the unit cell 304 for the following reasons. First, since the anode of the unit cell 304 faces the endplate 306, the unit cell 304 is cooled easily due to the transfer of heat through the endplate 306. Secondly, the water balance inside the unit cell 304 causes water generated at its cathode to move toward the anode. Thirdly, because the flow rate of gas at the anode is smaller than at the cathode, the gas inside the anode is less likely to blow accumulated water away. It is for the above reasons that water tends to accumulate at the anode of the unit cell 304, which is located at the end of the negative potential side.

A great amount of water left inside a fuel cell stack is known to cause various problems. For instance, when a fuel cell system is activated at a temperature below freezing, the water inside each unit cell may freeze. One solution to such a problem is to purge the anodes of its fuel cell stack.

The anode purge, however, involves the discharge of hydrogen. The more the purge is performed, the more hydrogen is wasted, and hence the less efficiently the fuel is consumed.

Embodiment 3 is thus designed to perform any of the hydrogen concentration estimating techniques of Embodiment 1 on the unit cell 304. By estimating the hydrogen concentration of the unit cell 304, a judgment can be made as to whether the anode of the unit cell 304 need be purged or not. In Embodiment 3, when the purge of the unit cell 304 is judged to be necessary, a purge of the fuel cell stack 300 is also judged to be necessary. That is, the unit cell 304 serves as a judgment criterion with which to judge the necessity of a purge of the entire stack.

As stated above, water is more likely to accumulate at the anode of the unit cell 304 than at the anodes of the other unit cells. By using the unit cell 304 as a criterion for purge necessity judgment, it is possible to infallibly counteract the residual water inside the fuel cell stack 300. Further, when it can be determined that a purge of the unit cell 304 is not necessary, purges of the other unit cells can also be judged to be unnecessary. Therefore, the use of the unit cell 304 as the criterion for purge necessity judgment allows unnecessary purges to be avoided.

As explained above, Embodiment 3 provides a countermeasure against the residual water inside the fuel cell stack 300 and also allows prevention of unnecessary hydrogen discharges.

Specific Procedure According to Embodiment 3

Figure 20:
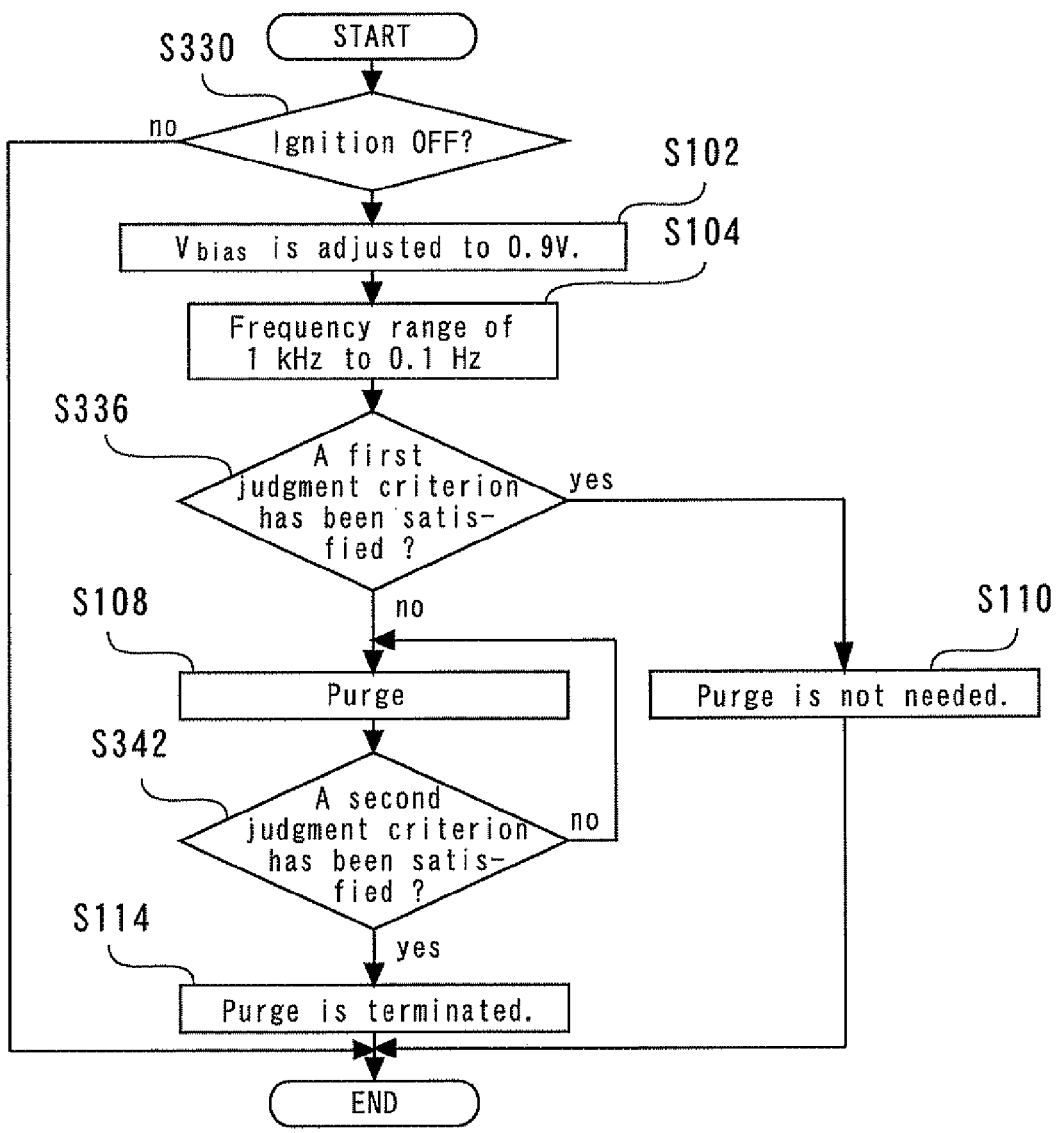
FIG. 20 is a flowchart of a routine executed by an ECU of Embodiment 3.

FIG. 20 is a flowchart of a routine executed by the ECU 320 of Embodiment 3. Assume here that the fuel cell system of Embodiment 3 is installed in a vehicle. This gives the vehicle the ability to effectively counter challenges associated with cold-region operation. The routine of FIG. 20 is partially the same as that of FIG. 11 of Implementation Example 2 of Embodiment 1; thus, those operations that overlap will be described in a simplified manner or not described again.

The routine of FIG. 20 starts with Step S320 in which the ECU 320 judges whether the ignition is off or not. If so, the ECU 320 executes Steps S102 and S104 of the routine of FIG. 11.

Next, the ECU 320 judges whether a first judgment criterion has been satisfied or not (Step S336). In this step, the ECU 320 performs basically the same operation as in Step S107 of FIG. 11, thereby acquiring the real-part impedance Z'. Note however that, in Step S336, the value of Z' is compared against a predetermined purge-barometer concentration $Z'_p$. When the comparison reveals that the estimated hydrogen concentration has exceeded the hydrogen concentration that corresponds to the purge-barometer concentration $Z'_p$, a purge is judged to be unnecessary, and the process proceeds to Step S110. Conversely, when the estimated hydrogen concentration is less than the hydrogen concentration that corresponds to the purge-barometer concentration $Z'_p$, a purge is judged to be necessary, and the process proceeds to Step S108.

After the purge of Step S108 is started, the ECU 320 judges whether a second judgment criterion has been satisfied or not (Step S342). In this step, the ECU 320 performs Step S112 of FIG. 11 using $Z'_p$ in place of $Z'_0$. Thereafter, the process goes through Step S114 to terminate, as is similar to the routine of FIG. 11.

The above operations provide a countermeasure against the residual water inside the fuel cell stack 300 and also allow prevention of unnecessary hydrogen discharges.

The following should be noted. The endplate 306 and the endplate 308 of Embodiment 3 correspond to the "negative-side endplate" and the "positive-side endplate," respectively, of the nineteenth aspect of the present invention. Further, the unit cell 304 of Embodiment 3 corresponds to the "end-side unit cell" of the nineteenth aspect of the present invention.

Modification of Embodiment 3

Figure 21:
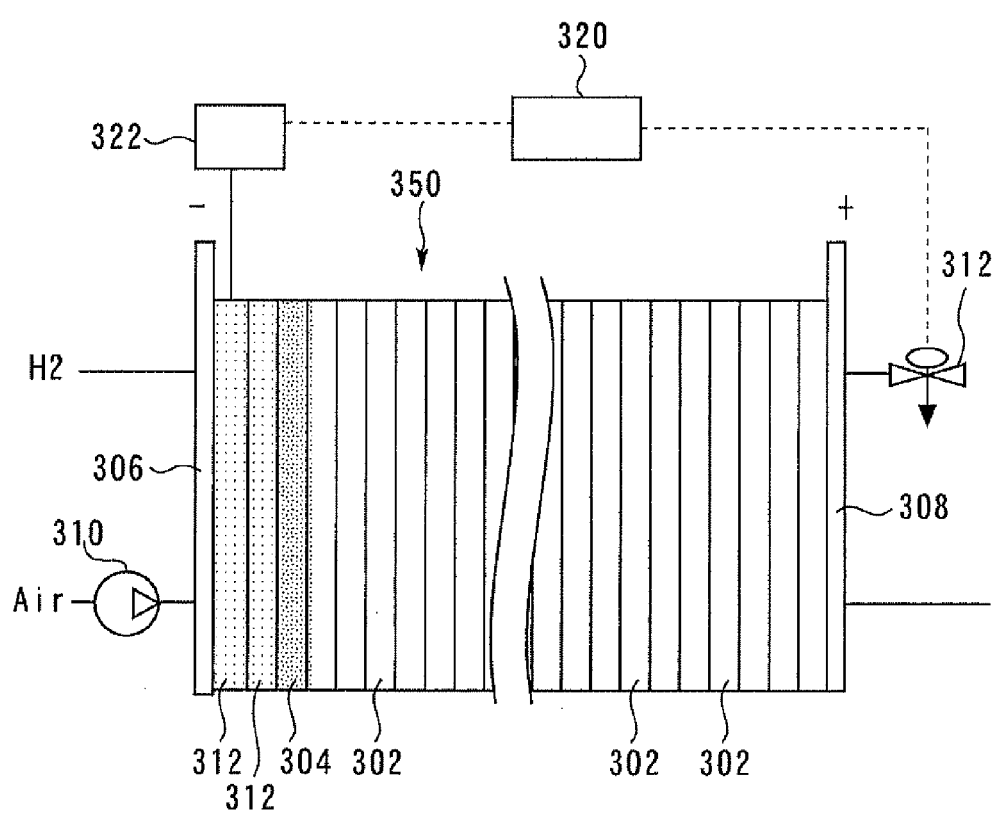
FIG. 21 is a schematic illustrating the configuration of a fuel cell system according to a modification of Embodiment 3.

FIG. 21 is a schematic illustrating the configuration of a fuel cell system according to a modification of Embodiment 3. In this modification, countermeasure cells 362 are placed between the endplate 306 and the unit cell 304. It is known in the art that non-power-generating cells are often provided in a fuel cell stack as a countermeasure against residual water. The countermeasure cells 362 are provided for that purpose and each house a heater in place of a power generation structure. In this case, too, hydrogen concentration estimation can be performed on the unit cell 304, which is closest to the endplate 306 as illustrated in FIG. 21. The same applies when thermal insulators are provided in place of the countermeasure cells 362.

Embodiment 4

A fuel cell system according to Embodiment 4 of the present invention will now be described. The fuel cell system of Embodiment 4 is suitable for use in a traveling object such as a vehicle or the like. The hydrogen concentration estimating techniques performed in Embodiment 4 are the same as in Embodiment 1. Thus, in the explanation that follows, those will not be described again or will be described in a simplified manner.

Figure 22:
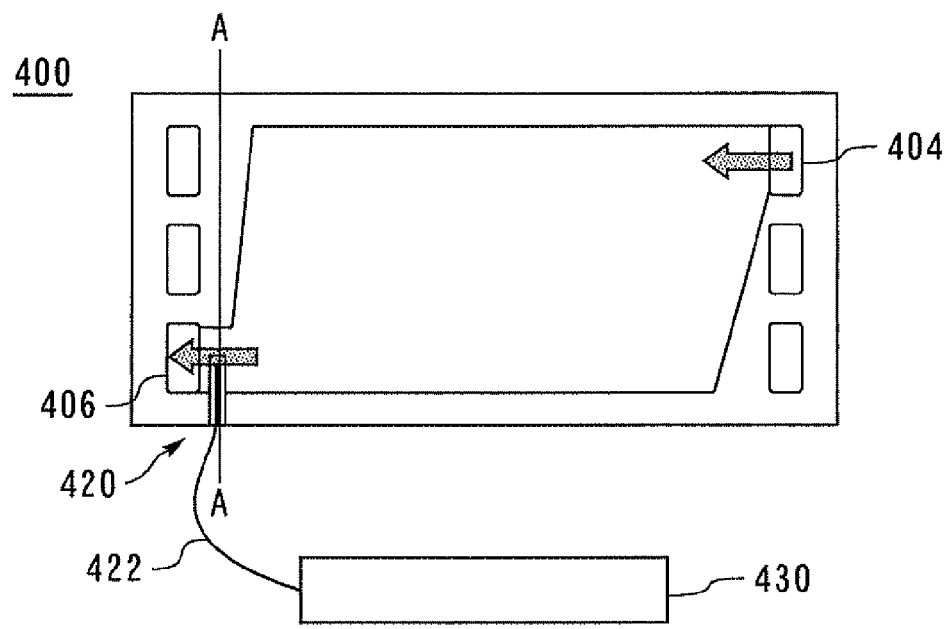
FIG. 22 is a plan view illustrating the configuration of a unit cell according to Embodiment 4.

FIG. 22 is a plan view illustrating the configuration of a unit cell 400 according to Embodiment 4. The unit cell 400 includes an anode gas entrance 404 and an anode gas exit 406. The arrows of FIG. 22 schematically represent the flow of hydrogen inside the unit cell 400. The unit cell 400 also includes a terminal 420 for impedance measurement. The terminal 420 is used to measure the impedance at a section near the gas exit 406 of the unit cell 400. The terminal 420 is connected to an impedance measuring instrument 430 via a cable 422.

Figures 23A, 23B:
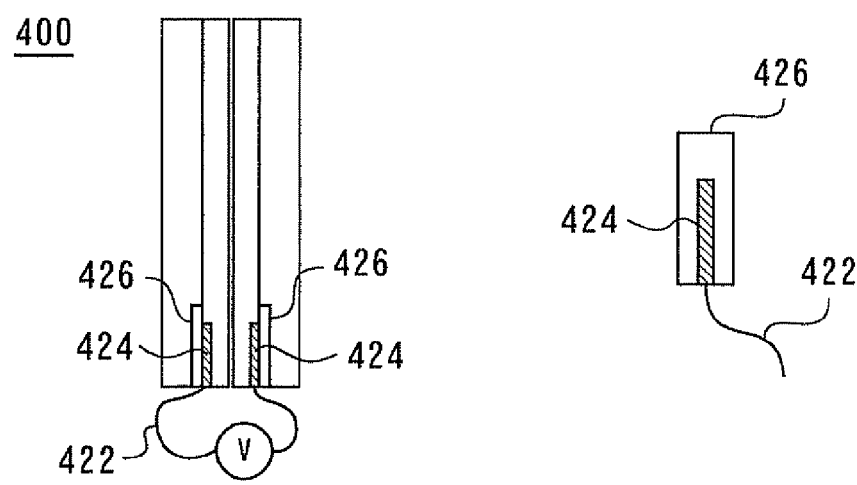
FIG. 23A is a cross section of the unit cell 400 taken along A-A line of FIG. 22.
FIG. 23B is an enlarged view of the terminal 420 of FIG. 22.

FIG. 23A is a cross section of the unit cell 400 taken along A-A line of FIG. 22. Insulating seals 426 are provided to insulate electrode 424 from separators. FIG. 23B is an enlarged view of the terminal 420 of FIG. 22. Around each of the electrodes 424 is one of the insulating seals 426. This configuration allows a simple and inexpensive impedance measurement of a section near the gas exit 406 of the unit cell 400 at which a lack of hydrogen is highly likely.

Figure 24:
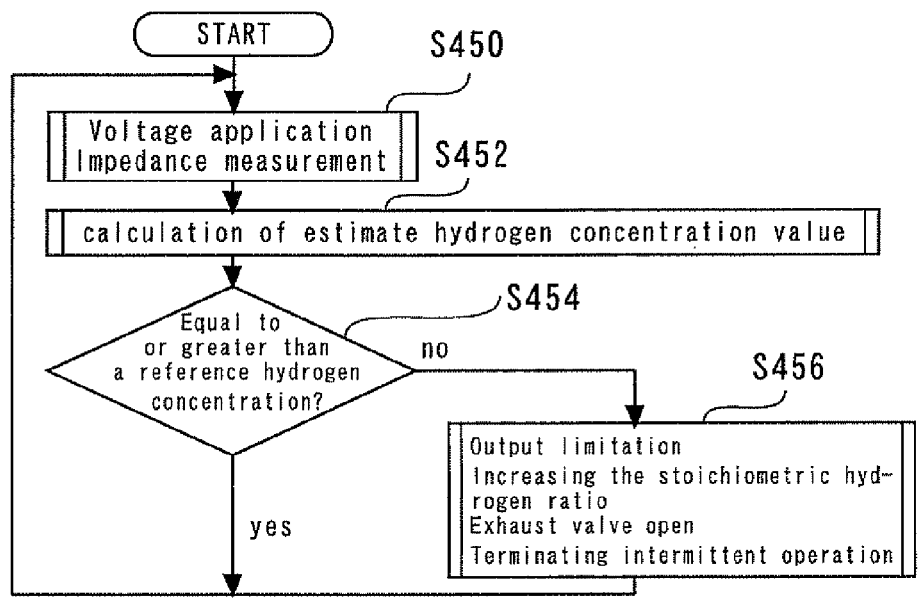
FIG. 24 is a flowchart of a routine executed by the fuel cell system of Embodiment 4.

FIG. 24 is a flowchart of a routine executed by the fuel cell system of Embodiment 4. The routine of FIG. 24 allows fuel-cell hydrogen shortage monitoring. The routine of FIG. 24 starts with Step S450 in which voltage application and impedance measurement are performed. Then, an estimate hydrogen concentration value is calculated in Step S452. Step S450 can be the same as Steps S102 and S104 of FIG. 11 of Embodiment 1. Step S452 can be performed by an ECU, not illustrated, calculating the estimate hydrogen concentration value based on a hydrogen concentration characteristic data map.

Step S452 is followed by Step S454 in which a judgment is made as to whether or not the estimate hydrogen concentration value is equal to or greater than a reference hydrogen concentration. Specifically, this step is used to judge whether or not an estimate hydrogen concentration value for the unit cell 400 is equal to or greater than a predetermined reference hydrogen concentration. If so, the fuel cell system can be judged not to be lacking in hydrogen. In this case, the process returns to Step S450.

When the answer to Step S454 is "no," the fuel cell system may be lacking in hydrogen. In the present embodiment, this causes the process to proceed to Step S456 in which some operations are performed to counter the lack of hydrogen. In the present embodiment, such operations include limiting the fuel cell output, increasing the stoichiometric hydrogen ratio, opening the exhaust valve, and terminating intermittent operation. Limiting the fuel cell output and increasing the stoichiometric hydrogen ratio are suitable when, for example, it is found necessary to counter the lack of hydrogen in a fuel cell vehicle during acceleration, e.g., at the time of WOT (wide open throttle). Moreover, opening the exhaust valve in Step S454 allows anode gas to be discharged in a timely manner in the case of a hydrogen recirculation system or a dead-end system, the latter of which generates electricity by retaining hydrogen on the anode side without recirculating the hydrogen. Furthermore, terminating intermittent operation in Step S454 serves as a flag to discontinue intermitted operation of the fuel cell system if the system has been operated intermittently.

Figure 25:
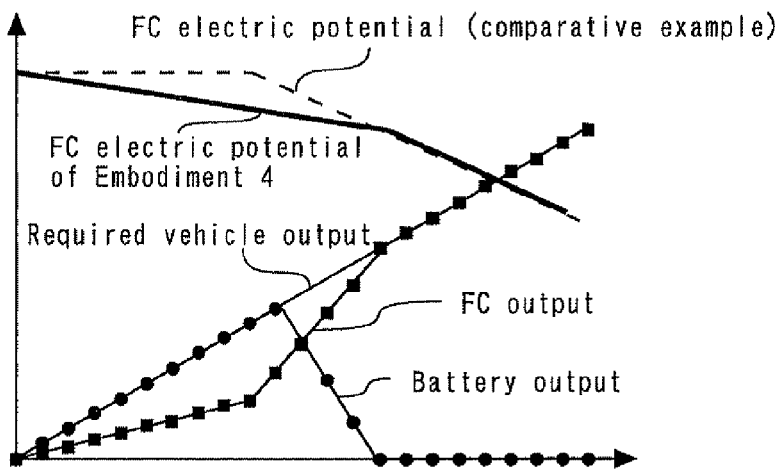
FIG. 25 is a graph to explain control operation for the fuel cell system of Embodiment 4.

FIG. 25 is a graph to explain another control operation for the fuel cell system of Embodiment 4. In terms of the catalyst inside a fuel cell, it is not desirable to expose the fuel cell to high potential conditions. The fuel cell system of Embodiment 4 is thus designed to perform hydrogen shortage monitoring based on hydrogen concentration estimation, so that output power is extracted from both of its battery and fuel cell. This allows a potential sweep to be performed with suppressing the fuel cell to be exposed to high potential conditions. In other words, the fuel cell system of Embodiment 4 is designed to extract a small amount of output power from its fuel cell while performing hydrogen shortage monitoring and also compensate for a shortfall in the required vehicle output with battery output (Bat output), as shown in FIG. 25. Thus, the potential of the fuel cell can be reduced as compared with the fuel cell potential of the comparative example of FIG. 25.

Figure 26:
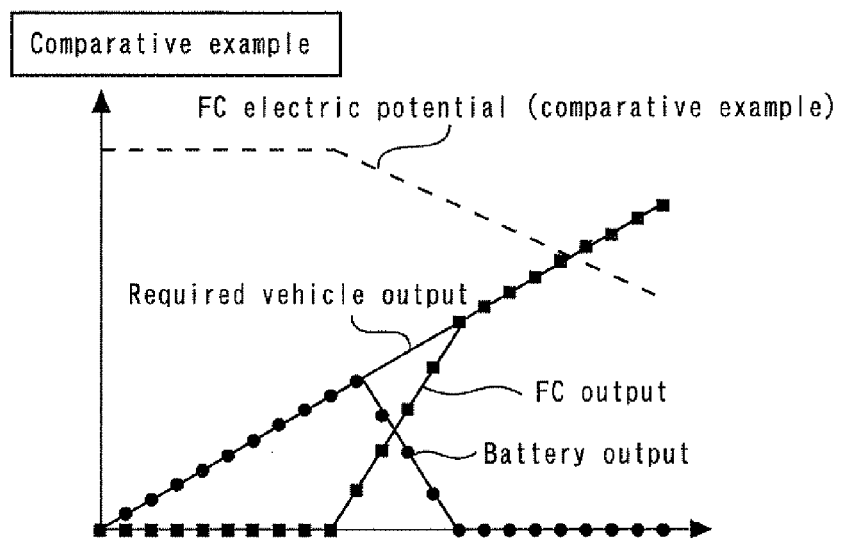
FIG. 26 is a graph to illustrate a comparative example of Embodiment 4.

FIG. 26 is a graph to illustrate a comparative example of Embodiment 4. As in the comparative example, a conventionally adopted method for extracting output from a fuel cell is to detect the OCV of each unit cell before the output extraction. In this case, the fuel cell is subjected to high potential conditions, which is not desirable in terms of its catalyst. In contrast, the control operation of Embodiment 4 shown in FIG. 25 allows the fuel cell to be exposed to high potential conditions fewer times and prevents the catalyst of the fuel cell from being adversely affected by the high potential conditions.

Figure 27:
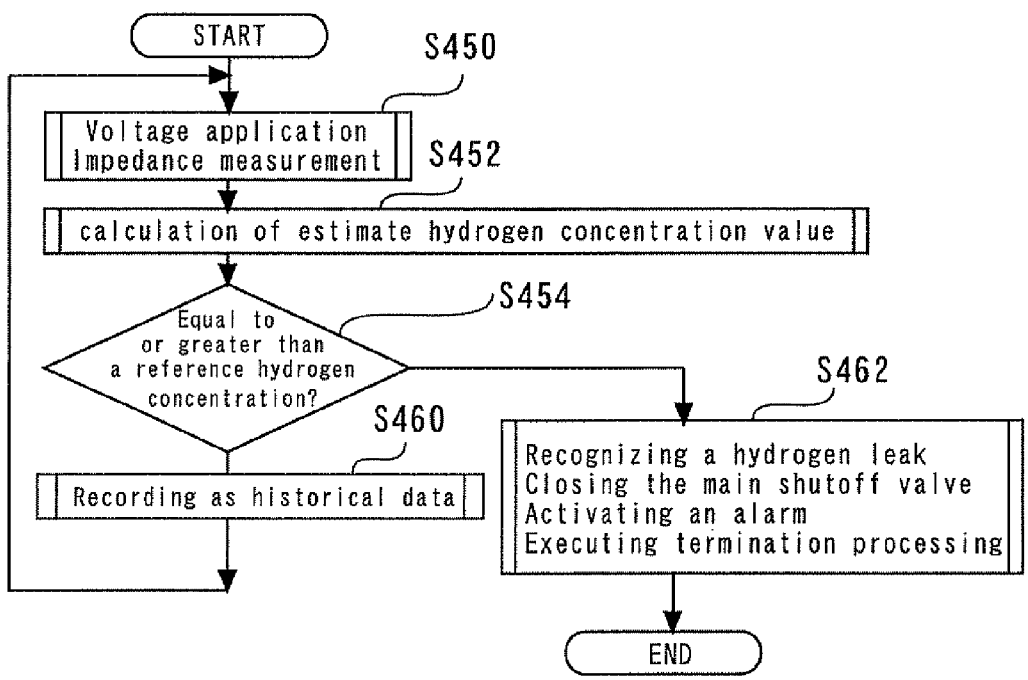
FIG. 27 is a flowchart of a routine executed by a fuel cell system of Embodiment 4.

FIG. 27 is a flowchart of another routine executed by the fuel cell system of Embodiment 4. The routine of FIG. 27 is executed when the fuel cell system is placed in a predetermined operating state. The routine of FIG. 27 allows hydrogen leak monitoring or health monitoring for the fuel cell system. In Embodiment 4, external hydrogen gas is monitored with the use of an estimate hydrogen concentration value. This allows detection of hydrogen leaks without the use of a pressure drop method.

In the routine of FIG. 27, Steps S450 to 454 are performed, as is similar to the routine of FIG. 24. Note, however, that the reference value used in Step S454 can be changed to one suitable for leak detection or health monitoring.

When the comparison of Step S454 between the estimate hydrogen concentration value and the reference value reveals there is no problem, the estimate hydrogen concentration value is recorded as historical data, and the process then returns to Step S450. When there is found to be a problem in Step S454, the following operations are performed: recognizing a hydrogen leak; closing the main shutoff valve; activating an alarm; and executing termination processing. The routine then terminates. The above operations allow detection of hydrogen leaks due to electrolyte membrane breakage and monitoring of cross-leak for age-related increases.

Embodiment 5

A fuel cell system according to Embodiment 2 of the present invention will now be described. The fuel cell system of Embodiment 5 is suitable as a fuel cell system to be installed in a fuel cell vehicle. The hydrogen concentration estimating techniques performed in Embodiment 5 are the same as in Embodiment 1. Thus, in the explanation that follows, those will not be described again or will be described in a simplified manner.

Even if fuel cell vehicles gain in popularity, it is not always the case that high-purity hydrogen gas can be obtained as fuel gas. It is possible that low-purity hydrogen gas is instead supplied. If the low-purity hydrogen gas is used to operate a fuel cell system under the same conditions as in high-purity hydrogen gas, this may result in a lack of hydrogen inside its fuel cell. Thus, even in the case of low-purity hydrogen gas, it is necessary to adapt a fuel cell system to the hydrogen concentration of the low-purity gas so as to avoid lack of hydrogen. As a result of our intensive study, we have found a fuel cell system that can accept varying degrees of fuel-gas hydrogen purity.

Figure 28:
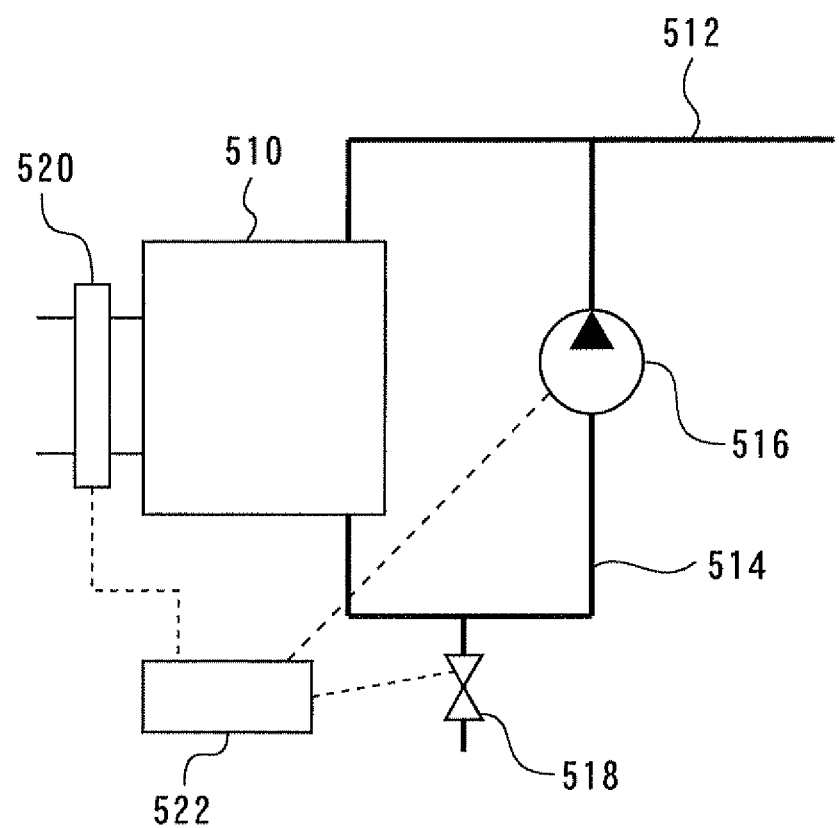
FIG. 28 is a schematic illustrating the configuration of a fuel cell system of Embodiment 5.

FIG. 28 is a schematic illustrating the configuration of the fuel cell system of Embodiment 5. The anode entrance of a fuel cell 510 is connected to a conduit 512 while the anode exit of the fuel cell 510 is connected to a conduit 514. The conduit 514 communicates with the conduit 512, thereby forming a circulatory conduit. Also attached to the conduit 514 are a purge valve 518 and a hydrogen pump 516. Further, an impedance measuring instrument 520 is connected to the fuel cell 510. Moreover, the fuel cell system has an ECU 522 connected to the impedance measuring instrument 520, the hydrogen pump 516, and the purge valve 518.

The ECU 522 stores a stoichiometric hydrogen ratio map in advance. The amount of hydrogen supply to the fuel cell 510 is controlled based on this map. The stoichiometric hydrogen ratio refers to the ratio of the minimum hydrogen amount required for fuel-cell power generation (i.e., the amount of hydrogen to be used in electrochemical reactions) to the amount of hydrogen actually supplied to the fuel cell 510. In the present embodiment, the stoichiometric hydrogen ratio map is such that the stoichiometric hydrogen ratio is small for the purpose of efficient fuel consumption (specifically, the stoichiometric hydrogen ratio on the upstream side of the fuel cell 510 is made as small as possible).

Figure 29:
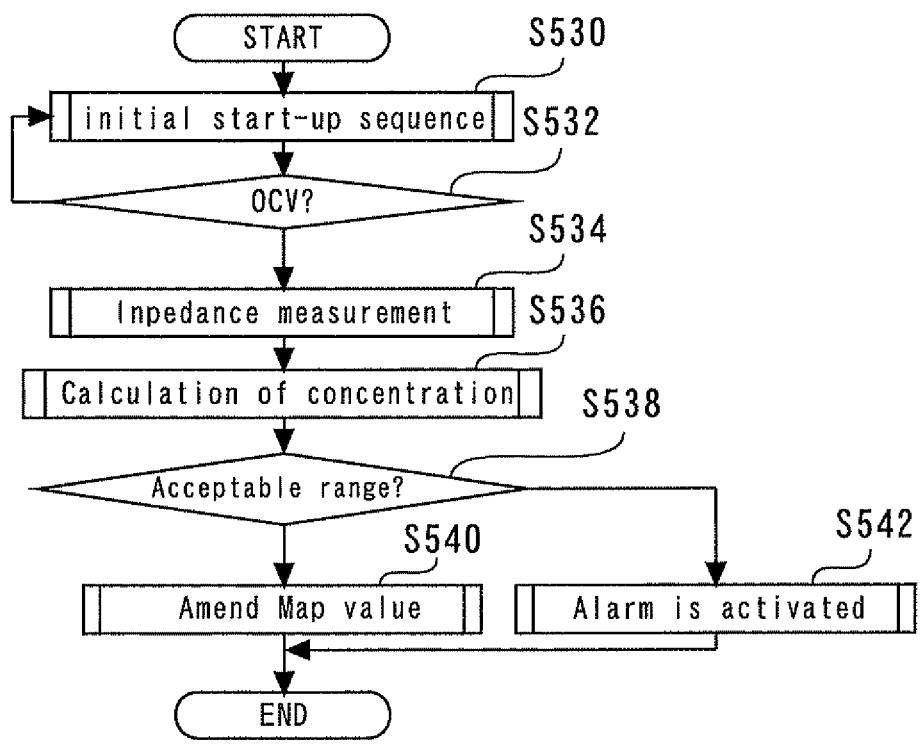
FIG. 29 is a flowchart of a routine executed by an ECU of Embodiment 5.

FIG. 29 is a flowchart of a routine executed by the ECU 522 of Embodiment 5. The routine of FIG. 29 starts with Step S530 in which an initial start-up sequence is executed. Then, a judgment is made as to whether the voltage of the fuel cell 510 is its OCV or not (Step S532). The process then proceeds to Step S534 in which impedance measurement is performed. Thereafter, an estimate hydrogen concentration value is calculated in Step S536. This operation allows the hydrogen concentration of the fuel gas being used to be acquired by estimation.

Step S536 is followed by Step S538 in which a judgment is made as to whether or not the estimate hydrogen concentration value is within an acceptable range. If not, an alarm is activated in Step S542; if so, the Map value of the stoichiometric hydrogen ratio map is corrected or updated in Step S540. In Step S540, the value of the stoichiometric hydrogen ratio map is corrected based on the hydrogen concentration obtained in Step S536, such that the stoichiometric hydrogen ratio is as small as possible so long as the value decrease does not cause a lack of hydrogen. The routine terminates after Step S540.

The above operations allow the stoichiometric hydrogen ratio map to be updated based on the hydrogen concentration of the fuel gas being used. Thus, the stoichiometric hydrogen ratio map does not require a safety margin for various degrees of hydrogen purity, or the safety margin can be reduced. As a result, even if fuel gasses of different hydrogen purities have to be used for the fuel cell system, it is possible to operate the system while avoiding lack of hydrogen.

Figure 30:
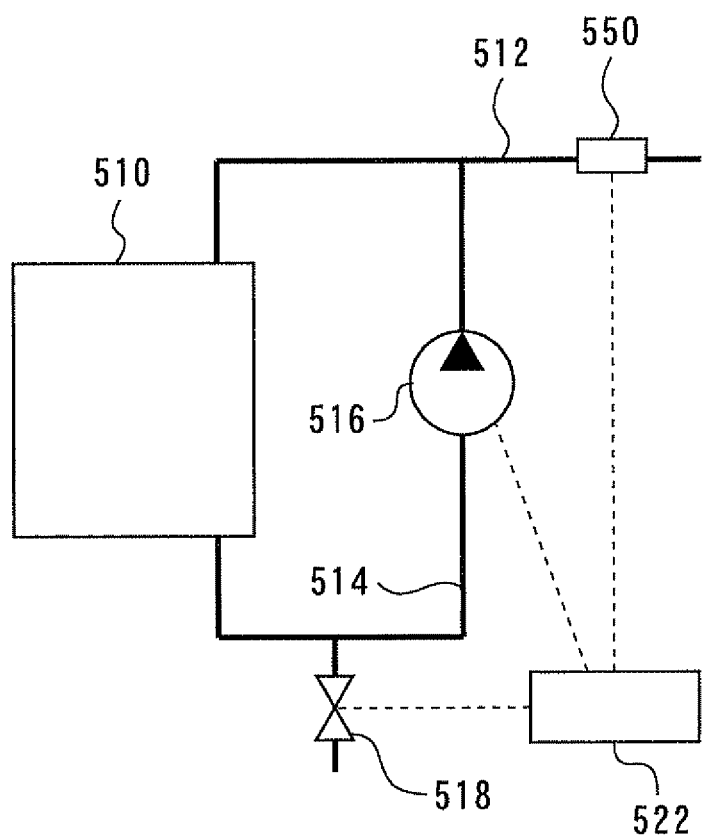
FIG. 30 is a schematic illustrating the configuration of a fuel cell system in which a hydrogen concentration sensor is used to perform the control operations of Embodiment 5.

FIG. 30 is a schematic illustrating the configuration of another fuel cell system in which a hydrogen concentration sensor 550 is used to perform the control operations of Embodiment 5. If impedance-based hydrogen concentration estimation is not to be performed unlike Embodiment 5 described above, a possible alternative method for hydrogen concentration detection would be through the use of the hydrogen concentration sensor 550.

Embodiment 6

Embodiment 6 provides a fuel cell system that is capable of quickly responding to the occurrence of flooding. The fuel cell system of Embodiment 6 is suitable for use in a traveling object such as a vehicle or the like. The hydrogen concentration estimating techniques performed in Embodiment 6 are the same as in Embodiment 1. Thus, in the explanation that follows, those will not be described again or will be described in a simplified manner.

Figure 31:
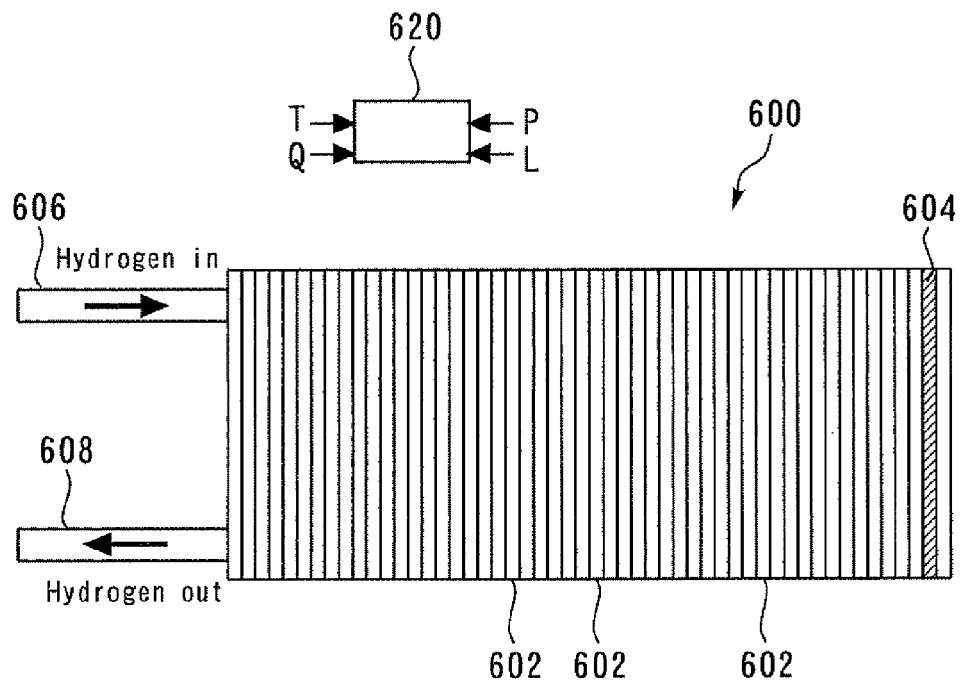
FIG. 31 is a schematic illustrating the configuration of a fuel cell system of Embodiment 6.
Figure 32:
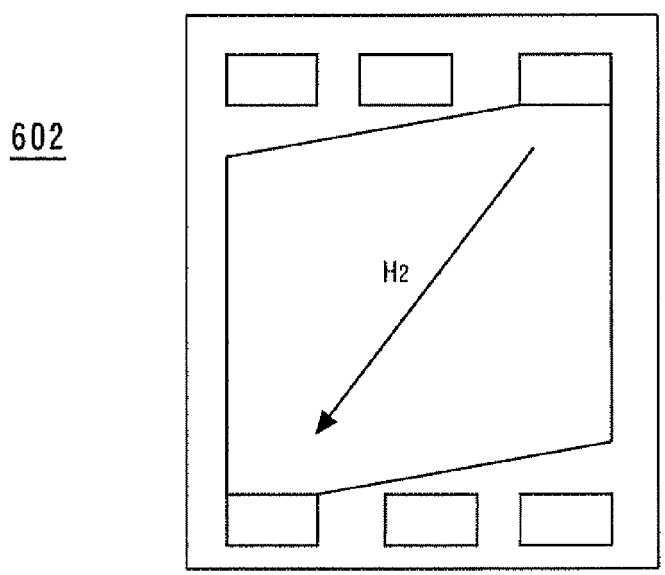
FIG. 32 is a plan view of a unit cell of Embodiment 6.

FIG. 31 is a schematic illustrating the configuration of the fuel cell system of Embodiment 6. The fuel cell system of the present embodiment includes the following components: a fuel cell stack 600; and conduits 606 and 608 connected to the fuel cell stack 600. The fuel cell stack 600 includes unit cells 602. FIG. 32 is a plan view of a unit cell 602 of Embodiment 6. As illustrated in FIG. 32, the flow of hydrogen in a plane of the unit cell 602 is toward the lower left side of FIG. 32.

A current detection plate 604 is placed adjacent to the unit cell 602 that is located on the furthest downstream side of hydrogen flow among all the unit cells 602 of the fuel cell stack 600. The current detection plate 604 is used to measure the current of that unit cell 602 adjacent thereto. The current detection plate 604 may be the same in size as the unit cells 602 or may be divided in the direction of hydrogen flow. There exist many known configurations for such a current detection plate. Not constituting novel features of the present invention, they will not be described herein. It should be noted that current detection plates 604 may be provided at a plurality of sections inside the fuel cell stack 600, instead of providing the single current detection plate 604 at one end of the stack 600.

The fuel cell system of Embodiment 6 also includes an ECU 620. Similar to the ECUs of Embodiments of 1 to 5, the ECU 620 is capable of performing hydrogen concentration estimation based on impedance. Note that, in Embodiment 6, the impedance acquired with the use of the current detection plate 604 is used for hydrogen concentration estimation.

The ECU 620 allows input of the temperature T of the fuel cell stack 600, the gas flow rate Q at the anode side, generated power P, and load L. The ECU 620 includes a program with which to store the temperature T, the gas flow rate Q, and the generated power P as historical data and to refer to the historical data on an as-needed basis. The temperature T, the gas flow rate Q, the generated power P, and the load L may be detected by attaching various sensors, not illustrated, to the fuel cell stack 600.

Figure 33:
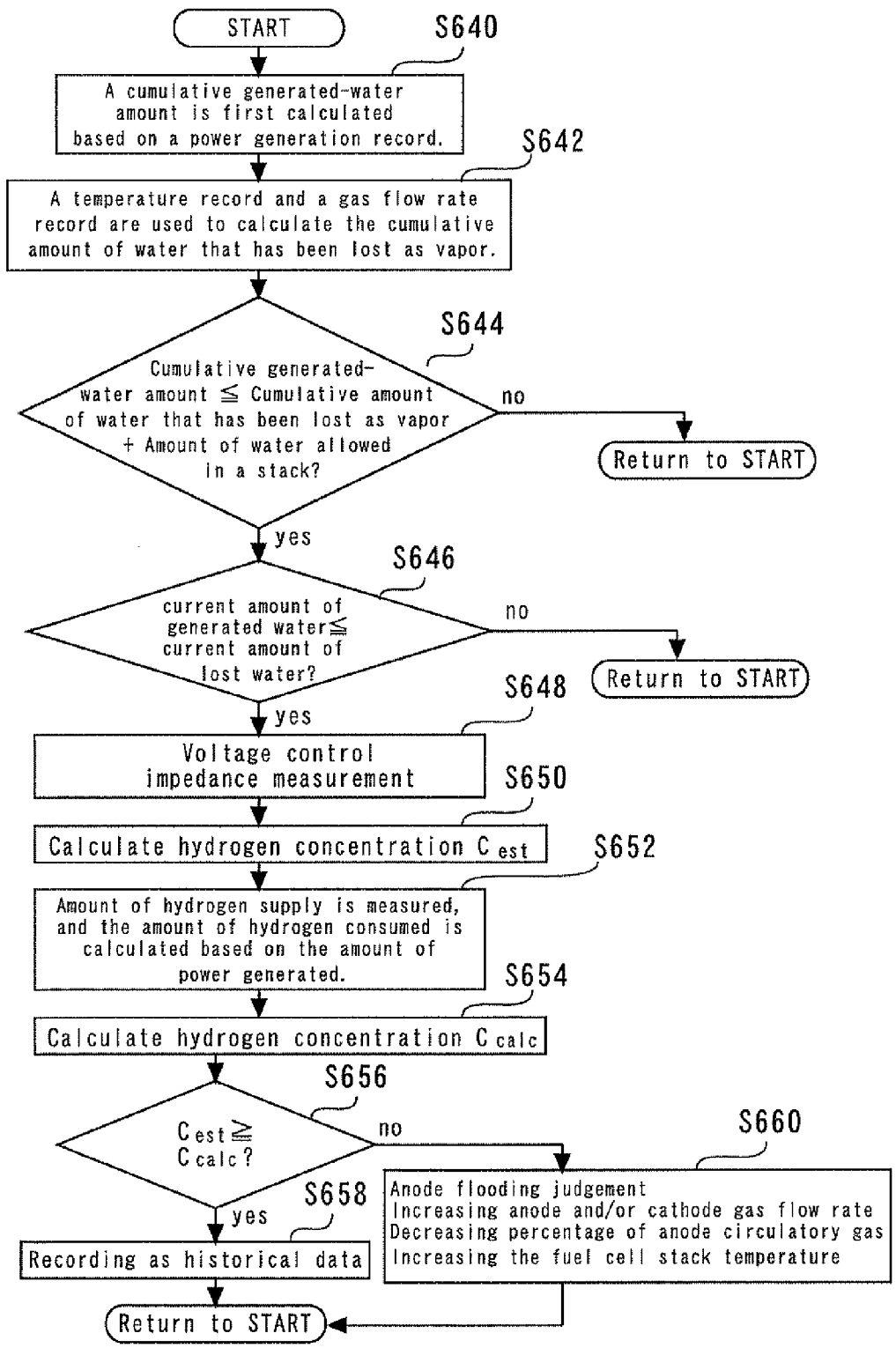
FIG. 33 is a flowchart of a routine executed by an ECU of Embodiment 6.

FIG. 33 is a flowchart of a routine executed by the ECU 620 of Embodiment 6. In the present embodiment, a cumulative generated-water amount is first calculated based on a power generation record of the fuel cell stack 600 (Step S640). Next, a temperature record and a gas flow rate record of the fuel cell stack 600 are used to calculate the cumulative amount of water that has been lost as vapor (Step S642).

Step S642 is followed by Step S644 in which a judgment is made as to whether the following condition has been met or not:

$W_P \leq W_V + W_A$, where $W_P$=the cumulative generated-water amount calculated in Step S640, $W_V$=the cumulative amount of water that has been lost as vapor, which has been calculated in Step S642, and $W_A$=the amount of water allowed in the stack 600.

The amount of water allowed in the stack 600 ($W_A$) is the maximum amount of water the fuel cells stack 600 can contain without power generation being affected.

When the answer to Step S644 is "no," i.e., when $W_P > (W_V + W_A)$ is true, it can be determined that $H_2O$ is present inside the stack 600 in the form of liquid. In this case, the routine of FIG. 33 returns to "START."

When the answer to Step S644 is "yes," i.e., when $W_P \leq (W_V + W_A)$ is true, the routine proceeds to Step S646 in which a judgment is made as to whether or not the current amount of generated water is equal to or less that the current amount of lost water. When the answer to Step S646 is "no," it can be determined that $H_2O$ is present inside the stack 600 in the form of liquid. In this case, the routine of FIG. 33 returns to "START."

When the answers to Step S646 are both "yes," the process proceeds to Step S648 and subsequent operations. When the answers to Steps S644 and S646 are both "yes," it can be determined that $H_2O$ is not present inside the stack 600 in the form of liquid.

Performed in Steps S648 and S650 is the impedance-based hydrogen concentration estimation of Embodiment 1, thereby calculating a hydrogen concentration $C_{est}$.

Next, in Step S652, the amount of hydrogen supply is measured, and the amount of hydrogen consumed is calculated based on the amount of power generated. The amount of hydrogen supply can be obtained based on the fuel cell load. The amount of hydrogen consumed can be calculated by measuring the amount of power generated because the amount of hydrogen consumed is proportional to the amount of power generated.

Then, a hydrogen concentration $C_{calc}$ is calculated in Step S654. The amount of hydrogen supply mentioned above refers to the amount of hydrogen that has been fed into the stack 600, and the amount of hydrogen consumed refers to the amount of hydrogen that was consumed inside the fuel cell stack 600 during power generation. By subtracting the amount of hydrogen consumed from the amount of hydrogen supply, it is possible to obtain the amount of hydrogen that would be left inside the fuel cell stack 600 (i.e., an estimate amount of residual hydrogen). By converting this estimate residual hydrogen amount into the corresponding hydrogen concentration of the fuel cell stack 600, the value of $C_{calc}$ can be obtained.

Thereafter, the hydrogen concentration $C_{est}$ and the hydrogen concentration $C_{calc}$ are compared to judge whether $C_{est}$ is equal to or greater than $C_{calc}$ or not (Step S654). When $C_{est} \geq C_{calc}$ is true, it can be determined that there is no problem with the current hydrogen concentration of the fuel cell stack 600, and ECU 620 stores this as historical data. This results in termination of the routine.

Conversely, when the hydrogen concentration $C_{est}$ is judged to be less than the hydrogen concentration $C_{calc}$ in Step S654, it is determined that flooding has occurred at the anode side, and the process proceeds to Step S660.

As stated above, when the answers to Steps S644 and S646 are both "yes," it can be determined that $H_2O$ is not present inside the stack 600 in the form of liquid. This implies that no water is present inside the fuel cell stack 600 which prevents hydrogen from participating in power generation. Despite the absence of such water, the hydrogen concentration of the fuel cell stack 600 is estimated low when $C_{est} < C_{cal}$ is true in Step S656. A possible explanation of this is that the unit cell 602 right next to the current detection plate 604 may be undergoing anode flooding although the amount of water left inside the entire fuel cell stack 600 is small. Accordingly, when the hydrogen concentration $C_{est}$ is judged to be less than the hydrogen concentration $C_{calc}$, the routine of the present embodiment regards this as the occurrence of anode flooding, and the process proceeds to Step S660.

In Step S660, the occurrence of anode flooding is recognized, and one (or two or all) of the following three control operations is performed:

Increasing the gas flow rate on the anode side and/or the cathode side

Decreasing the percentage of anode circulatory gas (decreasing the amount of circulating gas rich in water and increasing the amount of hydrogen supplied from the hydrogen tank)

Increasing the fuel cell stack temperature (e.g., by decreasing the flow rate of coolant water)

The routine terminates after Step S660.

The above operations make it possible to quickly respond to the occurrence of flooding using the hydrogen concentration estimating techniques of Embodiment 1.

Embodiment 7

Embodiment 7 provides a fuel cell system having an excellent hydrogen-leak detection function. The fuel cell system of Embodiment 7 is suitable for use in a traveling object such as a vehicle or the like. The hydrogen concentration estimating techniques performed in Embodiment 7 are the same as in Embodiment 1. Thus, in the explanation that follows, those will not be described again or will be described in a simplified manner.

The fuel cell system of Embodiment 7 is the same in hardware configuration as the fuel cell system of Embodiment 6 and thus will not be described in terms of hardware configuration. Note, however, that the ECU 620 of Embodiment 7 includes a program with which to store the historical data of $C_{est}$ and $C_{calc}$.

Figure 34:
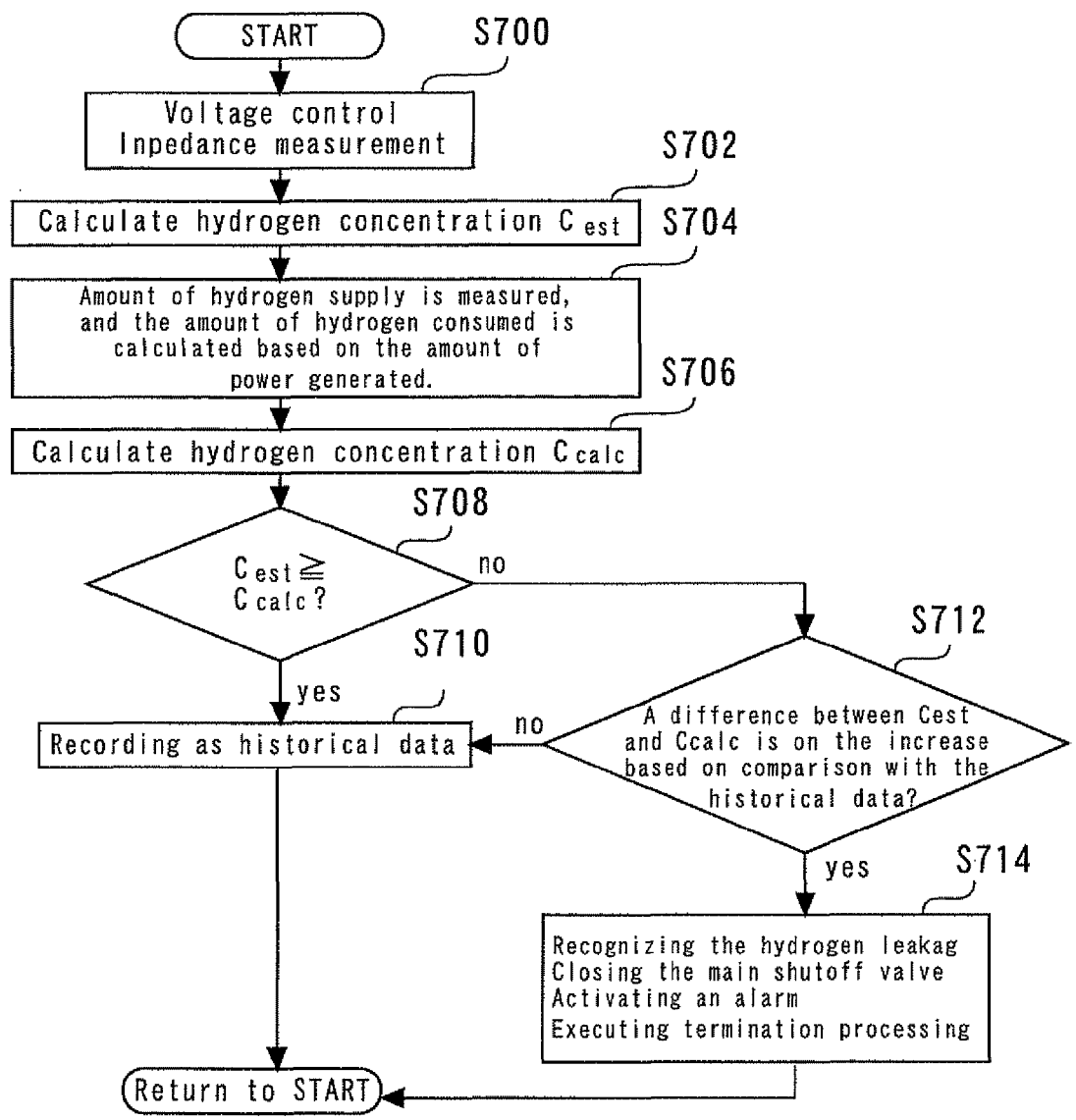
FIG. 34 is a flowchart of a routine executed by an ECU of Embodiment 7.

FIG. 34 is a flowchart of a routine executed by the ECU 620 of Embodiment 7. Steps S648, S650, S652, S654, and S656 are the same as in FIG. 33 and thus will not be discussed again.

In the routine of FIG. 34, when $C_{est}$ is judged to be equal to or greater than $C_{calc}$ in Step S656, $C_{est}$ and $C_{calc}$ are stored as the historical data, followed by termination of the routine.

Conversely, when $C_{est}$ is judged to be less than $C_{calc}$ in Step S656, a judgment is made as to whether the difference between $C_{est}$ and $C_{calc}$ is on the increase or not based on comparison with the historical data (Step S712). If the answer to Step S712 is "no," the process proceeds to Step S656, followed by termination of the routine.

If the answer to Step S712 is "yes," it can be determined that $C_{est}$ is less than $C_{calc}$ and that the difference between them is on the increase. In this case, the hydrogen concentration of the fuel cell stack 600 is further decreasing after having fallen below the hydrogen concentration obtained by the subtraction of the amount of hydrogen consumed from the amount of hydrogen supply. It is highly likely that such a hydrogen concentration decrease may be the result of hydrogen leakage. Accordingly, if the answer to Step S712 is "yes," the ECU 620 of the present embodiment performs the following operations: recognizing the hydrogen leakage; closing a valve located right below the hydrogen tank (the main shutoff valve); activating an alarm; and executing termination processing. The routine of FIG. 34 then terminates.

The above operations make it possible to detect hydrogen leakage using the hydrogen concentration estimating techniques of Embodiment 1.

Embodiment 8

Embodiment 8 provides a fuel cell system that is capable of learning-based optimization of valve control timing during system start-up. The fuel cell system of Embodiment 8 is suitable for use in a traveling object such as a vehicle or the like. The hydrogen concentration estimating techniques performed in Embodiment 8 are the same as in Embodiment 1. Thus, in the explanation that follows, those will not be described again or will be described in a simplified manner.

Figure 35:
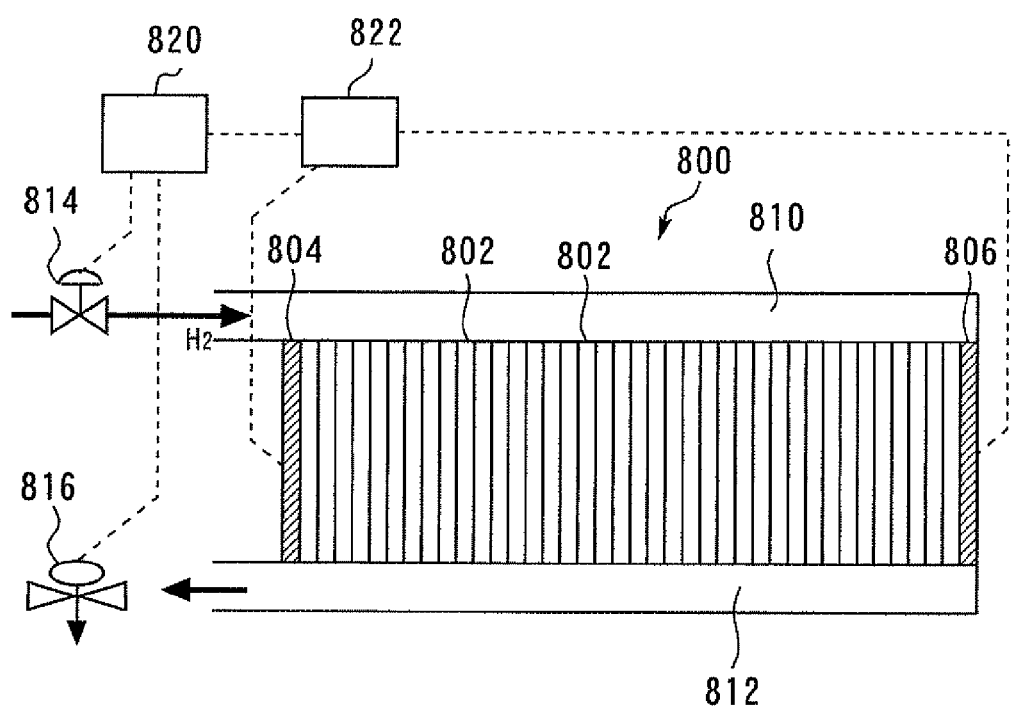
FIG. 35 is a schematic illustrating the configuration of a fuel cell system of Embodiment 8.

FIG. 35 is a schematic illustrating the configuration of the fuel cell system of Embodiment 8. The fuel cell system of the present embodiment includes a fuel cell stack 800. The fuel cell stack 800 is constructed by stacking unit cells. Among these unit cells, the unit cells located at both ends of the stack 800 are hereinafter referred to as the unit cell 804 and the unit cell 806, as illustrated in FIG. 35. The other unit cells are referred to as the unit cells 802. Inside the fuel cell stack 800 are anode manifolds 810 and 812.

An ECU 820 is connected to an impedance measuring instrument 822, an anode entrance valve 814, and an anode exit valve 816. The impedance measuring instrument 822 is connected to the unit cell 804 and the unit cell 806. The ECU 820 is capable of acquiring the impedance values of the unit cells 804 and 806 through the impedance measuring instrument 822. Similar to the ECU 50 of Embodiment 1, the ECU 820 is capable of performing hydrogen concentration estimation based on the impedance values acquired through the impedance measuring instrument 822. For the sake of convenience, the real part of the impedance of the unit cell 804 is hereinafter also referred to as "$Z'_{front}$," and the real part of the impedance of the unit cell 806 as "$Z'_{end}$." Note that the ECU 802 has a timer function.

Operation According to Embodiment 8

Commonly, the time period between the transmission of a valve close signal and the actual closing of the valve includes a response lag. The anode entrance valve 814 and the anode exit valve 816 also have this time lag (symbolized as $\Delta T$). The time lag $\Delta T$ is the length of time it takes for those valves to actually close after the ECU 802 has transmitted valve close signals to those valves. No consideration of this time lag results in the anode entrance valve 814 and anode exit valve 816 closing at unintended timings. Thus, the fuel cell system of Embodiment 8 is designed to optimize the control timing of the anode entrance valve 814 and anode exit valve 816 by learning.

Figure 36:
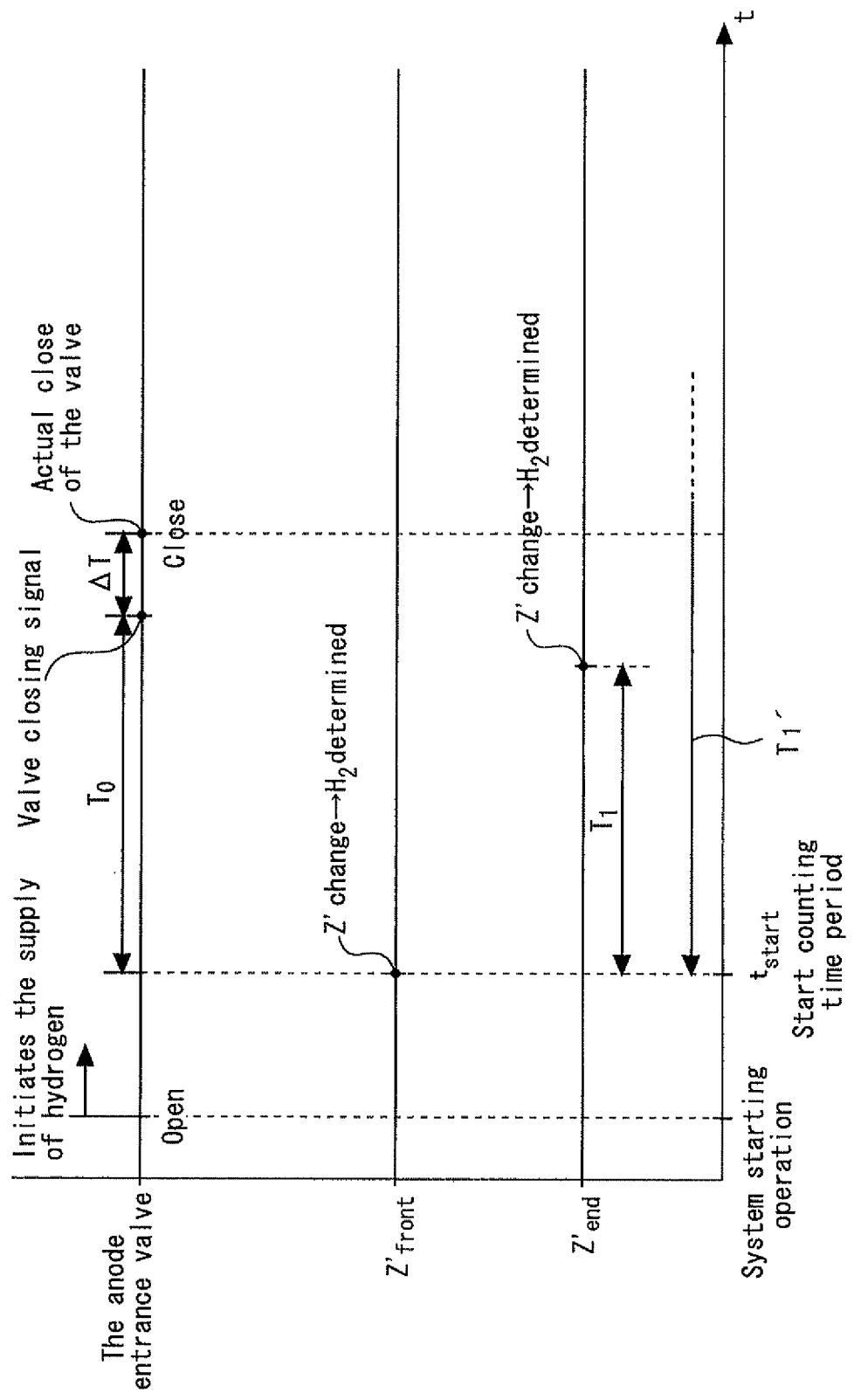
FIG. 36 is a time chart to explain the operation of the fuel cell system of Embodiment 8.

FIG. 36 is a time chart to explain the operation of the fuel cell system of Embodiment 8. In the present embodiment, the anode entrance valve 814 is opened upon system start-up, thereby supplying the fuel cell stack 800 with hydrogen. In the present embodiment, the anode exit valve 816 is also opened at the same time. This makes it possible for the hydrogen to blow the power-generation non-participating gasses inside the fuel cell stack 800 (e.g., nitrogen) out of the fuel cell system upon system halt.

The fuel cell system of Embodiment 8 performs hydrogen concentration estimation during system start-up, using $Z'_{front}$ and $Z'_{end}$. When $Z'_{front}$ has shown a change indicative of a sufficient hydrogen concentration increase (specifically, when $Z'_{front}$ becomes equal to or less than a given value), it can be determined that hydrogen has been fed into the unit cell 804. A similar judgment can be made for the unit cell 806 based on $Z'_{end}$.

In the present embodiment, the time at which a sufficient amount of hydrogen has been fed into the fuel cell 804 is regarded as the reference time. This reference time is denoted by "$t_{start}$" in FIG. 36.

As illustrated in FIG. 36, the ECU 820 of Embodiment 8 transmits a control signal to the anode entrance valve 814 after the passage of time $T_0$ from $t_{start}$. The ECU 820 also transmits a control signal to the anode exit valve 816 at the same time. These valves close after the passage of $\Delta T$ from the transmission of the control signals.

In the present embodiment, the passage of time is measured from $t_{start}$. This time measurement is terminated after $Z'_{end}$ has shown a change indicative of a sufficient hydrogen concentration increase (specifically, when $Z'_{end}$ becomes equal to or less than a given value). With this time measurement, time $T_1$ can be obtained. Time $T_1$ is a period of time between the time at which a hydrogen concentration change inside the unit cell 804 was observed and the time at which a hydrogen concentration change inside the unit cell 806 was observed. In the present embodiment, this time $T_1$ is regarded as the time it took for the fuel cell stack 800 to complete the supply of hydrogen from the start of the supply.

In the present embodiment, $T_0$ is corrected based on $T_1$ so that the length of $(T_0+\Delta T)$ is the same as that of $T_1$. When $T_0+\Delta T=T_1$, the anode entrance valve 814 and anode exit valve 816 will close at the exact timing at which the supply of hydrogen has been completed for the fuel cell stack 800. Thus, the anode entrance valve 814 and anode exit valve 816 can be closed at an ideally precise timing. As a result, it is possible, for example, to avoid discharges of excessive hydrogen and to miniaturize or exclude a hydrogen diluting mechanism for the exhaust system.

Moreover, in the present embodiment, $T_0$ is corrected so that the length of $(T_0+\Delta T)$ will not be less than the length of $T_1$.

Specific Procedure According to Embodiment 8

Figure 37:
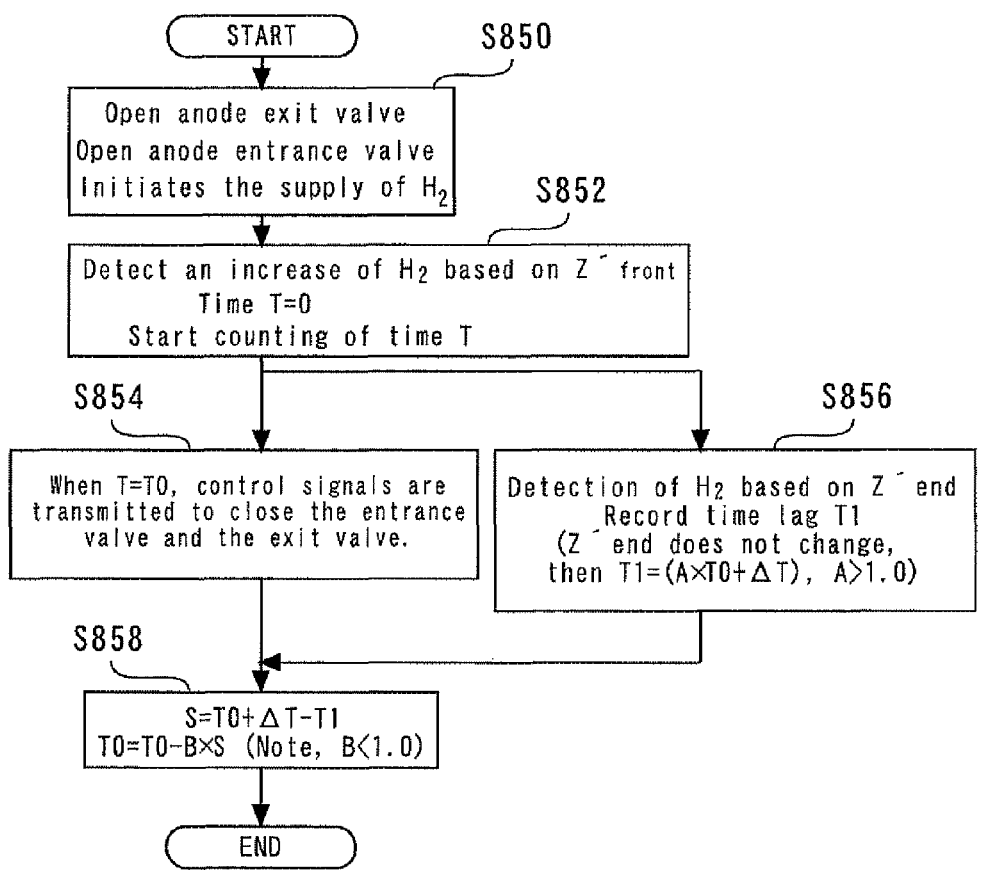
FIG. 37 is a flowchart of a routine executed by an ECU of Embodiment 8.

FIG. 37 is a flowchart of a routine executed by the ECU 820 of Embodiment 8. The routine of FIG. 37 is executed every time the fuel cell system is activated.

The routine of FIG. 37 starts with Step S850 in which the anode entrance valve 814 and anode exit valve 816 are opened. This initiates the supply of hydrogen to the fuel cell stack 800.

Then, in Step S852, the timer is reset to zero (T=0) after $Z'_{front}$ has become equal to or less than a given value, thereby initiating measurement of time T.

When time T has reached $T_0$ after Step S852, the ECU 820 transmits control signals to the anode entrance valve 814 and anode exit valve 816 (Step S854). In this case, the value used as $T_0$ is the last one which was updated the last time the system was activated. It should be noted that, upon the first system start-up, the value used as $T_0$ is an initial setup value obtained through experiment.

After Step S852, Step S856 is also performed. In Step S856, the timer is stopped when $Z'_{end}$ has become equal to or less than a given value, thereby storing time $T_1$.

During Step S856, it is probable that no sign of change in $Z'_{end}$ will be observed for a long period of time, as illustrated by $T_1'$ of FIG. 36. A possible explanation of this is that the anode entrance valve 814 has already been closed before hydrogen reaches the unit cell 806. In this case, it can be determined that the length of $T_0$ is too short. Therefore, $T_1$ is updated in Step S852 based on the following equation if no sign of change in $Z'_{end}$ has been observed by a given point of time.

$$T_1=(A\times T_0+\Delta T), \text{ where } A>1.0.$$

The value of A is determined in advance.

After Steps S854 and S856, $T_0$ is updated (Step S858). In Step S858, the correction of $T_0$ is based on the following equation:

$$T_0=T_0-B\times S, \text{ where } B<1.0, \text{ and } S=T_0+\Delta T-T_1.$$

The above equation corrects $T_0$ such that $T_0$ approaches $T_1$. When $T_0=T_1$ becomes true, S becomes equal to zero, which completes the optimization of $T_0$.

The above operations make it possible to for the fuel cell system to optimize the timing of transmitting control signals to the anode entrance valve 814 and anode exit valve 816 by learning.

Comparative Example of Embodiment 8

Figure 38:
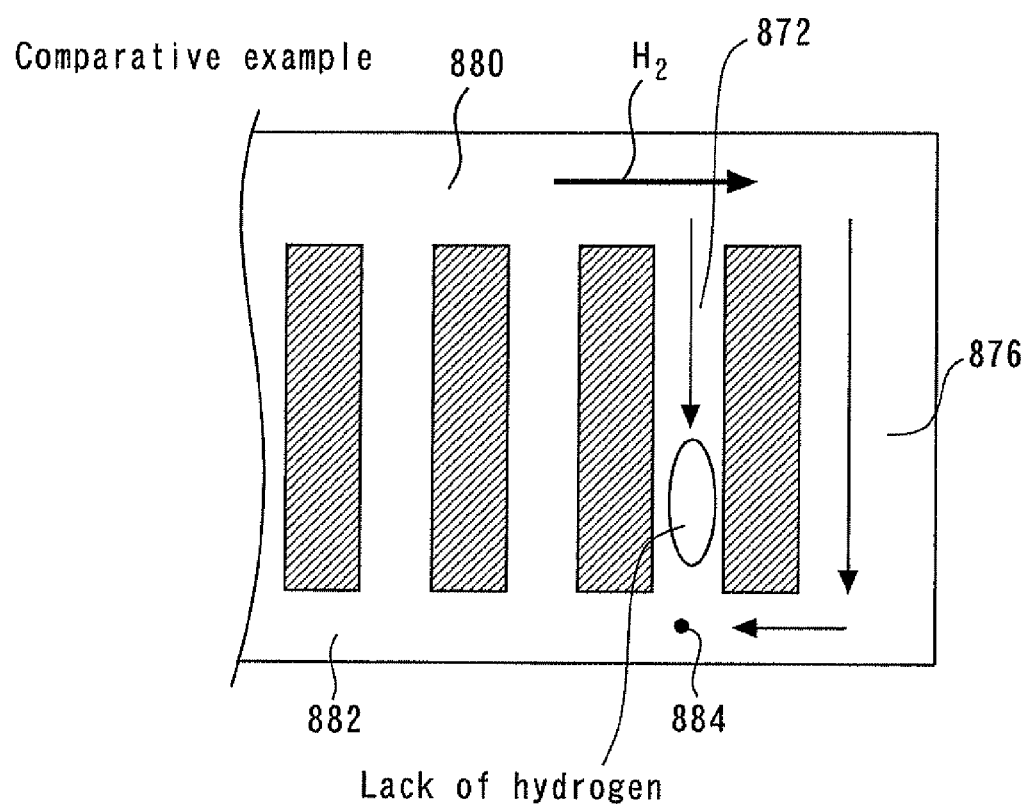
FIG. 38 is a schematic illustrating the internal structure of a fuel cell stack of a comparative example of Embodiment 8.

Discussed below are a comparative example and its problem in which a hydrogen sensor is used to detect the hydrogen concentration of a fuel cell stack. FIG. 38 is a schematic illustrating the internal structure of the fuel cell stack of this comparative example of Embodiment 8. The fuel cells stack of the comparative example includes a dummy cell 876. The dummy cell 876 is located further downstream of a unit cell 872 (hereinafter referred to as the end cell 872) which is located on the furthest downstream side of the hydrogen flow inside the fuel cell stack. The dummy cell 876 does not house a power generation structure.

The fuel cell stack of the comparative example also includes an anode entrance manifold 880, and an anode exit manifold 882, and a hydrogen sensor 884. When the end cell 872 of this fuel cell stack is lacking in hydrogen, the hydrogen sensor 884 is supposed to detect the lack of hydrogen.

However, when the hydrogen that has passed through the dummy cell 876 reaches the hydrogen sensor 884, the hydrogen sensor 884 will detect this hydrogen.

Such a dummy cell may often have a smaller flow resistance and a shorter flow-channel length than unit cells. In that case, hydrogen flows quickly through the dummy cell. As above, the configuration of the comparative example interferers with the hydrogen shortage detection by the hydrogen sensor 884.

In contrast, the fuel cell system of Embodiment 8 is designed to estimate the hydrogen concentration of the unit cell 806 based on the impedance of the unit cell 806. The full cell system of Embodiment 8 is thus free from the problem associated with the comparative example.

Modification of Embodiment 8

In Embodiment 8, it is preferred that hydrogen concentration estimation be based particularly on the impedance of an anode entrance section of the unit cell 804 and on the impedance of an anode exit section of the unit cell 806. The impedance of a particular portion of a unit cell can be measured by adopting the configuration of Implementation Example 2 of Embodiment 1, the configuration of Embodiment 4, or any known techniques.

Embodiment 9

Fuel cell systems according to Embodiment 9 of the present invention will now be described. In accordance with Embodiment 9, fuel-cell power generation upon system start-up can be started at an appropriate timing at which the hydrogen concentration of the fuel cell is sufficiently high. The fuel cell systems of Embodiment 9 are suitable for use in a traveling object such as a vehicle or the like. The hydrogen concentration estimating techniques performed in Embodiment 9 are the same as in Embodiment 1. Thus, in the explanation that follows, those will not be described again or will be described in a simplified manner.

Implementation Example 1 of Embodiment 9

System Configuration According to Implementation Example 1 of Embodiment 9

Figure 39:
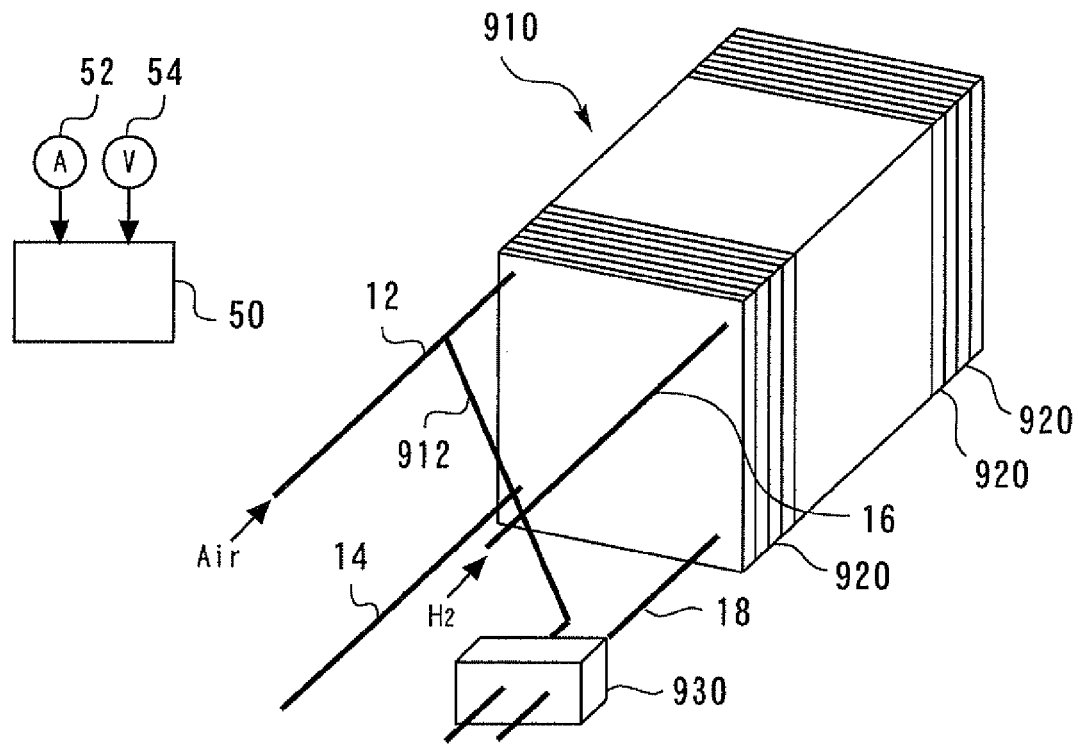
FIG. 39 is a schematic illustrating the configuration of a fuel cell system according to Implementation Example 1 of Embodiment 9.

FIG. 39 is a schematic illustrating the configuration of a fuel cell system according to Implementation Example 1 of Embodiment 9. The fuel cell system of the present implementation example is basically the same in hardware configuration as the fuel cell system of Implementation Example 2 of Embodiment 1 (see FIG. 10), except that the former includes a bypass conduit 912 and a detection cell 930. The detection cell 920 is structurally the same as the unit cells 20.

The detection cell 930 is installed on the conduit 18 through which anode off-gas flows. The detection cell 930 houses the same power generation structure (an MEA, gas diffusion layers, and the like) as those of the unit cells 20. The anode of the detection cell 930 receives the supply of the anode off-gas that flows from the conduit 18 while its cathode receives the supply of the air that flows from the conduit 12 through the bypass conduit 912. The ammeter 52 and the voltmeter 54 are also connected to the detection cell 930. The ECU 50 is capable of measuring the impedance of the detection cell 930 based on values acquired by the ammeter 52 and voltmeter 54.

Figure 40:
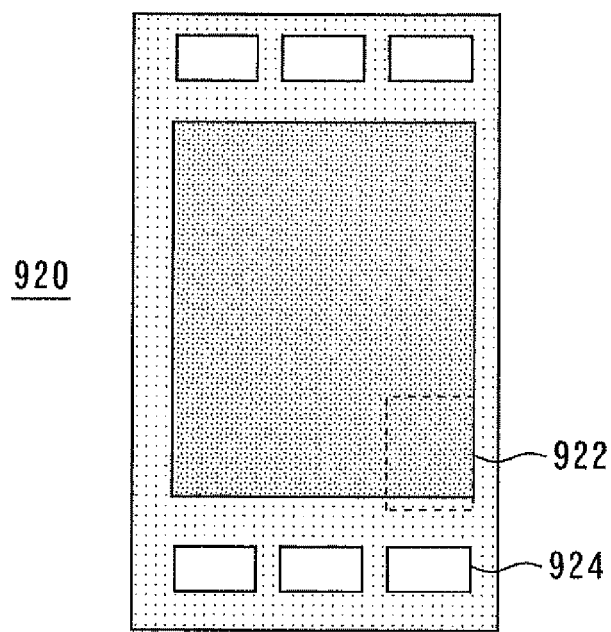
FIG. 40 is a plan view illustrating the configuration of a unit cell according to Embodiment 9.

FIG. 40 is a plan view illustrating the configuration of a unit cell 920 according to Embodiment 9. The unit cell 920 includes an anode gas channel exit 924. A portion 922 located close to the exit 924 has the lowest hydrogen concentration.

Specific Procedure According to Implementation Example 1 of Embodiment 9

Figure 41:
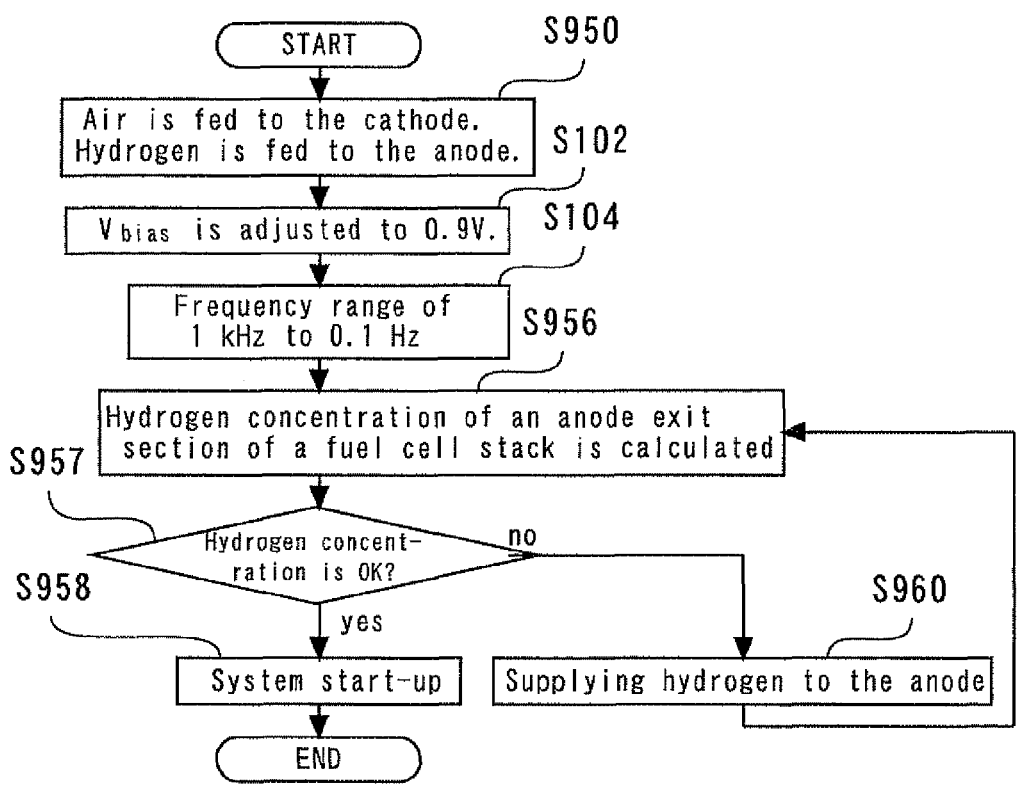
FIG. 41 is a flowchart of a routine executed by an ECU of Implementation Example 1 of Embodiment 9.

FIG. 41 is a flowchart of a routine executed by the ECU 50 of Implementation Example 1 of Embodiment 9. The routine of FIG. 41 is executed upon start-up of the fuel cell system.

In the routine of FIG. 41, the ECU 50 first performs Steps S100, S102, and S104, as is similar to the routine of FIG. 11. Then, the hydrogen concentration of an anode exit section of the fuel cell stack 910 is calculated (Step S956). This calculation is based on the impedance of the detection cell 930.

Next, the ECU 50 judges whether the calculated hydrogen concentration is acceptable or not (Step S957). In Step S957, the ECU 50 judges whether or not the acquired value of $Z'$ is equal to or less than a hydrogen concentration $Z'_{STA}$ at or below which the power generation by the fuel cell stack 910 can be started. That is, a judgment is made as to whether $Z' \leq Z'_{STA}$ is true or not.

When $Z' \leq Z'_{STA}$ is not true in Step S957, i.e., when $Z' > Z'_{STA}$ is true, the power generation by the fuel cell stack 910 is put on hold (i.e., prohibited), and hydrogen is fed to the anode side of the stack 910. The process then returns to Step S956. Thereafter, Steps S956, S957, and S960 are repeated. When the hydrogen concentration inside the fuel cell stack 910 has eventually become high enough, $Z' \leq Z'_{STA}$ becomes true.

When $Z' \leq Z'_{STA}$ is true, the hydrogen concentration of the fuel cell stack 10 can be judged to be high enough. Accordingly, when $Z' \leq Z'_{STA}$ is true, the fuel cell stack 910 is activated (Step S958), followed by the termination of the routine.

With the above operations, the activation (power generation) of the fuel cell stack 910 can be started when the hydrogen concentration of the stack 910 has become high enough.

Implementation Example 2 of Embodiment 9

A fuel cell system according to Implementation Example 2 of Embodiment 9 is structurally the same as the fuel cell system of Implementation Example 1 of Embodiment 9. The present implementation example is achieved by the ECU 50 executing the routine of FIG. 42.

Figure 42:
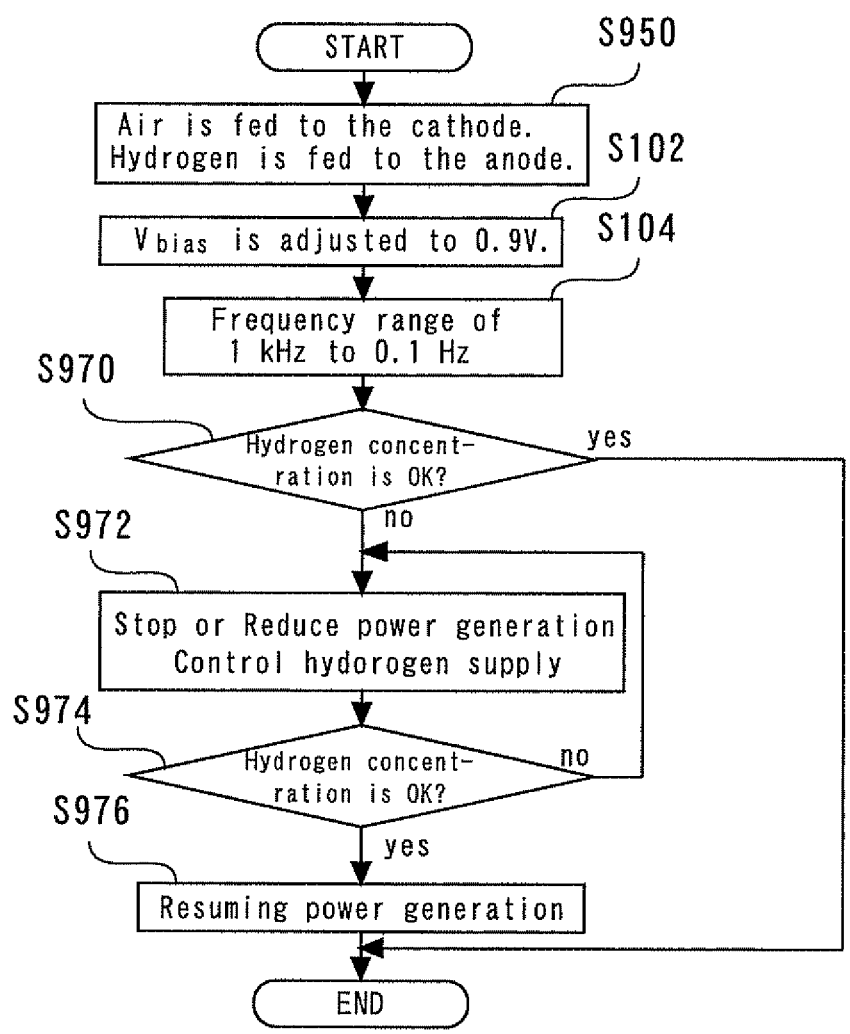
FIG. 42 is a flowchart of a routine executed by an ECU of Implementation Example 2 of Embodiment 9.

FIG. 42 is a flowchart of a routine executed by the ECU 50 of Implementation Example 2 of Embodiment 9. The routine of FIG. 42 is executed while the fuel cell stack 910 generates power. In accordance with the routine of FIG. 42, it is possible to limit the amount of power generated by the fuel cell stack 10 or restore the hydrogen concentration of the fuel cell stack 910 if the hydrogen concentration decreased considerably during system operation.

The routine of FIG. 42 starts with Step S950 in which reactant gasses, that is, air and hydrogen, are fed to the fuel cell stack 910. It is preferred that a copious amount of air be supplied. If normal power generation is in progress, Step S950 can be skipped because, in that case, air and hydrogen are already being supplied. The ECU 50 then executes Steps S102 and S104, similar to the routine of FIG. 11.

Next, the ECU 50 judges whether the calculated hydrogen concentration is acceptable or not (Step S970). In Step S970, similar to Step S107 of FIG. 11, the ECU 50 judges whether or not the acquired value of $Z'$ is equal to or less than an acceptable hydrogen concentration $Z'_P$ at or below which the power generation by the fuel cell stack 910 can be continued. That is, a judgment is made as to whether $Z' \leq Z'_P$ is true or not. When $Z' \leq Z'_P$ is true, the hydrogen concentration of the fuel cell stack 910 can be judged to be high enough. Accordingly, when $Z' \leq Z'_P$, the routine is terminated.

When $Z' \leq Z'_P$ is not true in Step S970, i.e., when $Z' > Z'_P$, the power generation by the fuel cell stack 910 is halted. After the halt, the opening angle of a regulator (not illustrated) located between a hydrogen tank and the conduit 14 is increased, thereby increasing the amount of hydrogen gas supplied through the conduit 14 to the fuel cell stack 910. Note that when $Z' > Z'_P$, it is also possible to reduce the amount of power generated by the fuel cell stack 910, instead of halting the power generation by the fuel cell stack 910. In that case, it is preferred to sufficiently reduce the amount of power generated as long as the amount reduction does not result in the deterioration of the inner structure of the fuel cell due to lack of hydrogen.

Next, the ECU 50 judges whether a second judgment criterion has been satisfied or not (Step S974). In this step, the ECU 50 first performs impedance measurement again, using the same frequency as in Step S104. The ECU 50 then judges whether or not the measured value of $Z'$ is equal to or less than $Z'_P$. Since the amount of hydrogen is on the increase after Step S972, the hydrogen concentration will eventually increase up to an acceptable level. In response to the increase of the hydrogen concentration, the value of $Z'$ will decrease, and $Z' \leq Z'_P$ will eventually become true.

When $Z' \leq Z'_P$ has become true in Step S974, the control operation of Step S972 is terminated, thereby resuming power generation (Step S976). The routine terminates after Step S976.

The above operations make it possible to prohibit the power generation by the fuel cell stack 910 or limit the amount of power generated by the fuel cell stack 910 when the hydrogen concentration of the fuel cell stack 910 is less than a given hydrogen concentration value. It is also possible to restore the hydrogen concentration of the fuel cell stack 910 when the hydrogen concentration decreased considerably during system operation.

If the fuel cell system of Embodiment 9 is installed on a vehicle, the output power required by the vehicle can be supplied from its battery (battery-operated driving) while the power generation by the fuel cell system is halted or the amount of power generated by the system is reduced. Further, excess power resulting from the restoration of hydrogen concentration can be stored in the battery or discharged through a heatsink.

As stated above, the fuel cell systems of Embodiment 9 are each provided with the detection cell 930, and the impedance of the detection cell 930 is used to perform hydrogen concentration estimation. However, the hydrogen concentration estimation may not involve the use of the detection cell 930. In that case, impedance measurement may be performed on any of the unit cells 920. Preferably, impedance measurement may be performed on a downstream area of hydrogen flow (e.g., the portion 922 of one of the unit cells 920) by using the configuration of Implementation Example 2 of Embodiment 1.

The following should be noted. The components that correspond to the "system peripheral device" of the twenty first, twenty second, twenty fifth, or twenty seventh aspect of the present invention includes the following components of Embodiments 1 to 9: the load 4; the hydrogen and air system devices (not illustrated) of Implementation Example 1 of Embodiment 1; the purge valve 54; the exhaust valve 216; the exhaust valve 258; the purge valve 312; the air pump 314; the hydrogen pump 516; the purge valve 518; the anode entrance valve 814; and the anode exit valve 816.

The fuel cell stack 910 of Embodiment 9 corresponds to the "fuel cell" of the twenty second aspect of the present invention. Also, the "power generation control means" of the twenty second aspect of the present invention is implemented by the ECU 50 of Embodiment 9 executing Step S957 of FIG. 41 or Steps S970 and S972 of FIG. 42.

In Embodiments 2 to 9, we have presented various methods for implementing the hydrogen concentration estimating techniques of the present invention on a fuel cell system, by using examples in which the real part Z' of impedance is primarily used for the sake of convenience. The present invention is not limited to those examples, however. It is possible to use any of the values associated with the hydrogen concentration estimating techniques of Embodiment 1 for the fuel cell systems of Embodiments 2 to 9 (examples of the values include the imaginary part Z" of impedance; the absolute value |Z| of impedance; the phase θ of impedance; the I-V tangent resistance |ΔV|/|ΔI|; the radius of curvature ρ, the curvature k, or other values of an impedance semicircle; and the arc length L of a fitted curve). The control operations of Embodiments 2 to 9 can be performed by obtaining the hydrogen concentration of a fuel cell based on comparison of any of the above values against a reference value. It is instead possible to create a hydrogen concentration characteristic data map using any of the above values and to calculate an estimate hydrogen concentration value based on that data map so that the estimate value can be compared against a reference hydrogen concentration value.

The invention claimed is:

1. A hydrogen concentration estimating apparatus for a fuel cell that includes an anode and a cathode and generates electric power by the anode receiving hydrogen and the cathode receiving oxygen, the apparatus comprising:
    measuring means for measuring impedance or admittance of the fuel cell; and
    estimating means for estimating a hydrogen concentration inside the fuel cell based on a measured value measured by the measuring means such that the hydrogen concentration is estimated to be relatively low when an impedance semicircle of the fuel cell is relatively large.

2. The hydrogen concentration estimating apparatus according to claim 1, further comprising biasing means for applying a bias to the fuel cell during impedance measurement by the measuring means, such that a voltage of the fuel cell becomes less than an OCV (open circuit voltage) of the fuel cell and such that a bias voltage becomes equal to or greater than a given voltage or a bias current becomes equal to or less than a given current.

3. The hydrogen concentration estimating apparatus according to claim 2, further comprising:
    OCV acquiring means for acquiring the OCV of the fuel cell; and
    bias correcting means for correcting the bias applied by the biasing means to the fuel cell based on the acquired OCV.

4. The hydrogen concentration estimating apparatus according to claim 1, further comprising:
    OCV acquiring means for acquiring an OCV of the fuel cell;
    target bias calculating means for calculating a target bias voltage by subtracting a given value from the acquired OCV; and
    target bias applying means for applying a bias to the fuel cell based on the target bias voltage during impedance measurement by the measuring means.

5. The hydrogen concentration estimating apparatus according to claim 1, further comprising specific-bias applying means for applying a bias voltage or a bias current to the fuel cell during impedance measurement by the measuring means, the bias voltage or the bias current being of a value that allows an impedance frequency characteristic curve of the fuel cell obtained within a low frequency range to substantially take the form of one semicircle in a complex plane.

6. The hydrogen concentration estimating apparatus according to claim 5, wherein the low frequency range is from 100 Hz to 0.1 Hz.

7. The hydrogen concentration estimating apparatus according to claim 2, wherein the measuring means includes:
    means for measuring an electric current and a voltage of the fuel cell;
    means for calculating, based on the measured electric current and voltage, a slope of a particular portion of an I-V curve of the fuel cell, the particular portion being close to an OCV; and
    means for calculating the I-V tangent resistance based on the calculated slope.

8. The hydrogen concentration estimating apparatus according to claim 1, further comprising means for detecting or estimating a moisture content inside the fuel cell,
    wherein the estimating means estimates a hydrogen concentration inside the fuel cell based on both of a value measured by the measuring means and the moisture content detected or estimated.

9. The hydrogen concentration estimating apparatus according to claim 1, wherein the fuel cell is a proton exchange membrane fuel cell.

10. A hydrogen concentration estimating apparatus for a fuel cell that includes an anode and a cathode and generates electric power by the anode receiving hydrogen and the cathode receiving oxygen, the apparatus comprising:
- measuring means for measuring I-V tangent resistance of the fuel cell; and
- estimating means for estimating a hydrogen concentration of the fuel cell based on the measured I-V tangent resistance.

11. A hydrogen concentration estimating apparatus for a fuel cell that includes an anode and a cathode and generates electric power by the anode receiving hydrogen and the cathode receiving oxygen, the apparatus comprising:
- a measuring unit which measures impedance or admittance of the fuel cell; and
- an estimating unit which estimates a hydrogen concentration inside the fuel cell based on a measured value measured by the measuring unit such that the hydrogen concentration is estimated to be relatively low when an impedance semicircle of the fuel cell is relatively large.

* * * * *